(12) United States Patent
Dassanayake et al.

(10) Patent No.: US 11,092,325 B2
(45) Date of Patent: Aug. 17, 2021

(54) HIGH INTENSITY DISCHARGE LIGHT ASSEMBLY

(71) Applicant: eLUMIGEN, LLC, Troy, MI (US)

(72) Inventors: Mahendra Dassanayake, Bloomfield Hills, MI (US); Gennaro Fedele, West Bloomfield, MI (US); Brian Petku, Clarkston, MI (US); Roshan A. Kandanda, Auburn Hills, MI (US); Alfred Laspina, Havervill, MA (US)

(73) Assignee: eLUMIGEN, LLC, Troy, MI (US)

( * ) Notice: Subject to any disclaimer, the term of this patent is extended or adjusted under 35 U.S.C. 154(b) by 0 days.

(21) Appl. No.: 16/597,018

(22) Filed: Oct. 9, 2019

(65) Prior Publication Data

US 2020/0116344 A1  Apr. 16, 2020

Related U.S. Application Data

(60) Provisional application No. 62/743,580, filed on Oct. 10, 2018.

(51) Int. Cl.
*F21V 29/51* (2015.01)
*F21K 9/90* (2016.01)
(Continued)

(52) U.S. Cl.
CPC .............. *F21V 29/51* (2015.01); *F21K 9/237* (2016.08); *F21K 9/238* (2016.08); *F21K 9/62* (2016.08); *F21K 9/90* (2013.01); *F21V 9/02* (2013.01); *F21V 17/101* (2013.01); *F21V 17/12* (2013.01); *F21V 17/164* (2013.01); *F21V 19/003* (2013.01); *F21V 23/006* (2013.01);
(Continued)

(58) Field of Classification Search
CPC ...... F21V 29/51; F21V 29/713; F21V 29/773; F21V 9/02; F21V 17/101; F21V 17/12; F21V 17/164; F21V 19/003; F21V 23/006; F21V 23/02; F21V 23/0471; F21V 23/06; F21V 31/005; H02S 40/38; F21K 9/62; F21K 9/238; F21K 9/237; F21K 9/90; F21K 9/02
See application file for complete search history.

(56) References Cited

U.S. PATENT DOCUMENTS 3,869,605 A * 3/1975 Davis ....................... A01C 1/02
                                                            362/264
5,688,042 A   11/1997 Madadi et al.
(Continued)

FOREIGN PATENT DOCUMENTS

CH           700 967 A1    11/2010

OTHER PUBLICATIONS

International Search Report and Written Opinion dated Jan. 24, 2020 in corresponding PCT Application No. PCT/US2019/055630.

*Primary Examiner* — Bryon T Gyllstrom
*Assistant Examiner* — Christopher E Dunay
(74) *Attorney, Agent, or Firm* — Harness, Dickey & Pierce, P.L.C.

(57) ABSTRACT

A light assembly includes a heat pipe having a first condenser portion and a first evaporator portion. The heat pipe includes a longitudinally extending wall. A plurality of light sources are disposed at least partially around and thermally coupled to longitudinally extending wall at the first evaporator portion of the heat pipe. A first heat sink housing receives the first condenser portion of the heat pipe.

81 Claims, 47 Drawing Sheets

(51) Int. Cl.

| | | |
|---|---|---|
| *F21V 29/77* | (2015.01) | |
| *F21V 29/71* | (2015.01) | |
| *F21V 19/00* | (2006.01) | |
| *F21V 23/00* | (2015.01) | |
| *F21V 17/12* | (2006.01) | |
| *F21V 23/04* | (2006.01) | |
| *F21V 31/00* | (2006.01) | |
| *F21V 23/06* | (2006.01) | |
| *F21V 23/02* | (2006.01) | |
| *H02S 40/38* | (2014.01) | |
| *F21K 9/62* | (2016.01) | |
| *F21V 9/02* | (2018.01) | |
| *F21K 9/238* | (2016.01) | |
| *F21V 17/16* | (2006.01) | |
| *F21V 17/10* | (2006.01) | |
| *F21K 9/237* | (2016.01) | |
| *A01G 7/04* | (2006.01) | |
| *F21Y 115/10* | (2016.01) | |
| *F21Y 107/40* | (2016.01) | |
| *F21Y 105/16* | (2016.01) | |
| *F21V 5/04* | (2006.01) | |
| *F21V 7/00* | (2006.01) | |
| *F21K 9/68* | (2016.01) | |
| *F21K 9/69* | (2016.01) | |

(52) U.S. Cl.
CPC .......... *F21V 23/02* (2013.01); *F21V 23/0471* (2013.01); *F21V 23/06* (2013.01); *F21V 29/713* (2015.01); *F21V 29/773* (2015.01); *F21V 31/005* (2013.01); *H02S 40/38* (2014.12); *A01G 7/045* (2013.01); *F21K 9/68* (2016.08); *F21K 9/69* (2016.08); *F21V 5/043* (2013.01); *F21V 7/0066* (2013.01); *F21Y 2105/16* (2016.08); *F21Y 2107/40* (2016.08); *F21Y 2115/10* (2016.08)

(56) References Cited

U.S. PATENT DOCUMENTS 6,974,233 B1    12/2005  Aubrey

| | | | |
|---|---|---|---|
| 2004/0114367 A1* | 6/2004 | Li | F21K 9/232 362/248 |
| 2006/0001384 A1* | 1/2006 | Tain | F21K 9/00 315/246 |
| 2007/0279862 A1* | 12/2007 | Li | F21V 29/51 361/692 |
| 2008/0007954 A1* | 1/2008 | Li | F21V 29/51 362/294 |
| 2008/0253125 A1* | 10/2008 | Kang | F21V 29/51 362/294 |
| 2009/0002995 A1* | 1/2009 | Lee | F21V 29/51 362/294 |
| 2009/0067171 A1* | 3/2009 | Lai | F21V 29/76 362/235 |
| 2009/0135604 A1* | 5/2009 | Chen | F21V 29/767 362/294 |
| 2009/0225540 A1* | 9/2009 | Chen | F21V 29/76 362/231 |
| 2009/0284973 A1 | 11/2009 | Liao | |
| 2010/0117534 A1* | 5/2010 | Chen | F21V 29/767 315/32 |
| 2010/0207502 A1* | 8/2010 | Cao | F21V 29/51 313/46 |
| 2011/0176316 A1 | 7/2011 | Phipps et al. | |
| 2011/0267820 A1* | 11/2011 | Bansbach | F21S 8/088 362/249.02 |
| 2011/0273072 A1* | 11/2011 | Oki | F21K 9/232 313/46 |
| 2013/0010479 A1* | 1/2013 | Chen | F21V 29/51 362/373 |
| 2013/0010489 A1* | 1/2013 | Liao | F21V 29/80 362/543 |
| 2013/0214665 A1* | 8/2013 | Nezu | F21V 29/713 313/46 |
| 2014/0169005 A1* | 6/2014 | Lee | F21V 29/74 362/382 |
| 2015/0098223 A1* | 4/2015 | Su | F21V 29/51 362/249.02 |
| 2015/0109779 A1 | 4/2015 | Dimitriadis | |
| 2016/0113213 A1 | 4/2016 | Berinsky | |
| 2017/0241362 A1* | 8/2017 | Beerens | F02D 35/02 |
| 2017/0241632 A1 | 8/2017 | Nguyen et al. | |

* cited by examiner

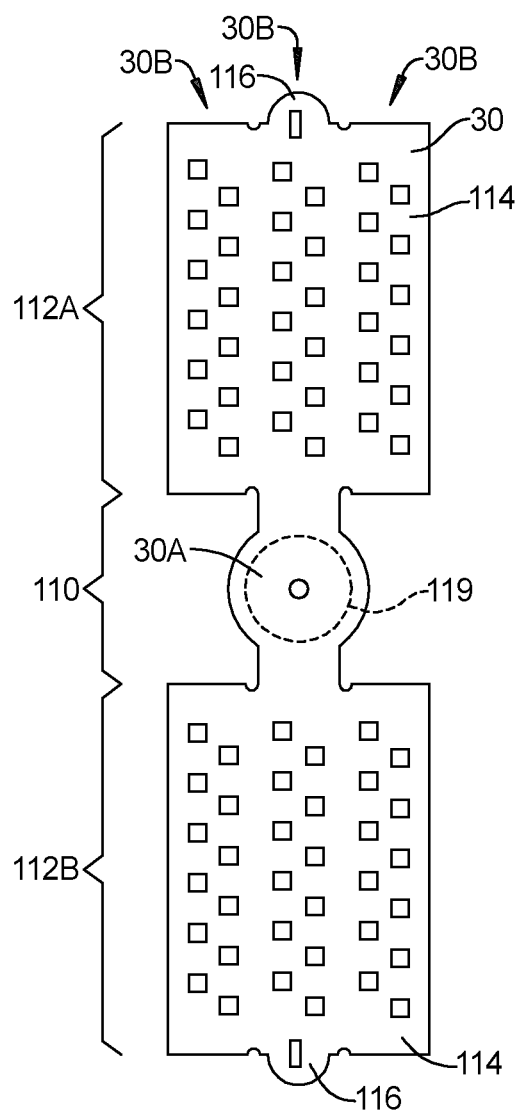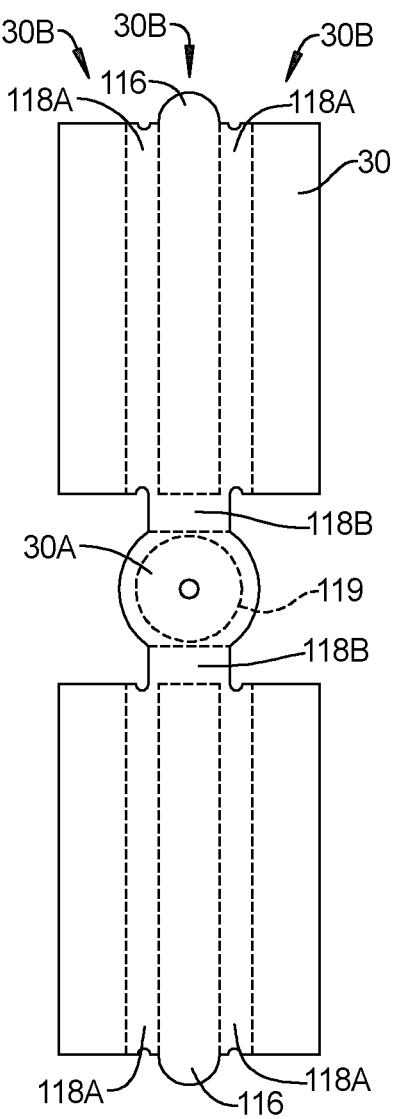
FIG. 16  FIG. 17
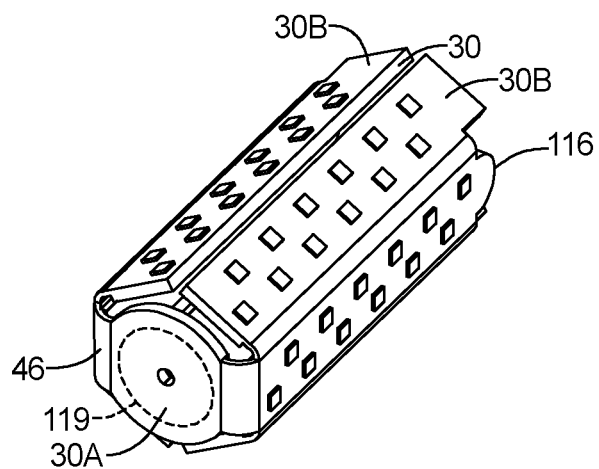
FIG. 18

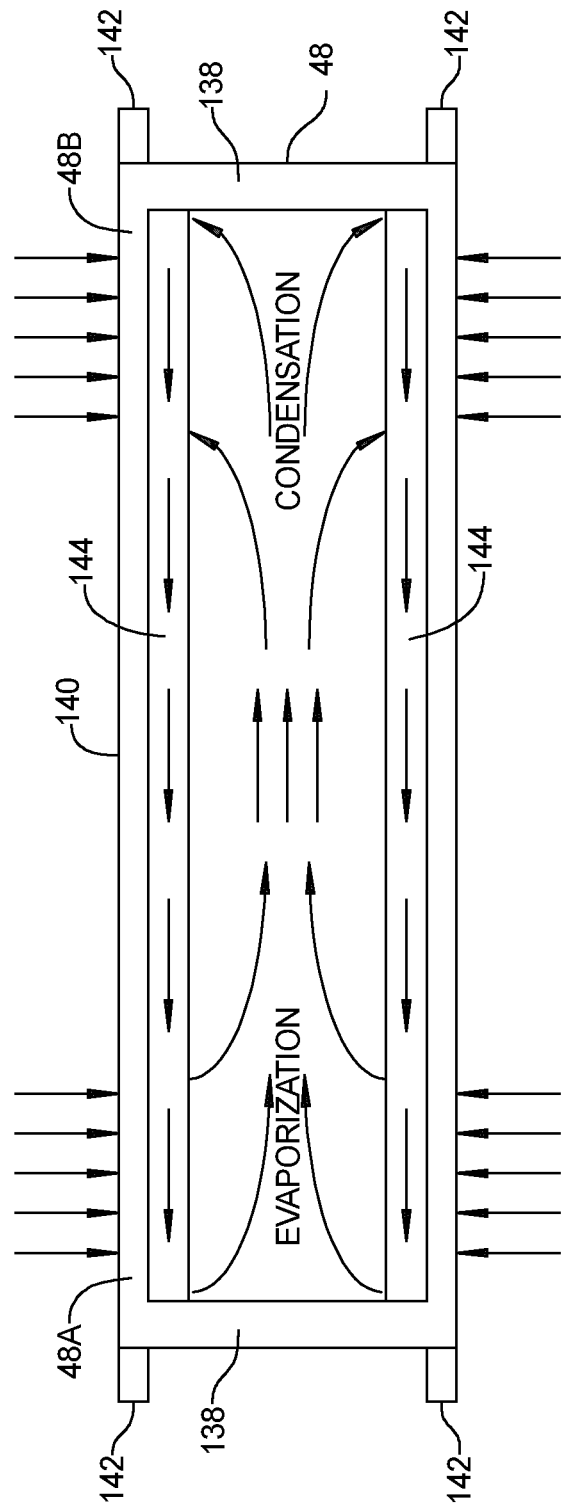

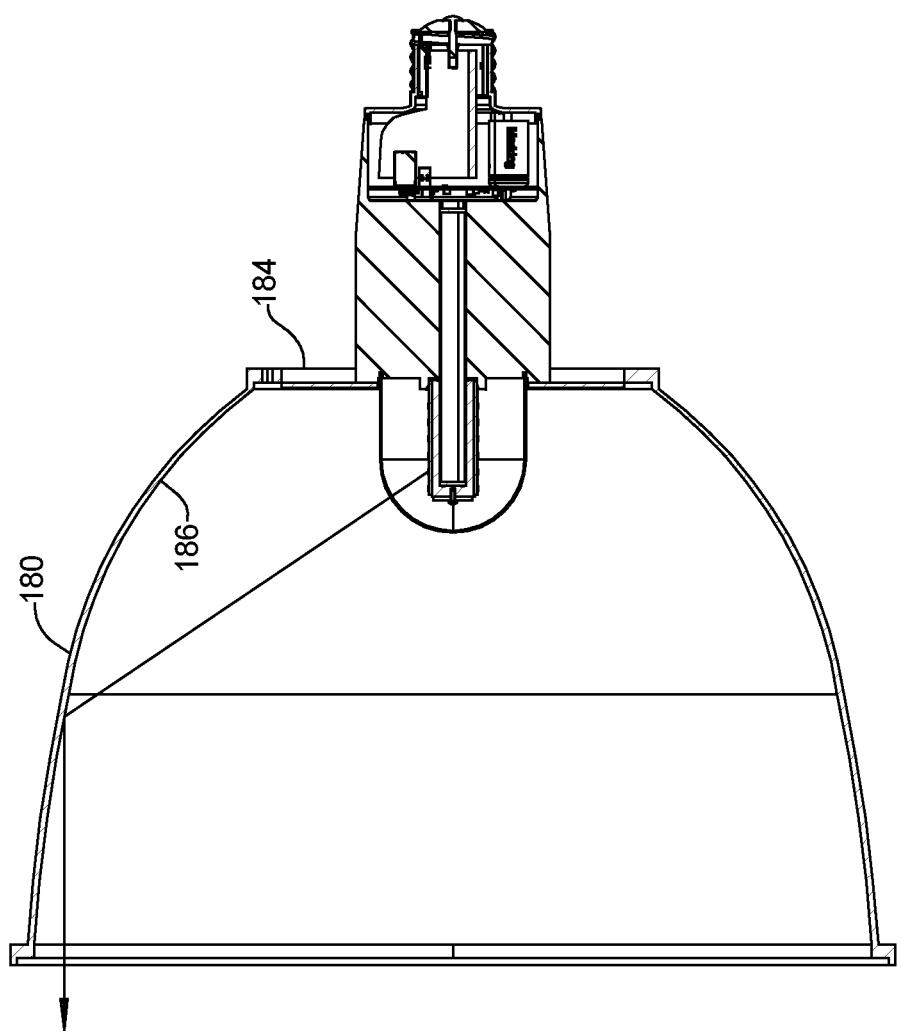

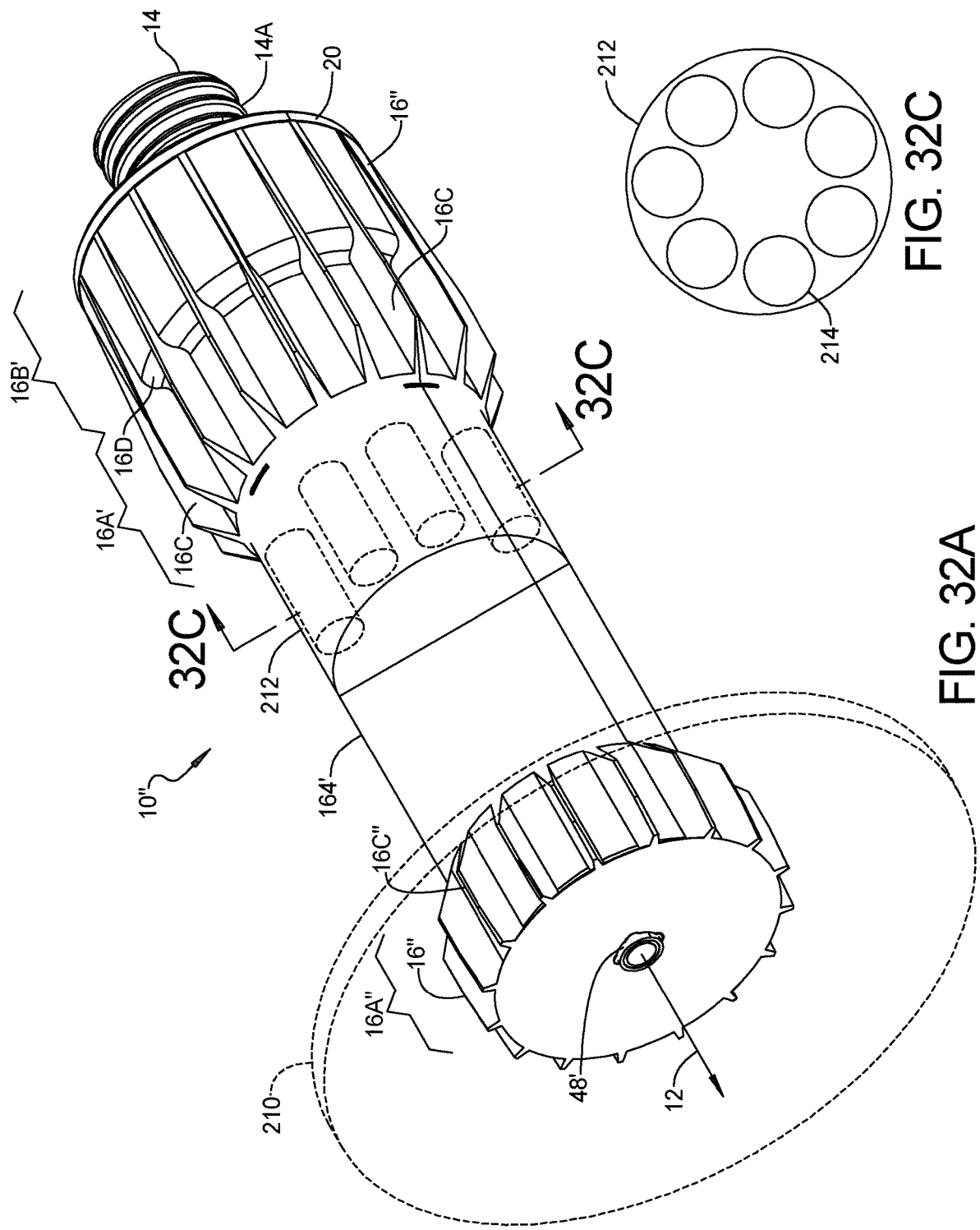

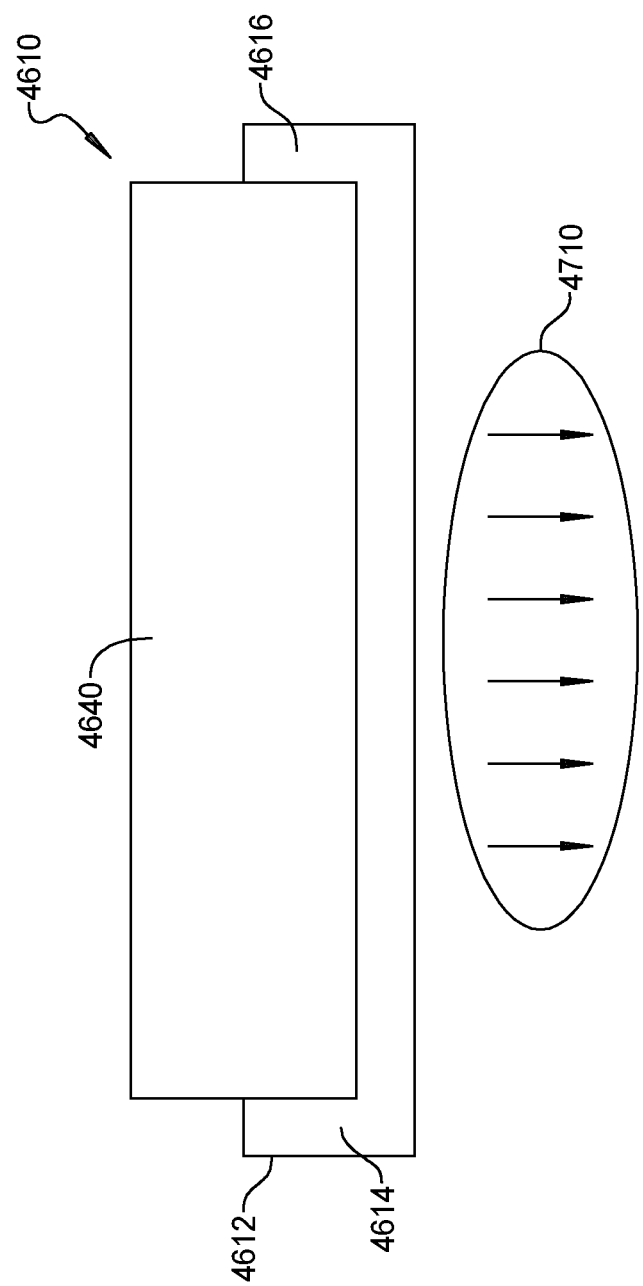

HIGH INTENSITY DISCHARGE LIGHT ASSEMBLY

TECHNICAL FIELD

The present disclosure relates generally to lighting using solid state light sources such as light-emitting diodes or lasers and, more specifically, to a configuration for a high intensity discharge light assembled light source.

BACKGROUND

This section provides background information related to the present disclosure which is not necessarily prior art.

Providing alternative light sources is an important goal to reduce energy consumption. Alternatives to incandescent bulbs include compact fluorescent bulbs, light-emitting diode (LED) light bulbs and high intensity discharge (HID) lamps. The compact fluorescent light bulbs use significantly less power for illumination. However, the materials used in compact fluorescent bulbs are not environmentally friendly. HID lamps include high pressure sodium, metal halide and ceramic discharge lamps and also contain material that is not environmentally friendly.

Various configurations are known for light-emitting diode lights. Light-emitting diode lights last longer and have less environmental impact than compact fluorescent bulbs. Light-emitting diode lights use less power than compact fluorescent bulbs. However, many compact fluorescent bulbs and light-emitting diode lights do not have the same light spectrum as incandescent bulbs or HID lamps. They are also relatively expensive. In order to achieve maximum life and efficacy (lumens per watt (LPW)) from a light-emitting diode, heat must be removed from around the light-emitting diode. In many known configurations, light-emitting diode lights are subject to premature failure due to heat and light output deterrents with increased temperature.

There are many high light output applications such as overhead store lights, street lights and movie/theatrical lighting. High output applications require high power to generate the high light output needs no matter the type of light source. As mentioned above, light-emitting diodes have increased life when the diodes are kept at reduced temperatures. This can be difficult to achieve in high output applications.

SUMMARY

This section provides a general summary of the disclosure, and is not a comprehensive disclosure of its full scope or all of its features.

The present disclosure provides a lighting assembly that is used for generating light and providing a long-lasting and thus cost-effective unit suitable for high light output applications.

In one aspect of the invention, a light assembly includes a heat pipe having a first condenser portion and a first evaporator portion. The heat pipe includes a longitudinally extending wall. A plurality of light sources are disposed at least partially around and thermally coupled to longitudinally extending wall at the first evaporator portion of the heat pipe. A first heat sink housing receives the first condenser portion of the heat pipe.

In another aspect of the disclosure, a method of assembling a light assembly includes populating a circuit board when the circuit board is disposed in a plane, bending the circuit board into a plurality of side portions and a central side, wherein the plurality of sides extend at an angle outward around the central side, inserting the circuit board over a bar so that the plurality of side portions are around the bar, inserting an first evaporator portion of a heat pipe into the bar, inserting an a first condenser portion of the heat pipe into a first heat sink housing, forming a gap between the first heat sink housing and the bar, placing thermally conductive material between the bar and the plurality of side portions of the circuit board, urging the plurality of side portion against the circuit board against the bar using a plurality of retainers disposed on the first heat sink housing and fastening the circuit board to the bar.

In another aspect of the disclosure, a method of assembling a light assembly includes populating a plurality of side circuit boards, each of the plurality side circuit boards being planar and comprising a respective tab, electrically and mechanically coupling the plurality of side circuit boards to a central side by inserting the tabs into respective slots on the central side, wherein the plurality of side circuit boards extend at an angle outward around the central side, the plurality of side circuit boards and the central side forming an assembly, inserting the assembly over a bar so that the plurality of side circuit boards are around the bar, inserting an first evaporator portion of a heat pipe into the bar, inserting an a first condenser portion of the heat pipe into a first heat sink housing, forming a gap between the first heat sink housing and the bar, placing thermally conductive material between the bar and the plurality of side portions of the circuit board, urging the plurality of side circuit boards against the circuit board against the bar, and fixing the circuit board to the bar.

In yet another aspect of the disclosure, a light assembly comprises a heat pipe having a first condenser portion and a first evaporator portion. The heat pipe comprises a longitudinally extending wall. A plurality of light sources are disposed at least partially around and thermally coupled to longitudinally extending wall at the first evaporator portion of the heat pipe. A first heat sink housing has a portion of the heat pipe disposed therein. A lamp base receives the first condenser portion of the heat pipe.

In yet another aspect of the disclosure, a housing having a first end and a second end, a first socket disposed at the first end, a second socket disposed at the second end, a spectrum mixing reflector, a first light assembly comprising a first base coupled to the housing and a second light assembly coupled to the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 16 is a front view of the circuit board in an unfolded manner.

FIG. 17 is a rear view of the circuit board in an unfolded manner.

FIG. 18 is a perspective view of the circuit board in a folded position.

FIG. 23A is a cross sectional view of the heat pipe.

FIG. 30 is a cross-sectional view of the light assembly of FIG. 26.

FIG. 32A is a perspective view of a light assembly that is coupled to a solar panel.

FIG. 32C is a cross-sectional view of the battery portion of the light assembly of FIGS. 32A and 32B.

FIG. 45B is a plot of the change in the in photosynthetically active radiation of light for a day up to 15:00.

FIG. 47 is a side view of the light fixture of FIG. 46.

Corresponding reference numerals indicate corresponding parts throughout the several views of the drawings.

DETAILED DESCRIPTION

Figure 1:
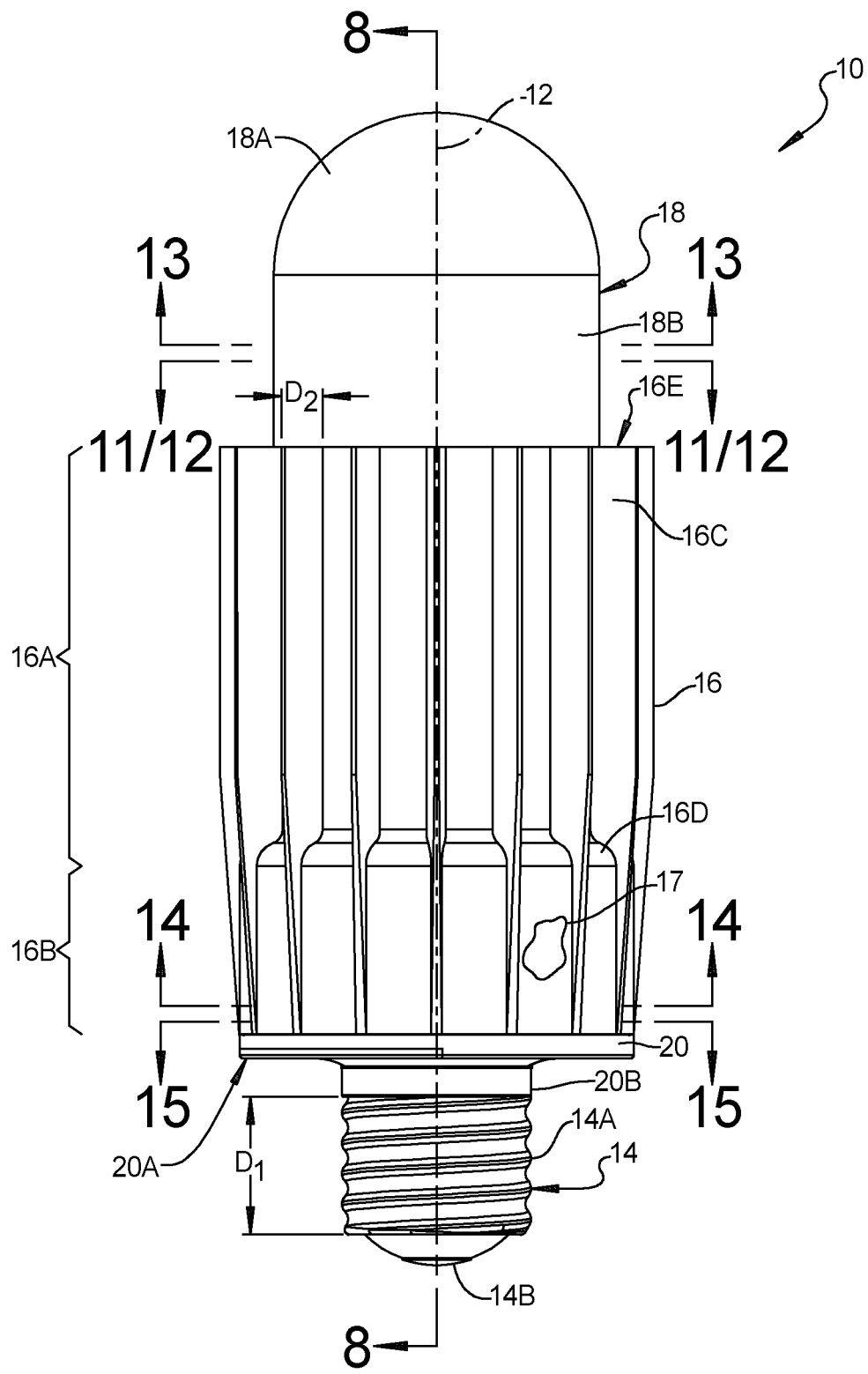
FIG. 1 is a side view of the light assembly according to the present disclosure.
Figure 2:
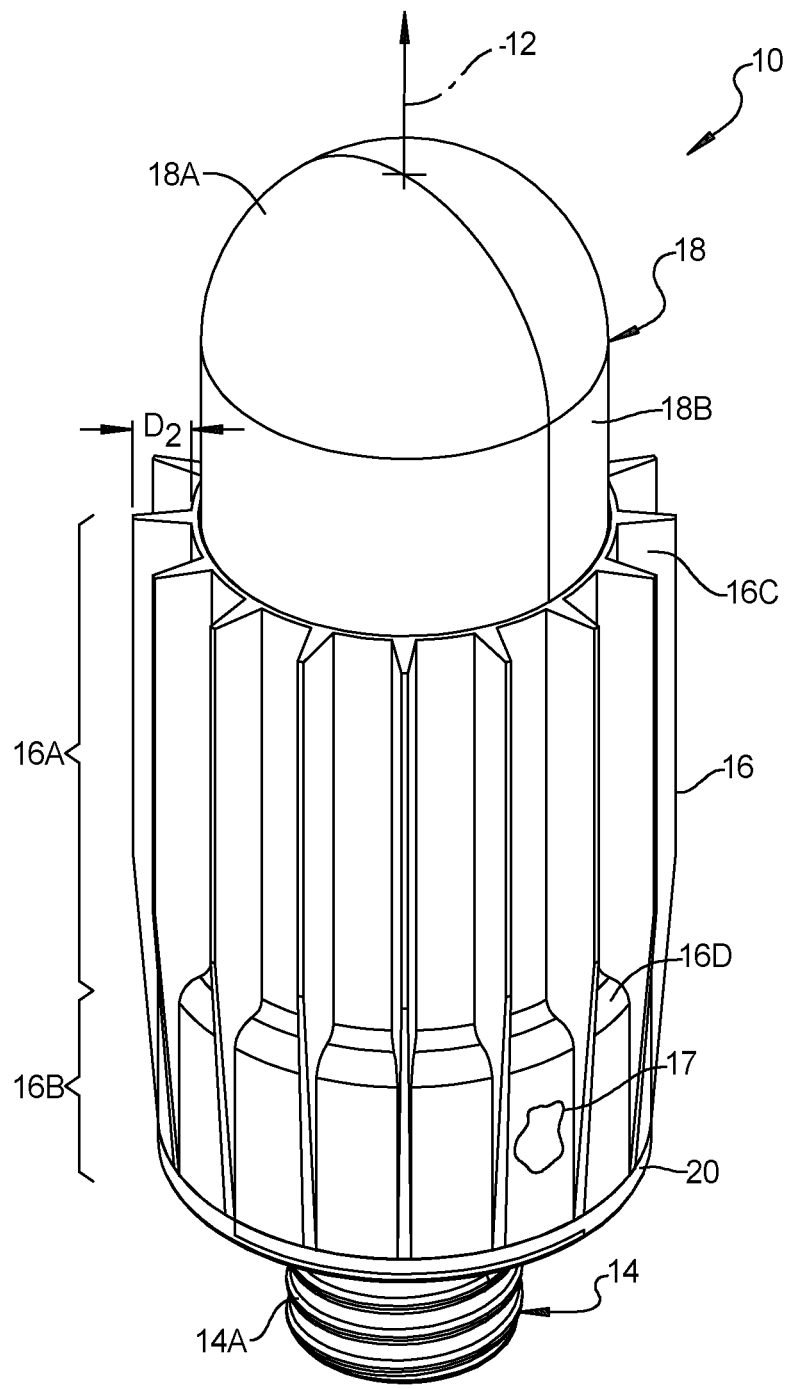
FIG. 2 is a perspective view of the light assembly.
Figure 3:
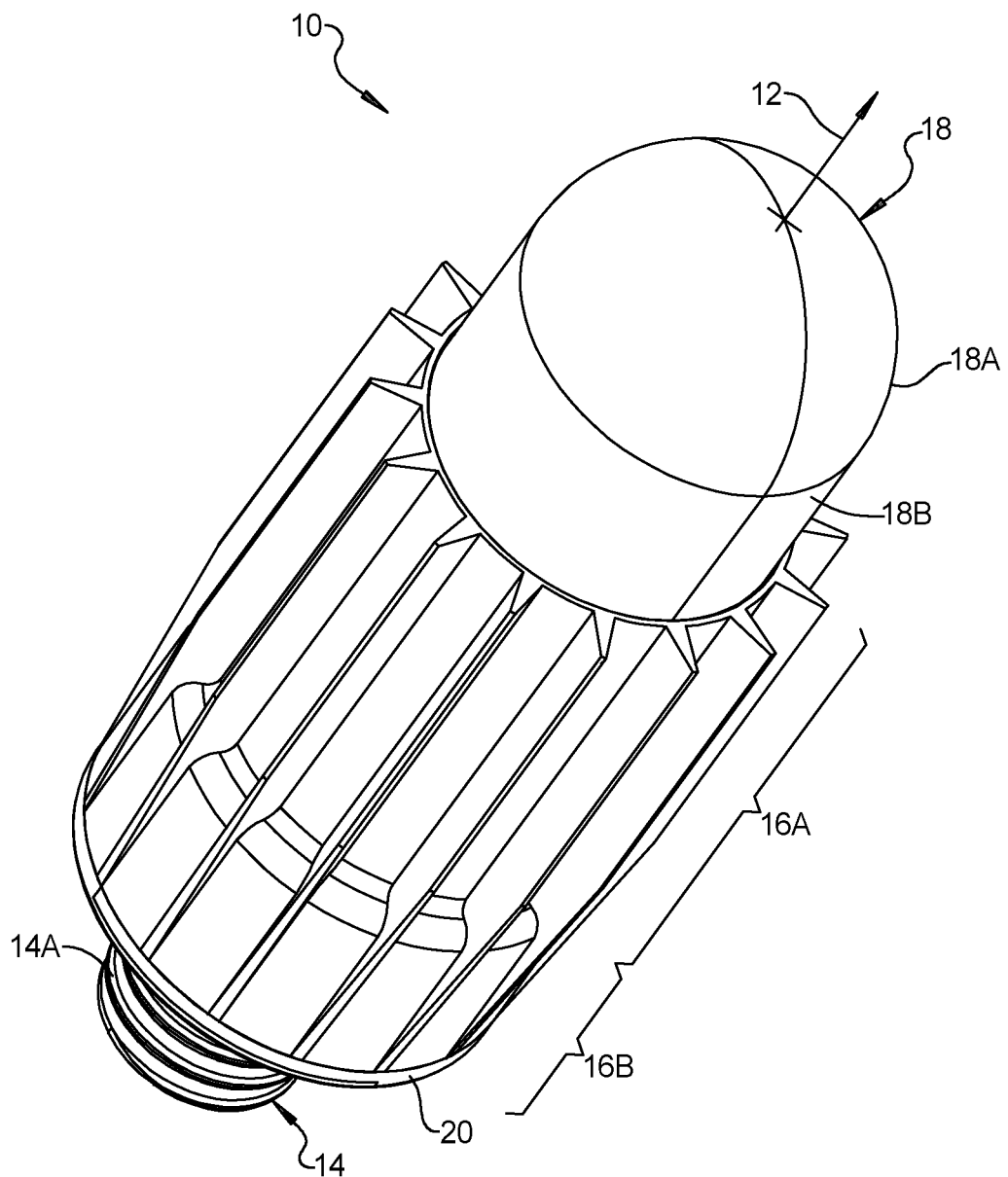
FIG. 3 is a side perspective view of the light assembly.
Figure 4:
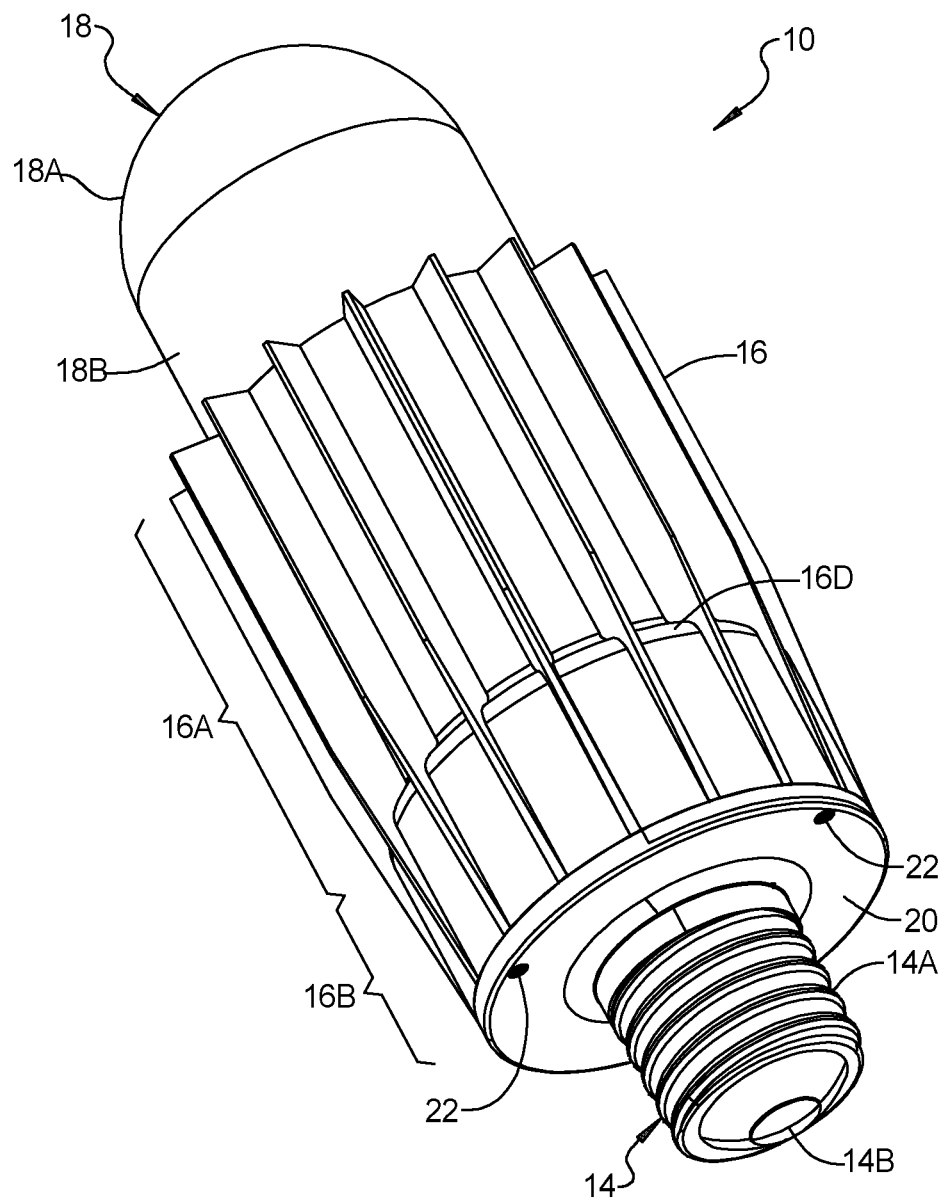
FIG. 4 is a bottom perspective view of the light assembly.
Figure 5:
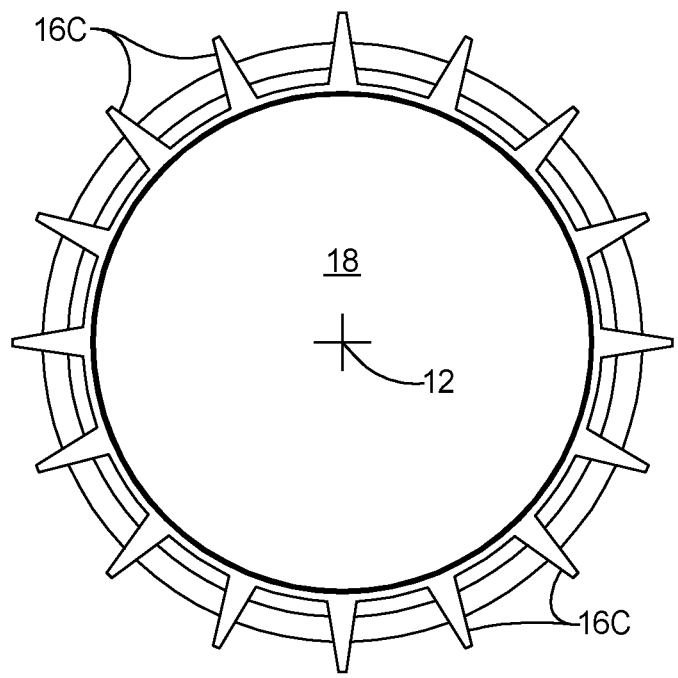
FIG. 5 is a top view of the light assembly.
Figure 6:
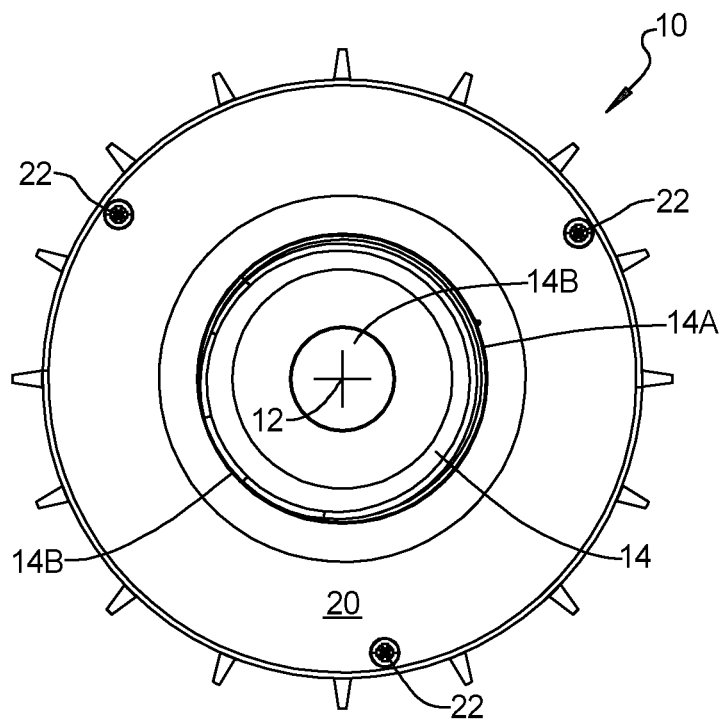
FIG. 6 is a bottom view of the light assembly.
Figure 7:
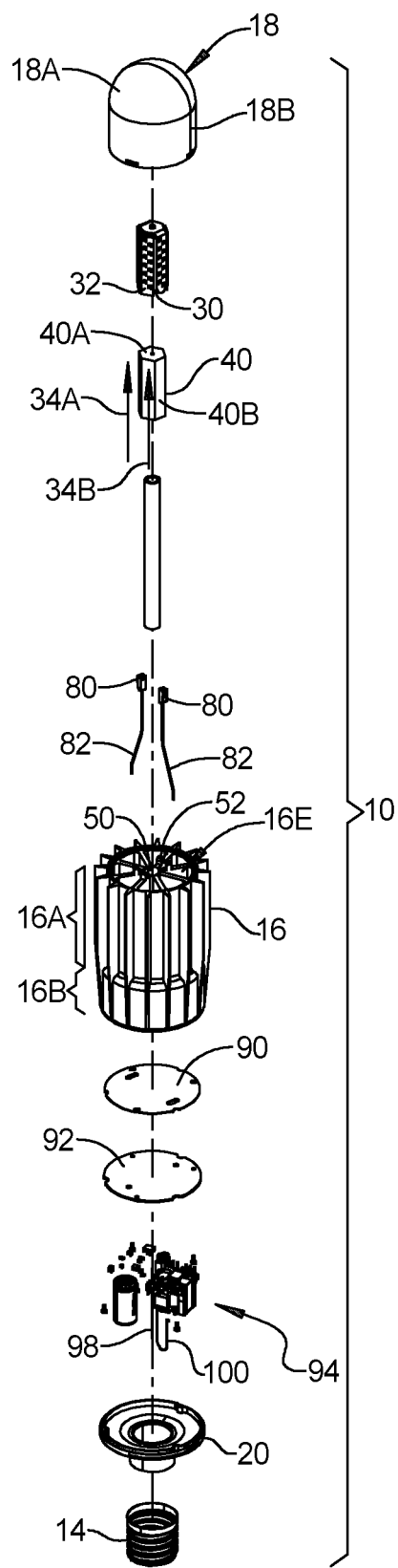
FIG. 7 is an exploded view of the light assembly.

The following description is merely exemplary in nature and is not intended to limit the present disclosure, application, or uses. For purposes of clarity, the same reference numbers will be used in the drawings to identify similar elements. As used herein, the phrase "at least one of A, B, and C" should be construed to mean a logical (A or B or C), using a non-exclusive logical OR. It should be understood that steps within a method may be executed in different order without altering the principles of the present disclosure.

It should be noted that in the following figures various components may be used interchangeably. For example, several different examples of control circuit boards and light source circuit boards are implemented. As well, various shapes of light redirection elements and heat sinks may also be used. Various combinations of heat sinks, control circuit boards, light source circuit boards, and shapes of the light assemblies may be used. Various types of printed traces and materials may also be used interchangeably in the various examples of the light assembly.

In the following figures, a lighting assembly is illustrated having various examples that include solid state light sources such as light-emitting diodes (LEDs), organic light-emitting diodes (OLED) and solid state lasers with various wavelengths. Different numbers of light sources and different numbers of wavelengths may be used to form a desired light output depending upon the ultimate use for the light assembly. Visible light in various wavelengths may be generated. Likewise, non-visible wavelengths may be used alone or in combination with the visible wavelengths. UVA, UVB, deep red, and near and far infrared may be used for various environments. For example, agricultural lights may have different wavelengths depending on the type of plants and growth conditions. The light assembly provides an opto-thermal solution for a light device and uses multiple geometries to achieve the purpose.

Referring now to FIGS. 1-15, a cross-section of a light assembly 10 is illustrated. Light assembly 10 may be rotationally symmetric around a longitudinal axis 12. The light assembly 10 includes a lamp base 14, a heat sink housing 16, and a cover 18.

The lamp base or base 14 is used for providing electricity to the bulb. The base 14 may have various shapes depending upon the application. The shapes may include a standard Edison base, or various other types of larger or smaller bases. The base 14 may be various types including screw-in, clip-in or plug-in. The base 14 may be at least partially made from metal for making electrical contact and may also be used for thermal heat conduction and dissipation. The base 14 may also be made from material not limited to ceramic, thermally conductive plastic, plastic with molded circuit connectors, or the like.

The heat sink housing 16 is adjacent to the base 14. The heat sink housing 16 may be directly adjacent to the base 14 or have an intermediate portion therebetween. The heat sink housing 16 may be formed of a metal or other heat-conductive material. One example of a suitable metal is aluminum. The heat sink housing 16 may be formed in various ways including stamping. Another way of forming the heat sink housing 16 includes injected-molded metals such as Zylor® or Thicksoform® molding may also be used.

The heat sink housing 16 includes a heat sink portion 16A, a housing portion 16B and fins 16C that extend in a longitudinal direction on the outer surface of the heat sink 16. The heat sink portion 16A will be described in further detail below. In general, the heat sink portion 16A is formed from a plurality of radially extending walls. The housing portion 16B is used to house the control circuitry as will be described in more detail below. The heat sink portion 16A and the housing portion 16B may be separate portions affixed together. However, the heat sink portion 16A and housing portion 16B may be intricately formed or intricately molded. The fins 16C may extend on the outside of both the heat sink portion 16A and the housing portion 16B. A coating 17 may be disposed on the outside of the heat sink assembly including the heat sink portion 16A, the housing portion 16B and the fins 16C. The coating 17 may be formed of a heat conductive material such as nickel coated and high emissivity coatings.

The housing portion 16B may enclose the electronic drive circuitry with a PC board holder 20. The PC board holder 20 may be formed of Zylor® or Thicksoform®, nylon, polycarbonate or thermal plastic with thermally conductive additives that are not electrically conductive. The diameter of the heat sink portion 16A may be less than the diameter of the housing portion 16B. Thus, a radius portion 16D may be used to connect the heat sink portion 16A and the housing portion 16B. The fins 16C are triangular in cross-sectional area. The fins 16C have a width that narrows as the distance from the outer surface of the heat sink 16 increases. The depth $D_2$ of the fins 16C corresponds to the amount or distance that the fins 16C extend from the surface of the heat sink 16. In this example, the fins 16C extend about 12 mm from the housing portion 16A of the heat sink 16. The depth $D_2$ decreases at about the position of the radius portion 16D. It has been found that less heat radiation is required in the area of the housing portion 16B. The depth $D_2$ is narrowed by the larger diameter of the housing portion 16B and a taper in the fins 16C.

Referring now to FIG. 7, and FIGS. 8A-8C, an exploded view and a respective cross-sectional view of the light assembly 10 are set forth.

Figure 33:
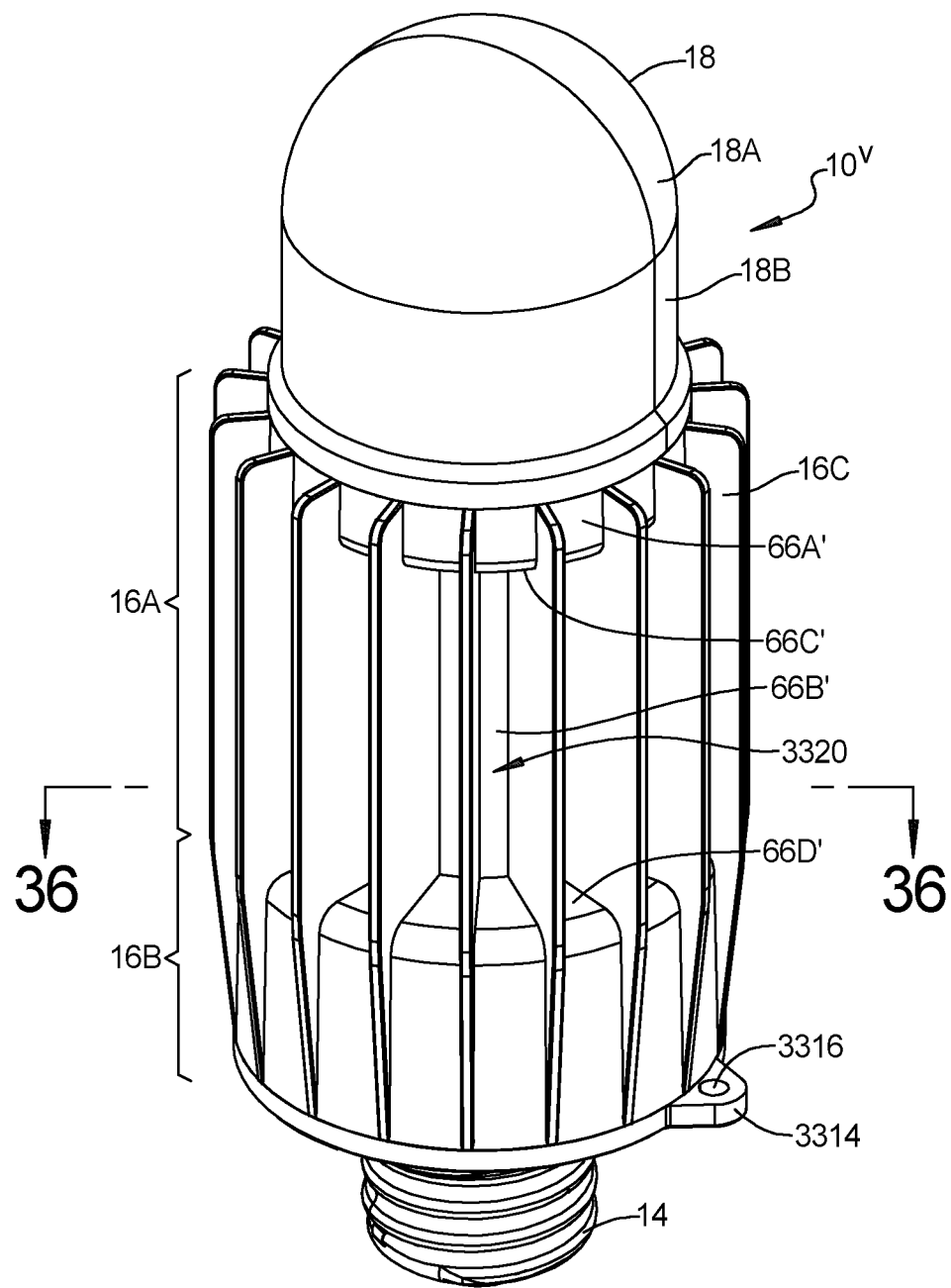
FIG. 33 is a perspective view of another example of a light assembly.
Figure 34:
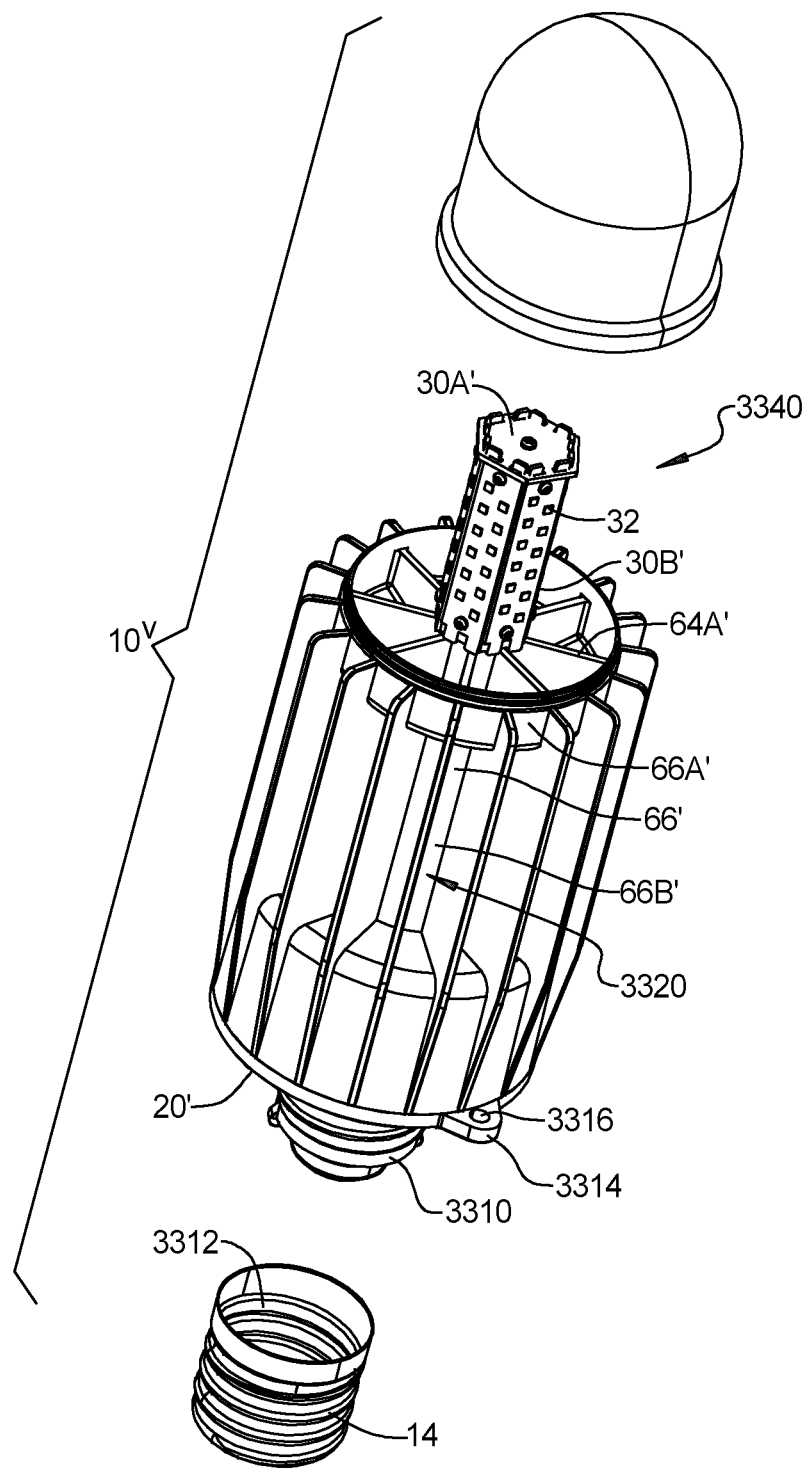
FIG. 34 is a partially-exploded view of the light assembly of FIG. 33.
Figure 35:
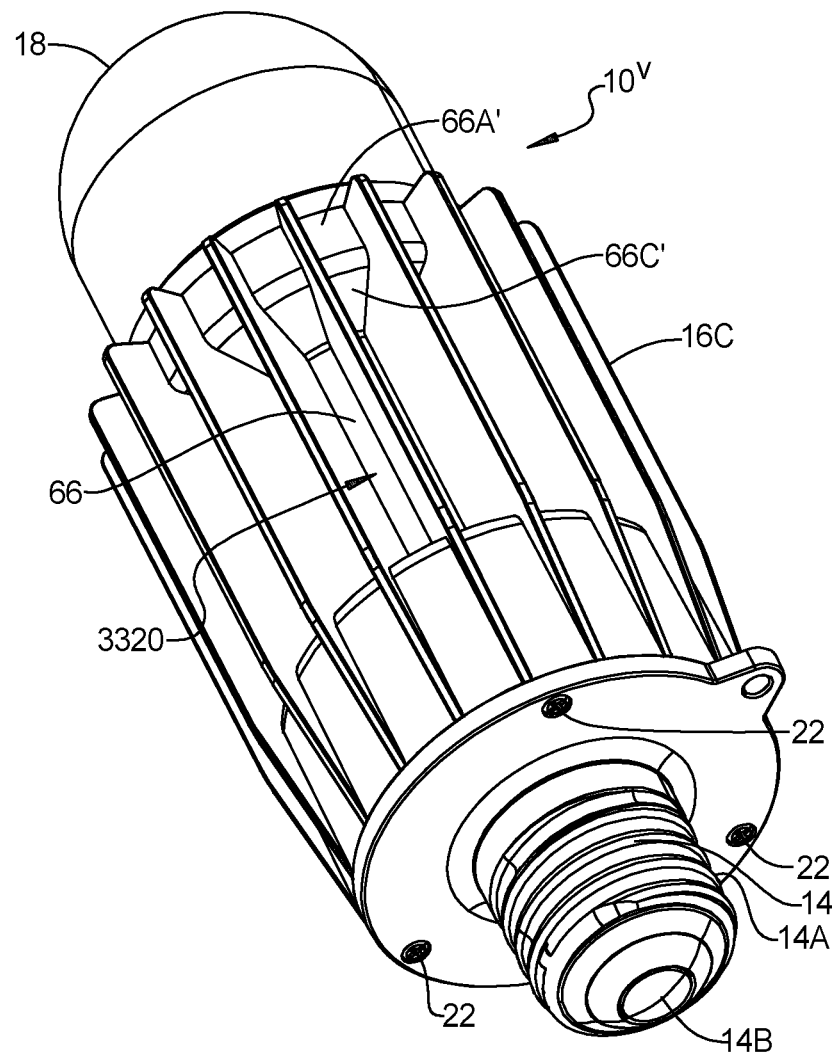
FIG. 35 is a perspective view of the light assembly of FIG. 33.
Figure 36:
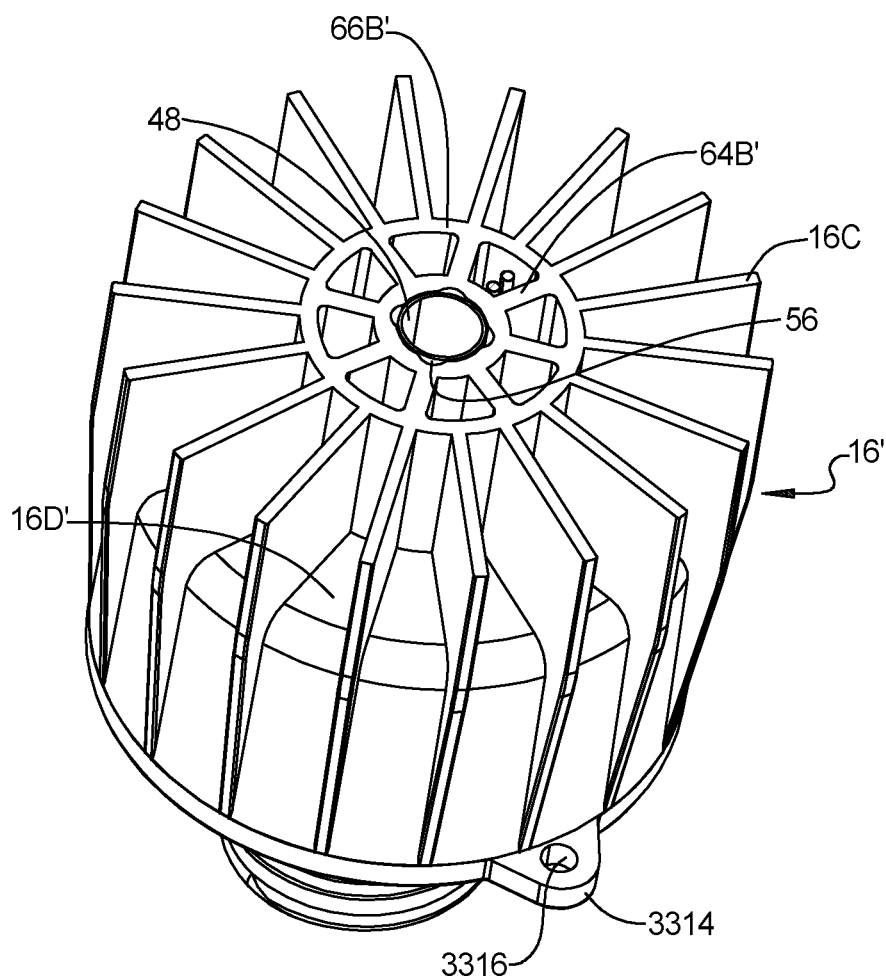
FIG. 36 is a partial cross-sectional view of the light assembly of FIG. 33.
Figure 37:
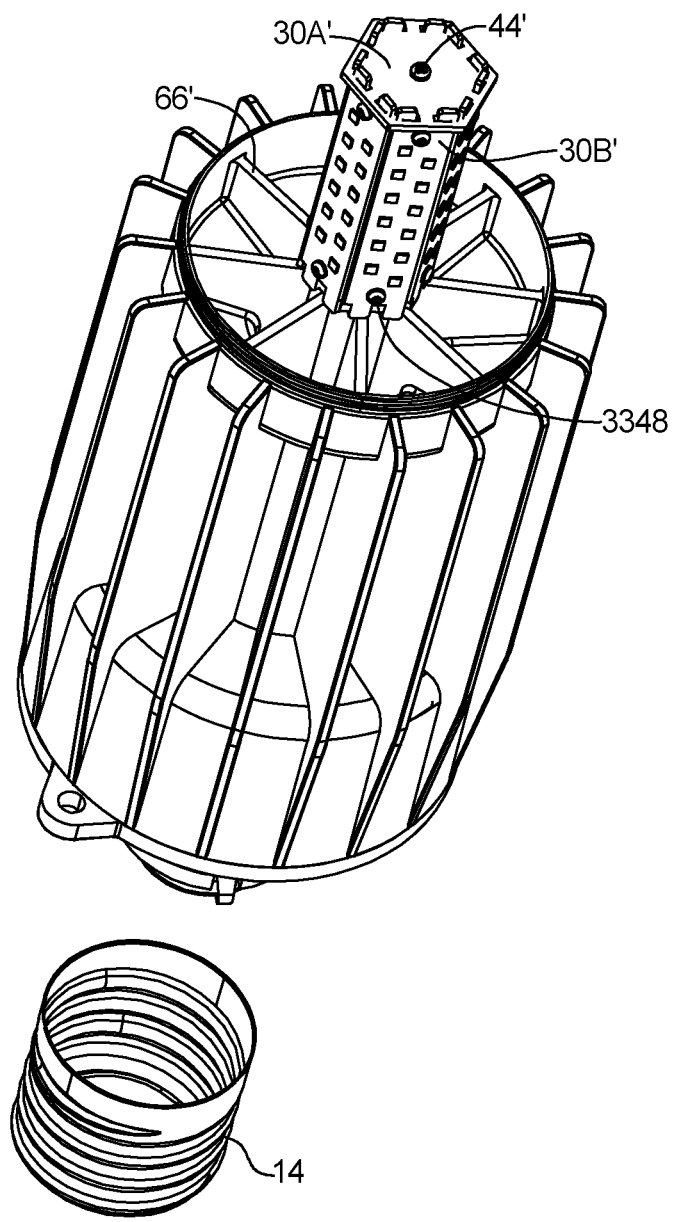
FIG. 37 is a partially-exploded view with the cap removed illustrating the coupling of the light assembly.

As mentioned above, an intermediate portion may be disposed between the heat sink housing 16 and the base 14. In this example, a printed circuit board holder 20 is disposed therebetween. The printed circuit (PC) board holder 20 may be formed from a non-electrically conductive material. The PC board holder 20 will be described in more detail below. A first diameter portion 20A of the PC board holder 20 may be secured to the heat sink housing 16 using fasteners 22. In this example, fasteners 22 may be implemented as screws. A second diameter portion 20B has a diameter less that the diameter of the first diameter portion 20A. The second diameter portion 20B has the base 14 secured thereon. The base 14 includes a first electrical conductor 14A and a second electrical conductor 14B. As is illustrated, the first electrical conductor 14A extends a distance $D_1$ in an axial direction on the outside of the base 14. In this example, the base 14 is an Edison base type E39 in which electrical conductor 14B provides power to the light assembly 10 while electrical conductor 14A provides a return path. Of course, different configurations of bases 14 may include different types of electrical conductors. In this example, the second portion of the printed circuit board holder 20 is smooth or flat. The outer surface of the second diameter portion 20B of the printed circuit board holder 20 may also have threads molded thereon as is set forth below in FIG. 33.

The cover 18 may be a partial spheroid or ellipsoid in shape. In this example, the cover 18 includes a hemispherical portion 18A and a cylindrical portion 18B with the same diameter as the spherical portion 18A. In this example, the cylindrical portion 18B is coupled to the heat sink housing 16 as will be described in further detail below.

The cover 18 may be formed of a transparent or translucent material such as glass or plastic. The cover 18 may be designed to diffuse light and minimize backscattered light trapped within the light assembly. The cover 18 may be coated with various materials to change the light characteristics such as wavelength or diffusion. An anti-reflective coating may also be applied to the inside of the cover 18. A self-radiating material may also be used which is pumped by the light sources. Thus, the light assembly 10 may be formed to have a high color rendering index and color perception in the dark. The heat sink housing 16 and cover 18 form an enclosure around the light sources as is further described below. The base 14 may also be included as part of the enclosure.

The light assembly 10 includes a substrate or circuit board 30 used for supporting solid state light sources 32. The circuit board 30 may be planar, multi-planar (as illustrated and described in detail below) or curved. In the present example the circuit board 30 is multi-planar, in that the circuit board 30, originates as a planar circuit board and is bent to the desired shape with the desired amount of sides. A circular or one sided cross-sectional shape or polygonal cross-sectional shape may be used. In the present example, the final shape is hexagonal having a hexagonal end or central side 30A and plurality of rectangular sides 30B that extend from the central side 30A. Although a hexagon is used in the present example, many different types of polygonal shapes such as triangular, quadrilateral, pentagonal, octagonal, and so on may be used. Further, a cylindrical circuit board 30 may also be formed with one side in cross section. The circuit board 30 may be thermally conductive and may also be made from heat sink material or heat conductive material. Solder pads of the light sources 32 may be thermally and/or electrically coupled to electrically conductive elements. The circuit board 30 is ultimately electrically coupled to the heat sink housing 16.

The light sources 32 have a high lumen-per-watt output. The light sources 32 may generate the same wavelength of light or may generate different wavelengths of light. The light sources 32 may also be solid state lasers. The solid state lasers may generate collimated light. The light sources 32 may also be light-emitted diodes. A combination of different light sources generating different wavelengths, which may be visible or invisible, may be used for obtaining a desired spectrum. Examples of suitable wavelengths include ultraviolet or blue (e.g. 450-470 nm). Multiple light sources 32 generating the same wavelengths may also be used.

In the present example, the light sources 32 are disposed in a plurality of rows 34A, 34B on the plurality of rectangular sides 30B. The rows 34A, 34B are offset and spaced apart to reduce the concentration of heat from the light sources 32 and increase the distribution of heat. The number of rows depends on the desired light output. One row or many rows may be used. That is, the circuit board 30 is formed or disposed directly adjacent to a bar 40. Thus, a first axial end 40A of the bar 40 is essentially surrounded or wrapped by the central side 30A and the rectangular sides 30B. A thermally conductive material 42 such as but not limited to thermally conductive grease is disposed between the circuit board 30 and the bar 40 to facilitate heat conduction therebetween. All of the rectangular sides 30B of the circuit board 30 may not have light source 32 disposed thereon. Further, the central side 30A may also incorporate light source 32 thereon. In some applications light directed in certain direction may not be required. Thus, some lights sources 32 may be eliminated. The radiation pattern for each of the light sources 32 may also vary.

Different sides 30B may have light sources 32 that generate different spectrums. In one constructed example, a six sides 30B are used with three of the sides emitting a first spectrum and three sides emitting a second spectrum, different than the first spectrum. Examples of the first spectrum and the second spectrum are illustrated in FIG. 45. The first spectrum and the second spectrum have different characteristics in the red and blue areas of the spectrum. All of the light sources 32 may be a same type of light source such as (Indium Gallium Nitride) InGaN. In other examples different light sources may be different types such as Aluminum Nitrogen, Gallium Phosphorus (AlNGaP). As will be described in more detail below, a fixture may use more than one light assembly, each light assembly may use different types of light sources.

A fastener 44 may disposed through the central side 30A may be used to couple the circuit board 30 to the axial end 40A of the bar 40. In this example, the fastener 44 is a screw. A pilot hole may be pre-drilled into the axial end 40B to receive the fastener 44. Fastener 44 in the central side 30A may be eliminated in various examples such as in FIG. 8C.

The bar 40 has a bore 46 in a second axial end 40B that is sized to receive a heat pipe 48. The bore 46, in this example, extends axially into the bar 40 but is shorter than the distance to the first axial end 40A. The heat pipe 48 has an evaporation portion 48A and a condenser portion 48B. In this example, the evaporator portion 48A is located at the first end of the bar 40 and the condenser portion 48B is located within a bore 50 of an inner wall 52 of the heat sink housing 16. The operation of the heat pipe 48 will be described in more detail below. When the heat pipe 48 is fully inserted into the heat sink housing 16, a gap 54 is formed between the second end 40B of the bar 40 and the upper surface 16E of the heat sink housing 16. A first thermal contact area is the area of the heat pipe 48 that is used for receiving thermal energy from the light sources. This corresponds to the area of contact between the bar 40 and the heat pipe 48. A second thermal contact area is the area used for emitting thermal energy from the condenser end 48B. This corresponds to the contact area of the bore 50 of the heat sink housing 16 in contact with the heat pipe 48. The first thermal contact area is less than the second thermal contact area.

An alternative configuration includes removing the bar 40 and placing the light sources directly on or against the heat pipe 48.

The bore 46 of the bar 40 may include channels 56. The channels 56 are longitudinal and extend into the bar 40 a greater diameter than the bore 46. The channels 56 may be filled with a thermally conductive material so that when the heat pipe 48 is inserted therein, the thermally conductive material within the channels 56 is distributed to the outer surface of the heat pipe 48. In this example, four channels are used. In one example, enough thermally conductive material is placed within each of the channels 56 and the heat pipe 48 is slightly rotated one quarter of a turn so that the outer surface of the heat pipe 48 is coated with the thermally conductive material disposed within the channels 56.

An end surface 16E of the heat sink housing 16 has a channel 60 that is used to receive the cover 18. In particular, the cylindrical portion 18B of the cover 18 is received within the channel 60. An engagement feature 62 may be disposed on the outer surface or a portion of the outer surface of the cover 18. The engagement feature 62 engages the channel 60 to snap fit the cover 18 onto the heat sink housing 16. In addition, adhesive may be used within the channel 60 or on the cover 18 to secure the cap to the channel 60 of heat sink housing 16. When the channel 60 is not present, adhesive may be disposed between the heat sink 16 and the cover 18 to secure the cover 18 to the heat sink 16.

Figure 9:
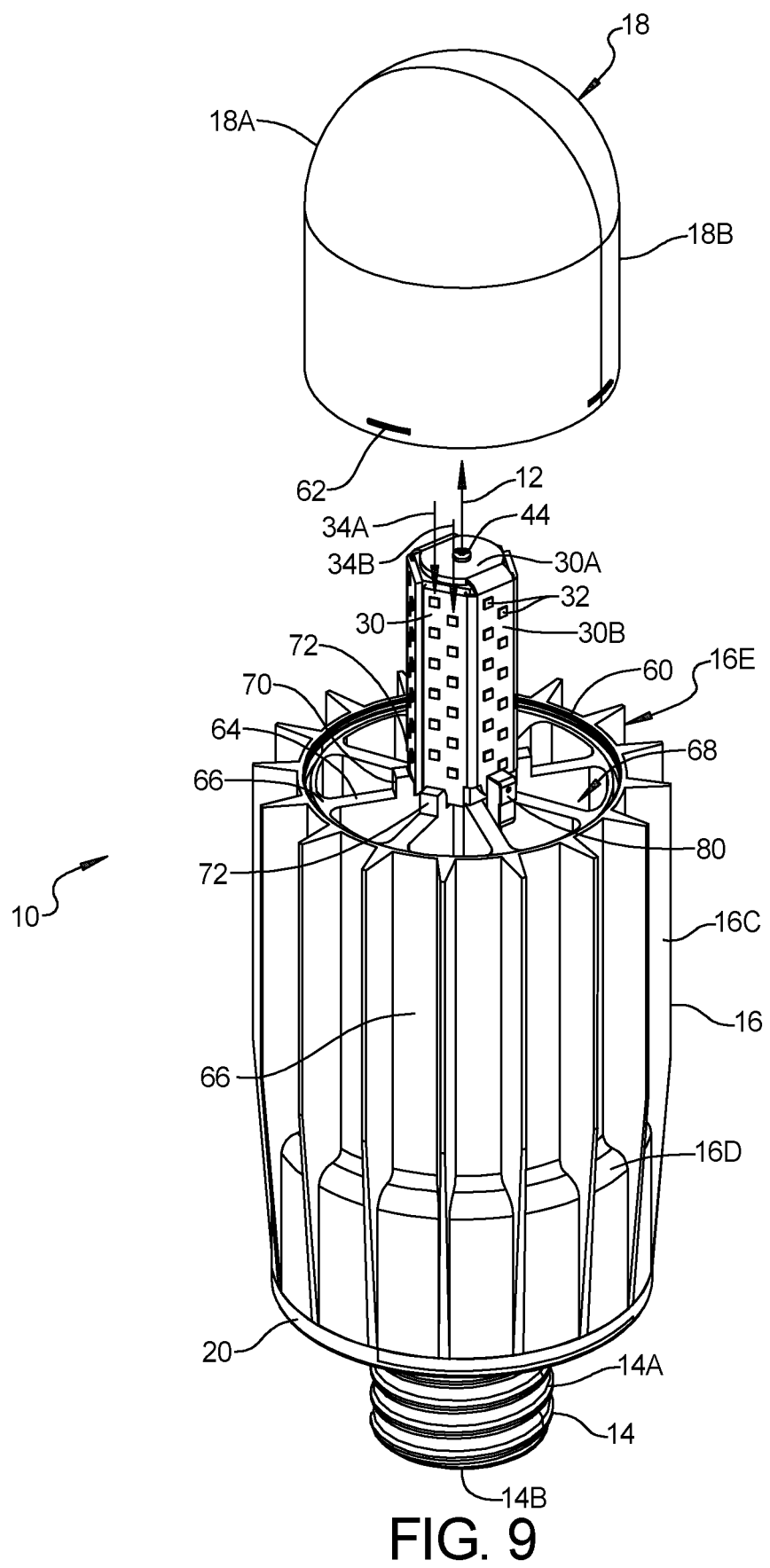
FIG. 9 is partially exploded view with the cover off.
Figure 10:
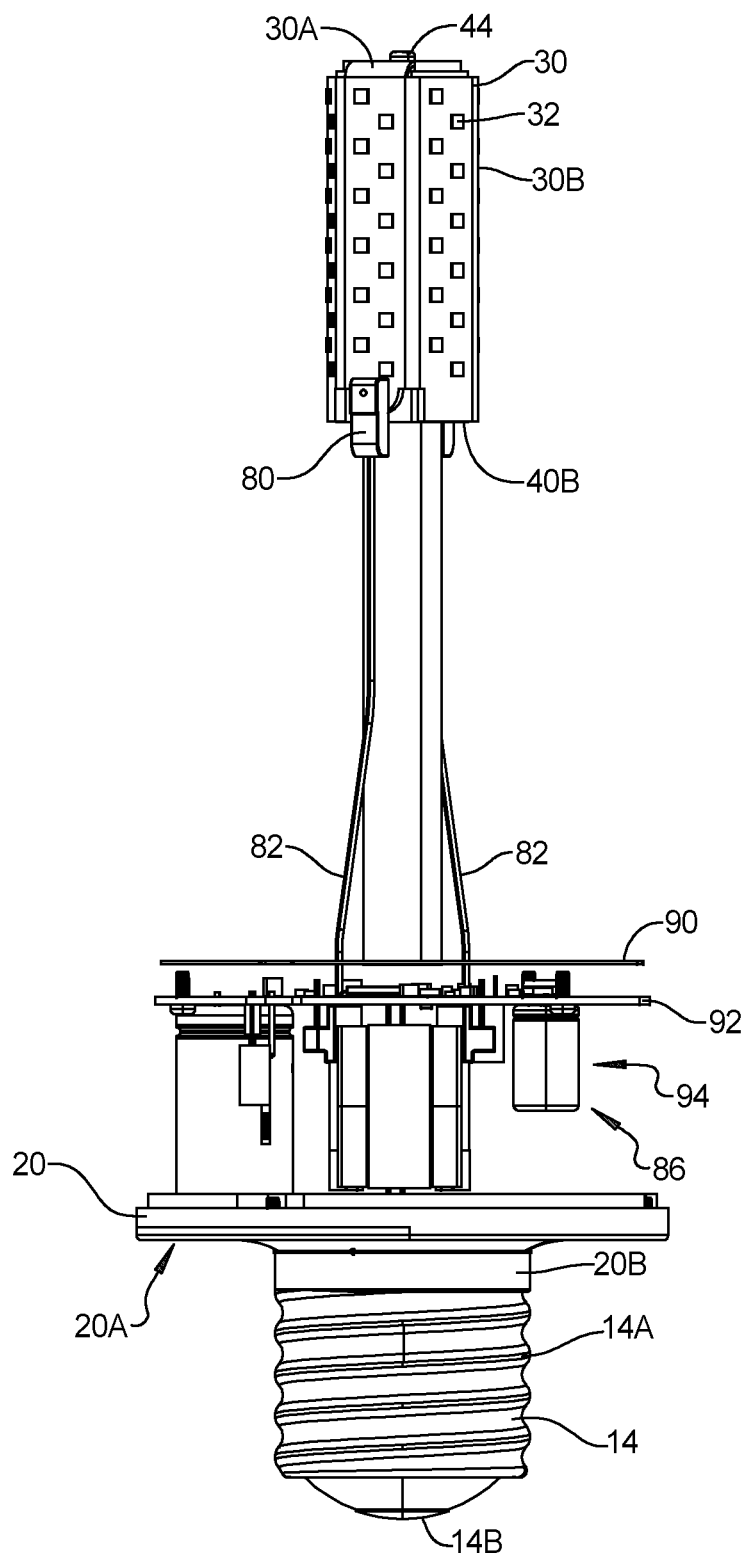
FIG. 10 is a partially exploded view having the heat sink housing and the cover removed from the system.
Figure 11:
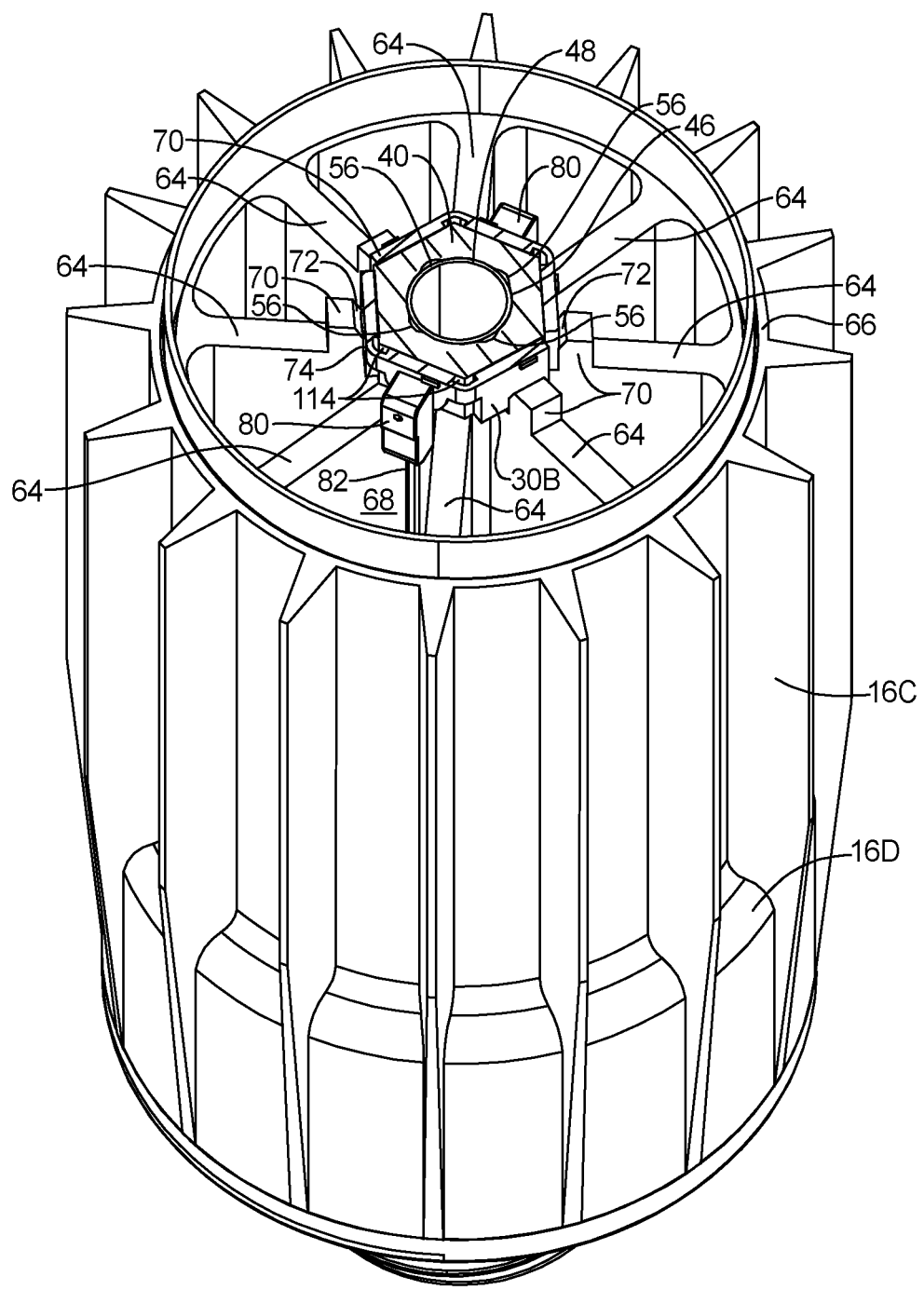
FIG. 11 is a cross-sectional view of the upper portion of the light assembly.

The heat sink housing 16, as is best illustrated in FIGS. 9 and 11, has a plurality of radially extending walls 64. In this example, eight radially extending walls 64 are provided. The radially extending walls 64 each terminate in an outer wall 66. The outer wall 66 extends around the periphery of the heat sink housing 16. The outer wall 66, the inner wall 52 and the radially extending walls 64 define air channels 68 therein. The air channels 68 allows the heat sink housing 16 to cool. Although eight air channels 68 and eight radially extending walls 64 are illustrated, various numbers of radially extending walls 64 and air channels 68 may be provided. The distribution of the outer walls 66 and the size and thickness of the walls may be experimentally determined based upon various types of design considerations such as the number of and the heat output of the light sources 32.

Figure 12:
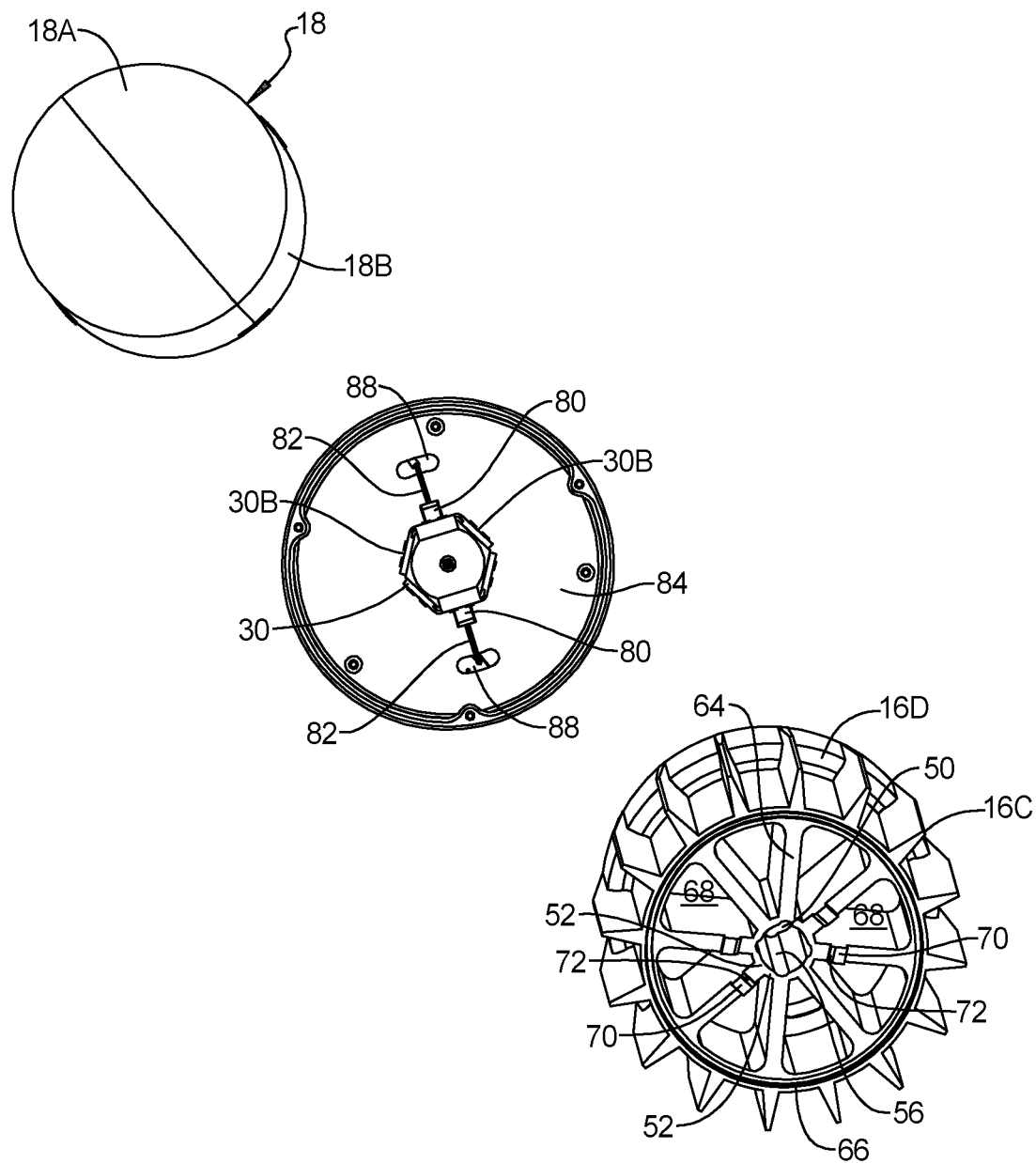
FIG. 12 is a cross-sectional view of the light assembly with the heat sink removed to reveal some of the inner portions.
Figure 13:
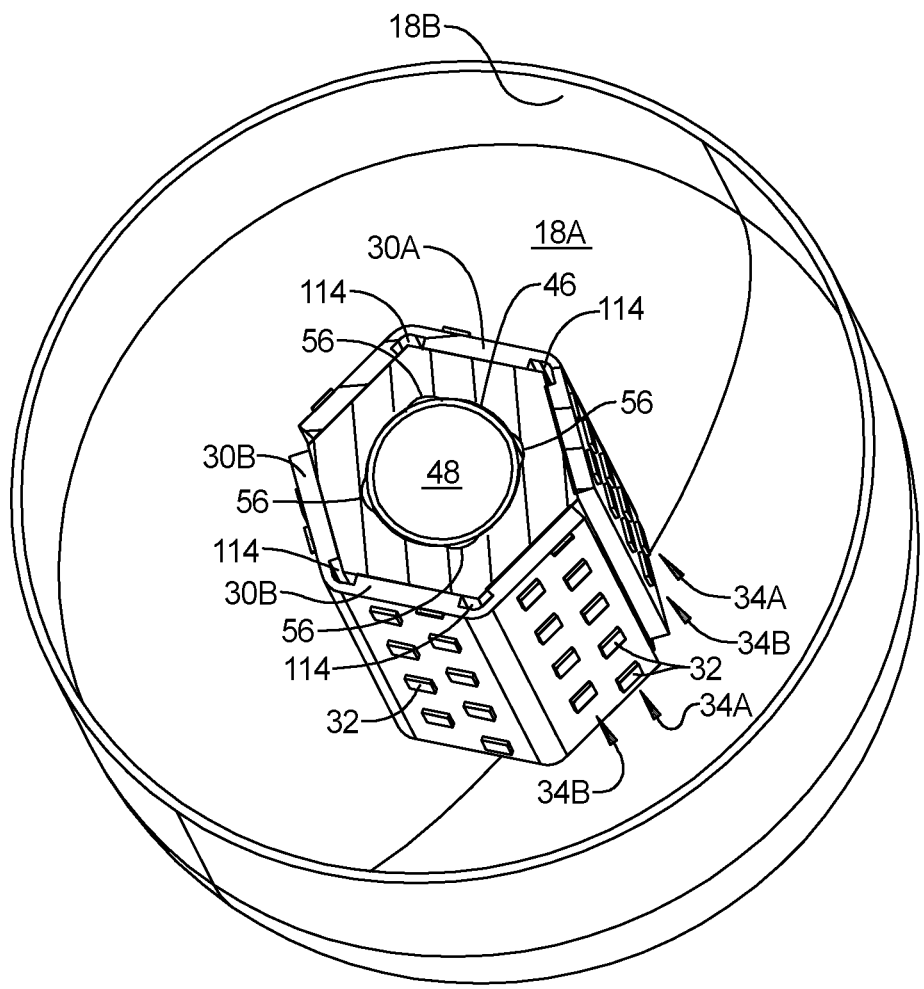
FIG. 13 is a cross-sectional view of the light assembly illustrated toward the cover thereof.
Figure 14:
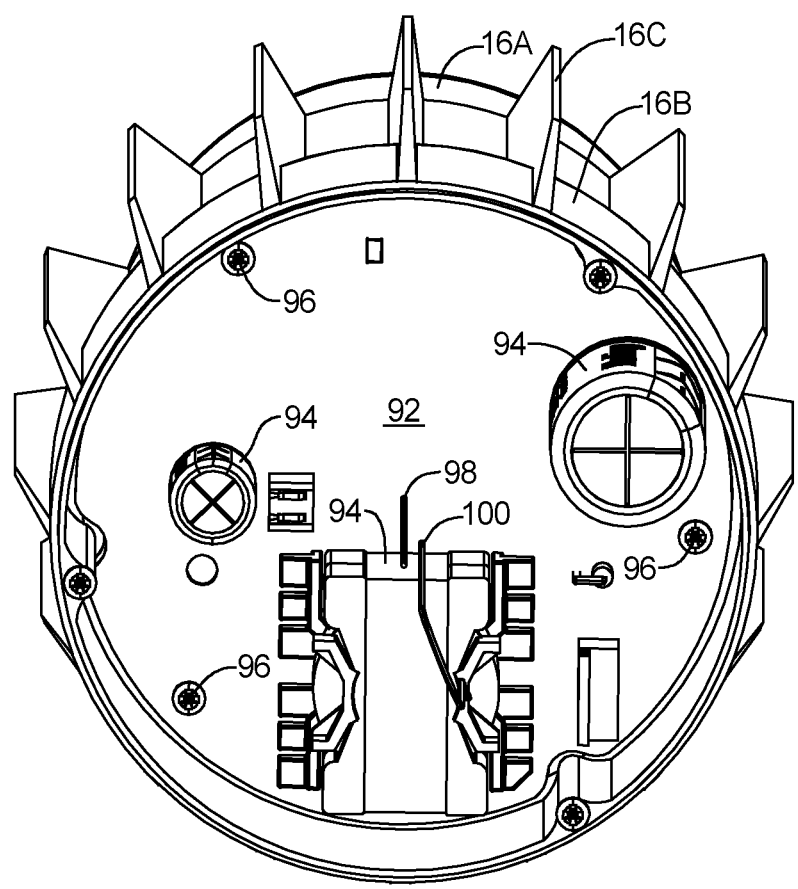
FIG. 14 is cross-sectional view of the housing portion of the light assembly.

To prevent the folded rectangular sides 30B from being urged away from the bar 40, a plurality of retainers 70 are formed on one or more of the radially extending walls 64. In this example, four retainers 70 are provided. The retainers 70 are disposed adjacent to four of the rectangular sides 30B. It has been experimentally found that using four retainers 70 is sufficient to allow all the rectangular sides 30B to be urged against the bar 40. The retainers 70 may include a ramped surface 72 which allows the rectangular sides 30B to be urged toward the bar 40 during assembly of the circuit board 30 onto the bar 40. The ramped surface 72 may terminate in a vertical surface 74 so that the rectangular sides 30B remain in a fixed and desirable position against the bar 40. In the present example, a hexagon was formed. The hexagon has two sides that do not have retainers 70. Connectors 80 are coupled to conductors of extension portions of two of the rectangular sides 30B (as shown below) that do not have a retainer 70 associated therewith. The connectors 80 have connection wires 82 that are communication with the drive circuitry (control components 94) as will be described in more detail below. The connection wires 82 are disposed within opposite air channels 68. In FIG. 12, the heat sink housing 16 was removed from the assembly to show the position of the connection wires 82 and the connector 80 relative to the rectangular sides 30B.

Between the heat sink portion 16A and the housing portion 16B, a wall 84 is disposed therein. The wall 84 separates the air channels 68 from the drive circuitry volume 86. Two ports 88 are disposed through the wall 84 so that the connection wires 82 pass from the air channels 68 into the drive circuitry volume 86. The insulator 90, in this example, is generally circular in shape and is disposed against the lower surface of the wall 64 within the drive circuitry volume 86.

The drive circuitry volume 86 is used to house a control circuit board 92 having control components thereon. The control circuit board 92 is illustrated as planar and circular. Different examples of the circuit board 92 may be implemented, such as a cylindrical or longitudinally-oriented circuit board. The circuit board 92 may be various shapes. The control circuit board 92 may include various control chips or components 94 that may be used for controlling various functions of the light sources 32. The control components 94 may include an alternating current to direct current converter, a dimming circuit, a remote control circuit, discrete components such as resistors and capacitors, and a power circuit. The various functions may be included on an application-specific integrated circuit. Although only one control circuit board 92 is illustrated, multiple circuit boards may be provided within the light assembly 10.

A plurality of fasteners 96 may be used to secure the control circuit board 92 to the heat sink housing 16. In particular, the fasteners 96 may be used to secure the control circuit board 92 to the wall 84 of the heat sink housing.

Figure 15:
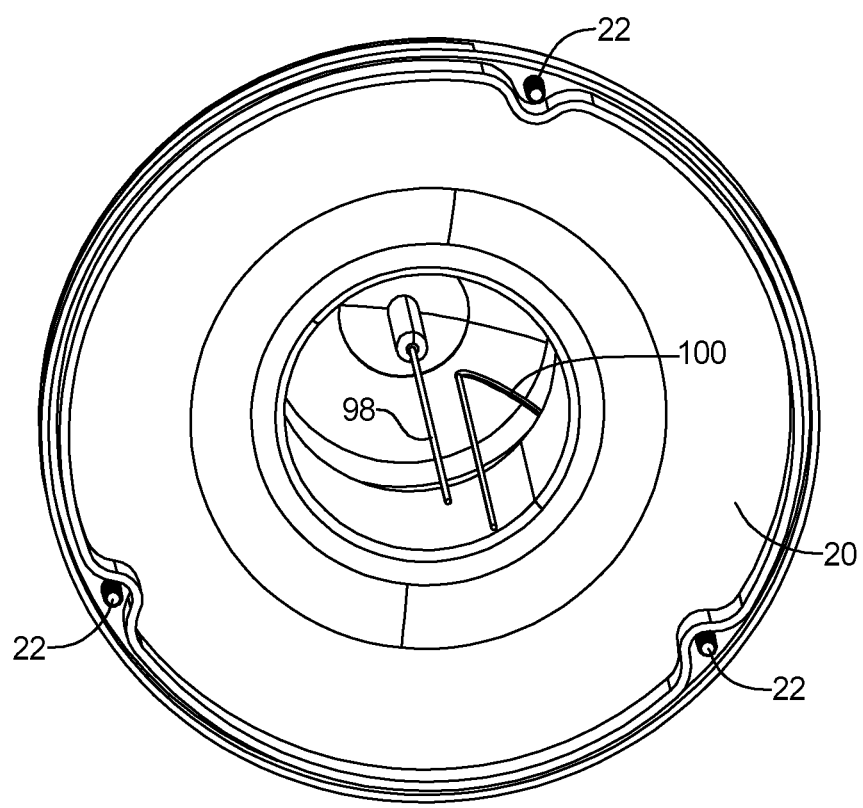
FIG. 15 is a cross-sectional view of the housing portion 16B toward the bottom of the light assembly.

The control components 94 and in particular the control circuit board 92, may be in communication with the first conductor 98 and a second conductor 100. The first conductor 98 is in electrical communication with the conductor 14B of the lamp base 14. Conductor 100 is in communication with the conductor 14A of the lamp base 14. The conductors 98 and 100 are best illustrated in FIG. 15.

Figure 8A:
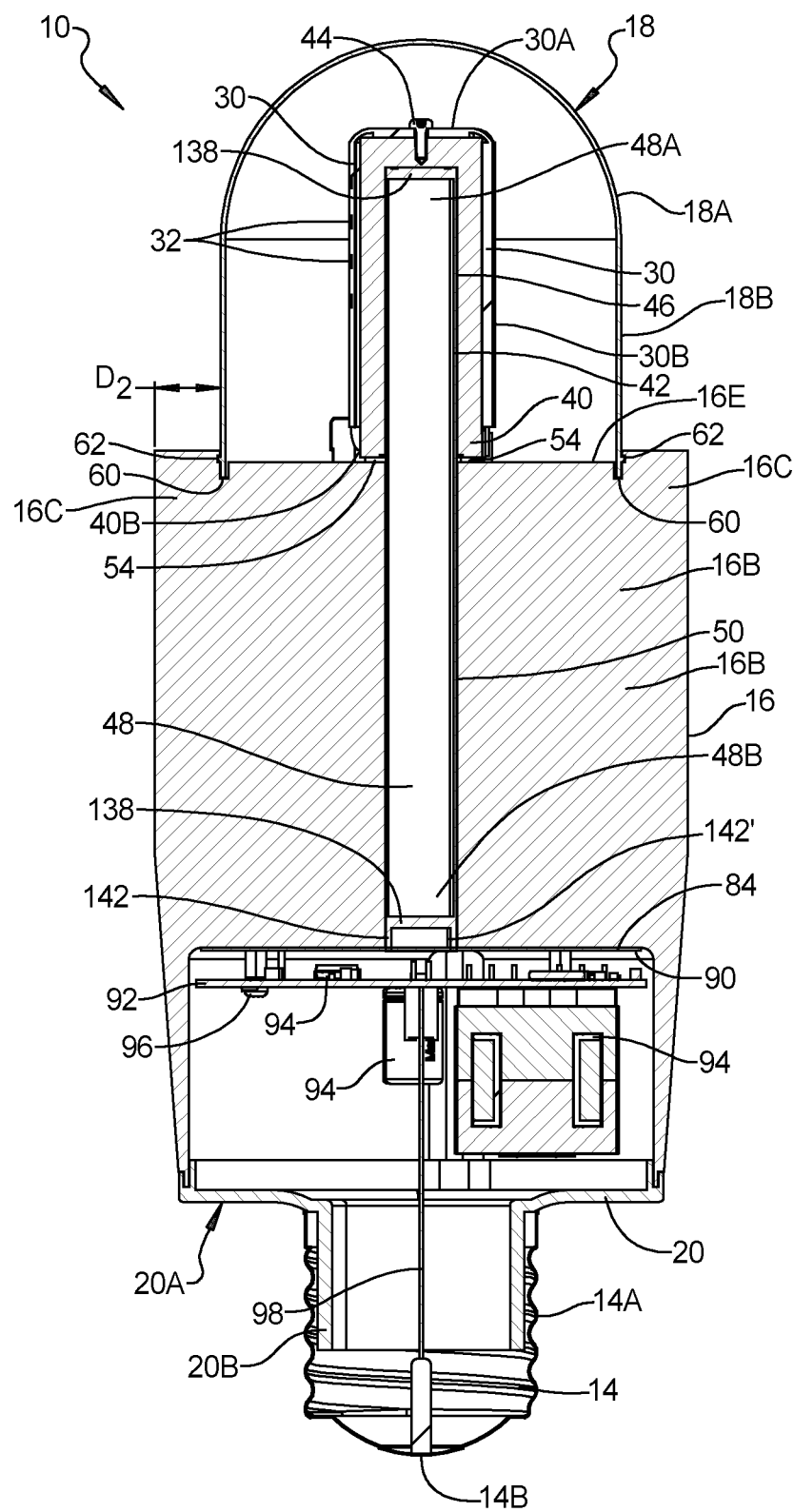
FIG. 8A is a cross-sectional view of the light assembly.
Figure 8B:
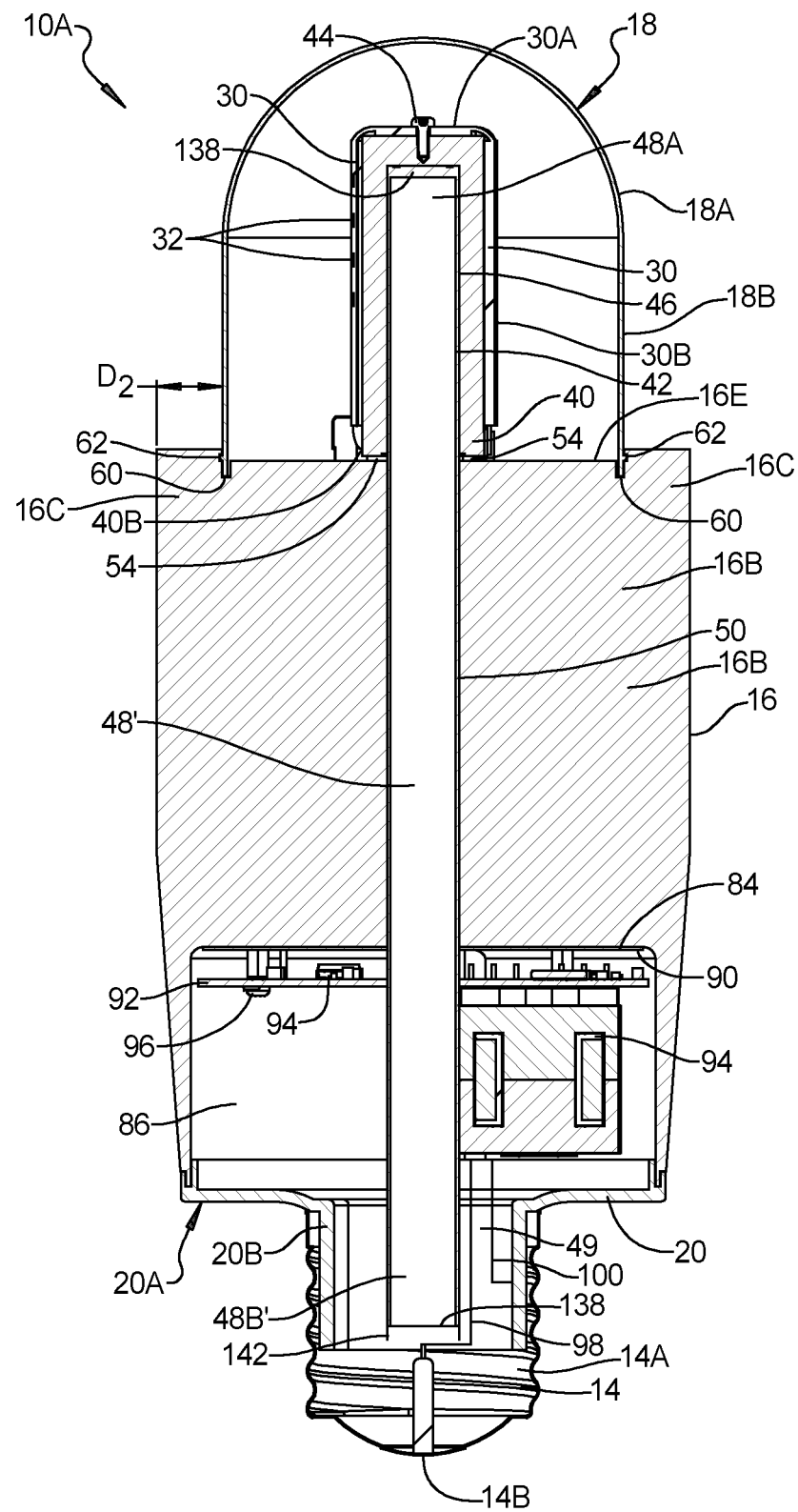
FIG. 8B is a cross-sectional view of an alternate configuration for a light assembly having an elongated heat pipe.

Referring now to FIG. 8B, an alternative cross-sectional view of a light assembly 10A is set forth. In this example, the heat pipe 48' extends a further longitudinal distance toward the base than that set forth above. In the prior example, the condenser end 48B of the heat pipe 48 ends within the heat sink portion 16A. In this example, the condenser 48B' extends into the lamp base 14. In this example, openings within the wall 84, the circuit board 92 and the PC board holder 90 allow the heat pipe 48' to extend into the lamp base 14. By providing the condenser 48B' in the lamp base 14, heat from the heat pipe 48' may be communicated to the lamp base 14 and to the exterior of the light assembly 10A. The lamp base 14 and thus the socket therein may absorb some of the heat from the heat pipe 48. A potting material 49 may be disposed within the lamp base 14 around the condenser 48B' of the heat pipe 48'. The potting material 49 may be electrically non-conductive and thermally conductive to promote the heat transfer to the lamp base 14. That is, a thermal path is provided between the condenser 48B' and the lamp base 14 through the potting material 49. One example of a suitable potting material is epoxy resin.

Figure 8C:
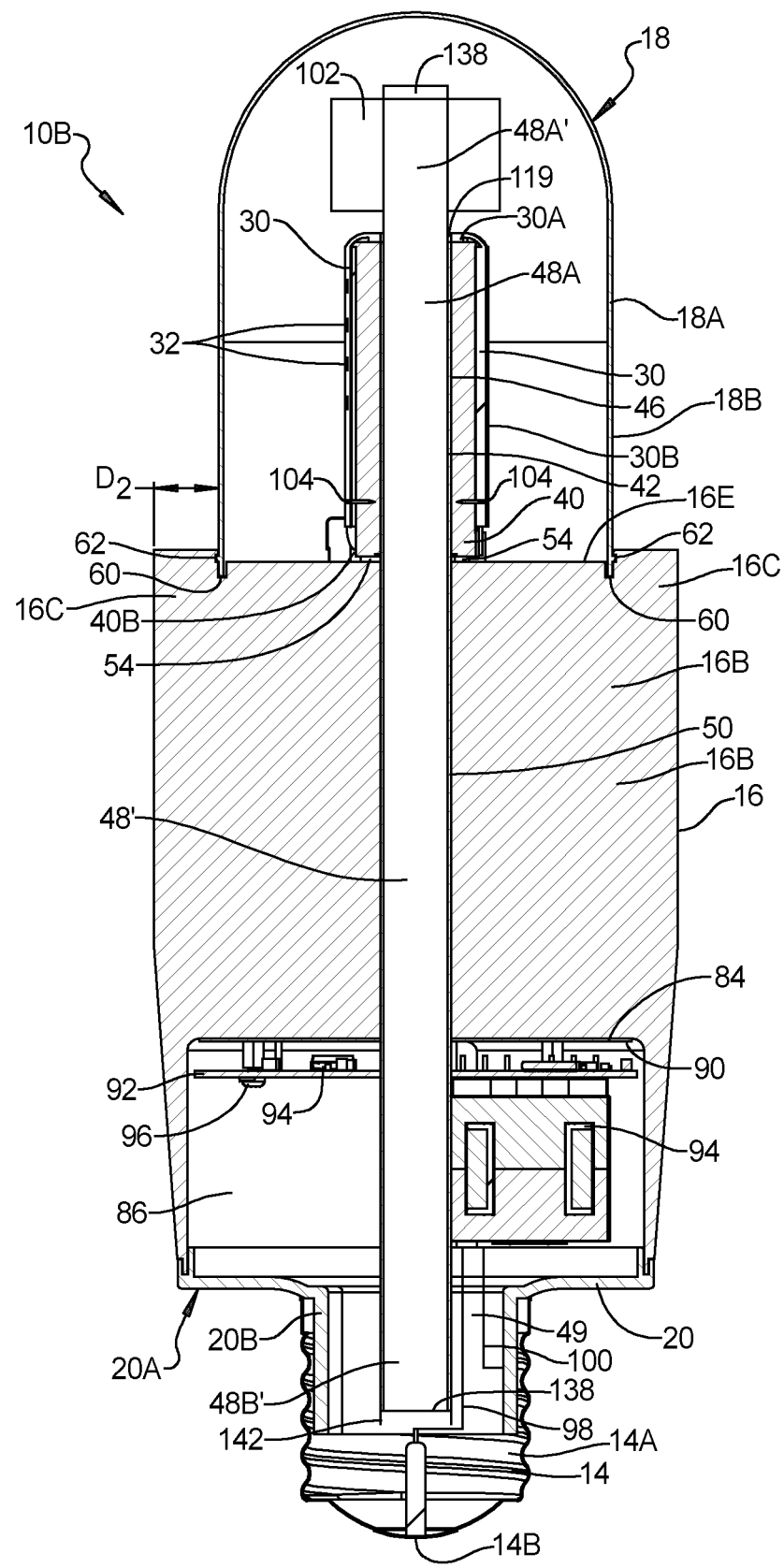
FIG. 8C is a cross-sectional view of an alternate configuration for a light assembly having an elongated heat pipe.

Referring now to FIG. 8C, an alternative cross-sectional view of a light assembly 10B is set forth. In this example, the heat pipe 48' extends a further longitudinal distance toward the cover 18 so at least a portion of the evaporator portion 48A' extends to a position out of an opening 119 of the central portion 30A of the circuit board 30 toward the cover 18. A heat sink 102 having fins, various shapes or the like may be disposed on the evaporator end 48B'. Of course the evaporator 48B' may be used without the heat sink 102. Of course, the extension of evaporator 48B' may be used in either the example of FIG. 8B, as illustrated or in the example of FIG. 8A. Fasteners 104 may be used to connect the circuit board sides 30B to the bar 40.

Referring to FIGS. 16-18, the circuit board 30 is illustrated in further detail. In particular, FIG. 16 shows a front view of the circuit board 30 prior to bending and forming the rectangular sides 30B. In this example, a central portion 110 is ultimately used to form the central side 30A. The side portions 112A and 112B are ultimately used to form the rectangular sides 30B.

As illustrated best in FIG. 16, one of the rectangular sides 30B on each of the side portions 112A, 112B may include a conductor 114 that is used to electrically connect to a respective connector 80. The conductors 114 may be disposed on an extension 116. In this example, the extension 116 is disposed in a half circular shaped portion.

Referring now to FIG. 17, the backside of the circuit board 30 is scored to facilitate bending. That is, a first set of scores 118A is formed on the backside of the circuit board 30. The scores 118A/118B are areas of reduced thickness that are machined or formed. The scores 118A are used so that the circuit board 30 may be bent into six separate sections. The scores 118A are provided such that the side portions 112A and 112B may be bent or formed into 60 degree angles to form the hexagon. Three rectangular sides 30B are formed on each of the side portions 112A, 112B. The width of the scoring, may, for example, be 3.2 mm. Second scores 118B may be provided in the backside of the circuit board 30. The second scores 118B are used to facilitate bending of the circuit board so that the central side 30A is formed and so that the rectangular sides 30B are disposed at a right angle to the central side 30A. The side portions 112A and 112B each form three sides that are perpendicular (normal) to the plane of the central side 30A.

In operation, the circuit board 30 is formed by first populating the circuit board with light sources 32. As mentioned above, each of the rectangular sides 30B may include a plurality of rows such as two rows of light sources 32 that are offset to allow heat to be distributed more evenly over the surface of each of the rectangular sides 30B. Typically, a soldering process is performed with a planar circuit board. In the present example, the circuit board 30 is disposed first in a plane where it is populated with the light sources 32. Thereafter (or even before), the scoring may be performed. Scoring may be performed first to provide the rectangular sides 30B and a second scoring process may be used to separate the central side 30A from the side portions 112A, 112B. Bending may be performed first along the scores 116 the or thereafter, the sixty degree bends may be performed to form the rectangular sides 30B. The scores 118A, 118B may be formed at a depth of about 46 mm.

In the configuration of FIG. 8C, the heat pipe 48' may extend through an opening 119 in the central side 30A of the circuit board 30. Heat sink 102 may be coupled after assembly of the heat pipe 48' into the opening 119 of the circuit board 30.

Figure 19:
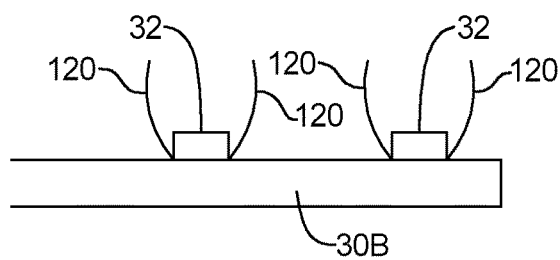
FIG. 19 is a first example of a light redirection element.

Referring now to FIG. 19, one of the rectangular sides 30B is illustrated. The rectangular sides 30B may, in addition to, light sources 32, include light redirection elements. In this example, one or more reflectors 120 may be disposed near the light sources 32 on the circuit board 30. The one ore light redirection elements such as reflectors 120 may direct light in a desired direction. The angle or curvature of the light redirection elements may vary depending on the position of the circuit board 30. In the present example, parabolic light reflectors 120 are provided. However, various types of conical sections such as elliptical or hyperbola may be used.

Figure 20:
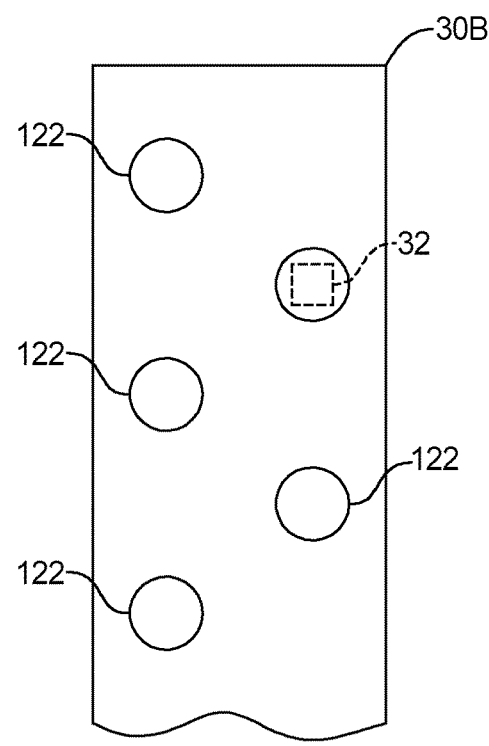
FIG. 20 is a side view of a second example of a light redirection element.

Referring now to FIG. 20, one of the rectangular sides 30B is provided having the light sources 32. The light sources 32 may include a lens 122 that is shaped to provide the desired light redirection. That is, the lenses 122 are light redirection elements that are used to direct the light in a predetermined manner. The lenses 122 may be coated with light changing or light filtering materials so that a desired wavelength of light may be provided.

Figure 21:
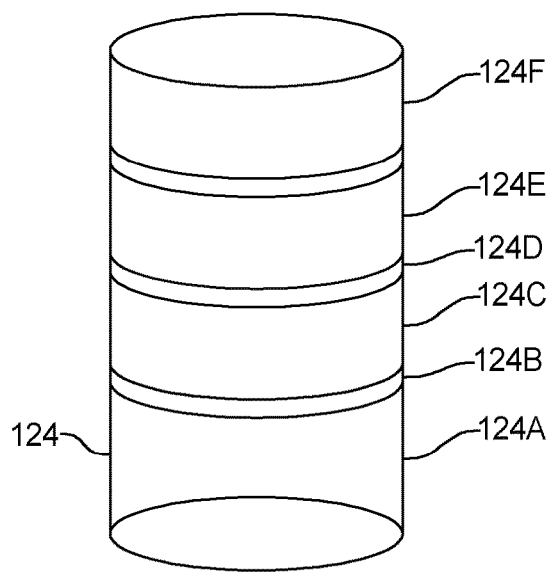
FIG. 21 is a third example of a light redirection element.

Referring now to FIG. 21, a lens cap 124 may be disposed around the circuit board 30 after it is inserted on the bar 40. The lens cap 124 may have a plurality of sections 124A, 124B 124C, 124D, 124E and 124F. Each of the sections 124A-124F may have a different thickness or cross-sectional shape to redirect the light from the light sources 32 in a desired direction. Just as in the case of the lens of FIG. 20, the lens cap 124 may be coated with light changing or light filtering materials so that a desired wavelength of light is provided from the light assembly 10.

Figure 22:
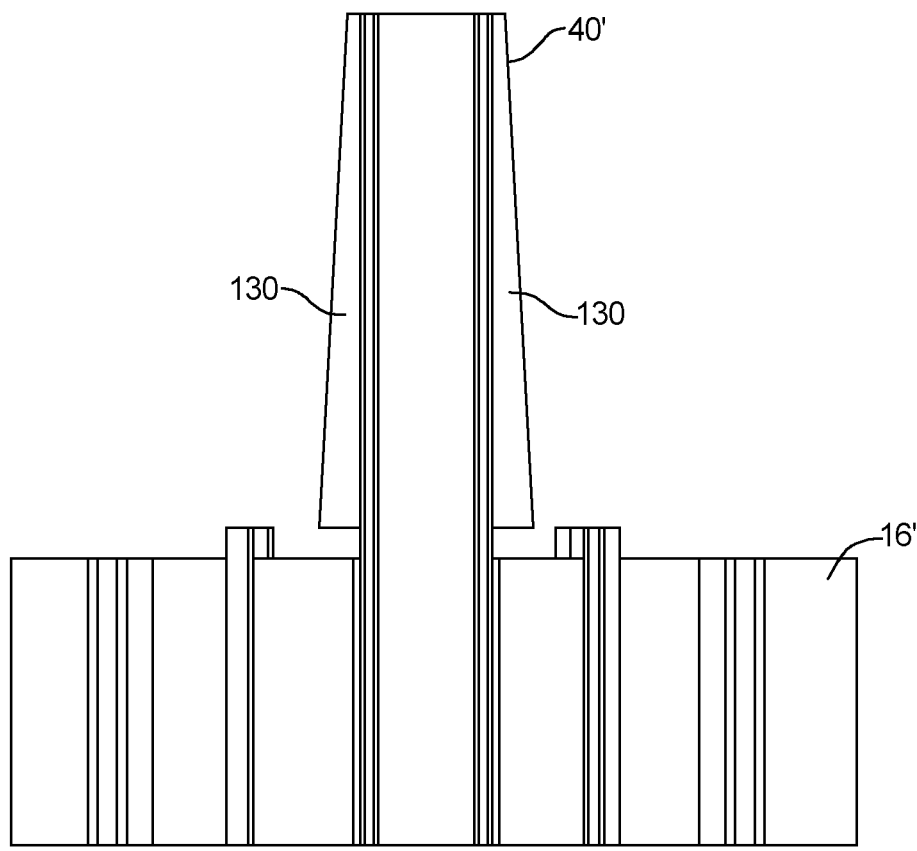
FIG. 22 is a side cross-sectional view of an alternative bar.

Referring now to FIG. 22, an alternate shape for a bar 40' is illustrated. In this example, the outer surface of the bar 40' is tapered. That is, the bar 40' has a larger diameter toward the heat sink housing 16'. In this example, the rectangular sides 30B (not shown) would also be placed at a taper against the tapered bar sides 130.

Referring now to FIG. 23A, the heat pipe 48 is set forth. The heat pipe 48 includes a pair of circular end walls 138 and a cylindrical wall 140. The heat pipe 48 may be vacuum sealed. In order to perform the vacuum sealing, wall extensions 142 may extend from the end walls 138. The heat pipe 48 includes a microstructure and capillaries portion 144 adjacent to the cylindrical wall 140. The heat pipe thus creates the evaporation portion 48A and the condensation portion 48B of the heat pipe 48. That is, the system constantly circulates in the vacuum therein. The evaporation portion 48A is used to conduct heat by evaporating fluid in the micro-ducts and capillary portion 144. The microstructure and capillary portion 144 creates a wick structure that wicks cooler fluid from the condensation portion 48B. The condensation portion 48C is cooler due to the heat that is being removed through conduction, which in turn, is provided to the heat sink. The heat into the evaporation portion 48A is conducted through the circuit board 30, the bar 40 and into the heat pipe 48. Vapor flows in the direction from the evaporation portion 48A to the condensation portion 48B.

Figure 23C:
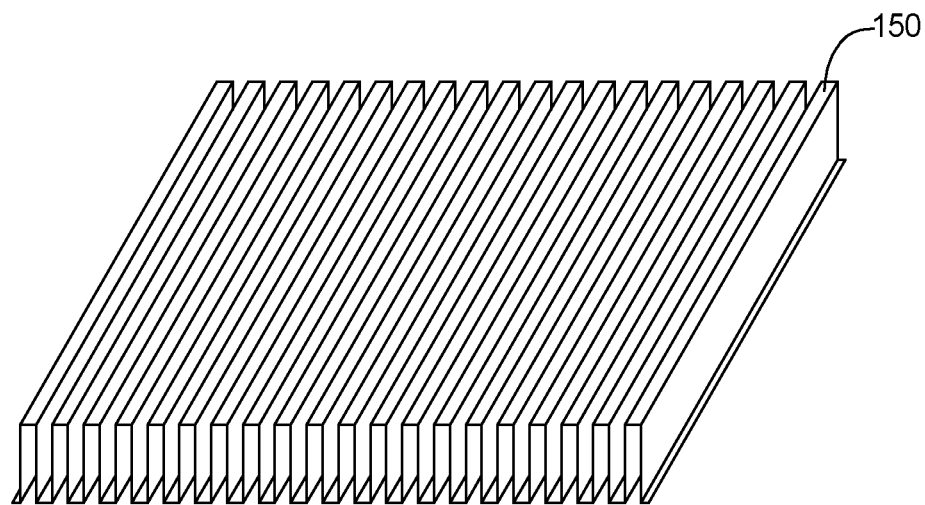
FIG. 23C is a plan view of a micro-fin structure for a heat pipe.
Figure 23B:
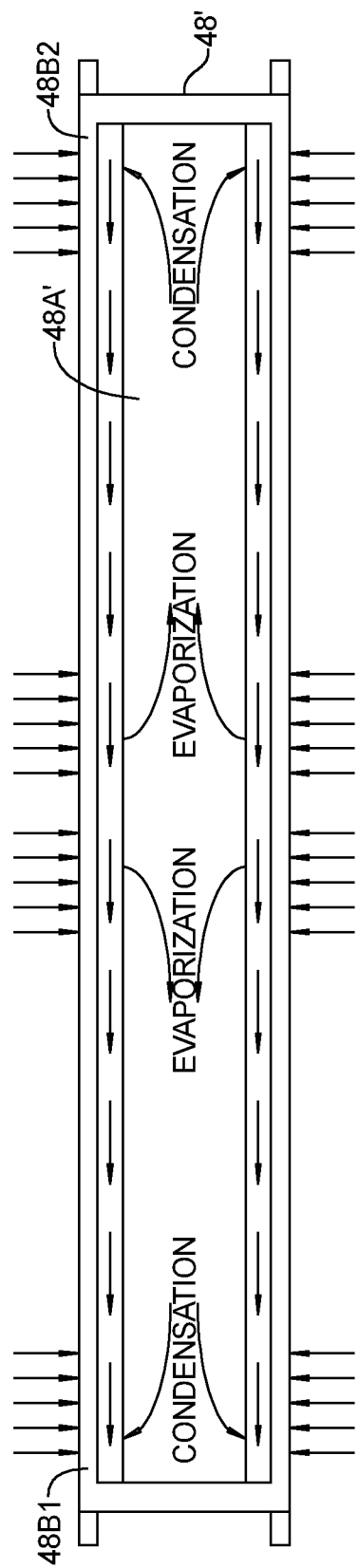
FIG. 23B is an alternative heat pipe.

Referring now to FIG. 23B, an alternative structure for a heat pipe 48' is set forth. In this example, a pair of condensation portions 48B1 and 48B2 are provided. One evaporation portion 48A' is disposed in the middle of the heat pipe 48'. The heat pipe 48 may be used for a heat pipe in which a pair of heat sinks are provided. An example of this will be set forth below.

Referring now to FIG. 23C, a micro-fin structure 150 is set forth. The micro-fin structure 150 illustrates a flow direction F. A heat source such as the hexagon bar and the heat sink may be combined into one component. The micro-fin structure 150 may form a heat tube with a diameter similar to the inner diameter of the micro-fin structure 150 forms a capillary tube structure to form the microstructure and capillary portion 144 illustrated above.

Figure 24:
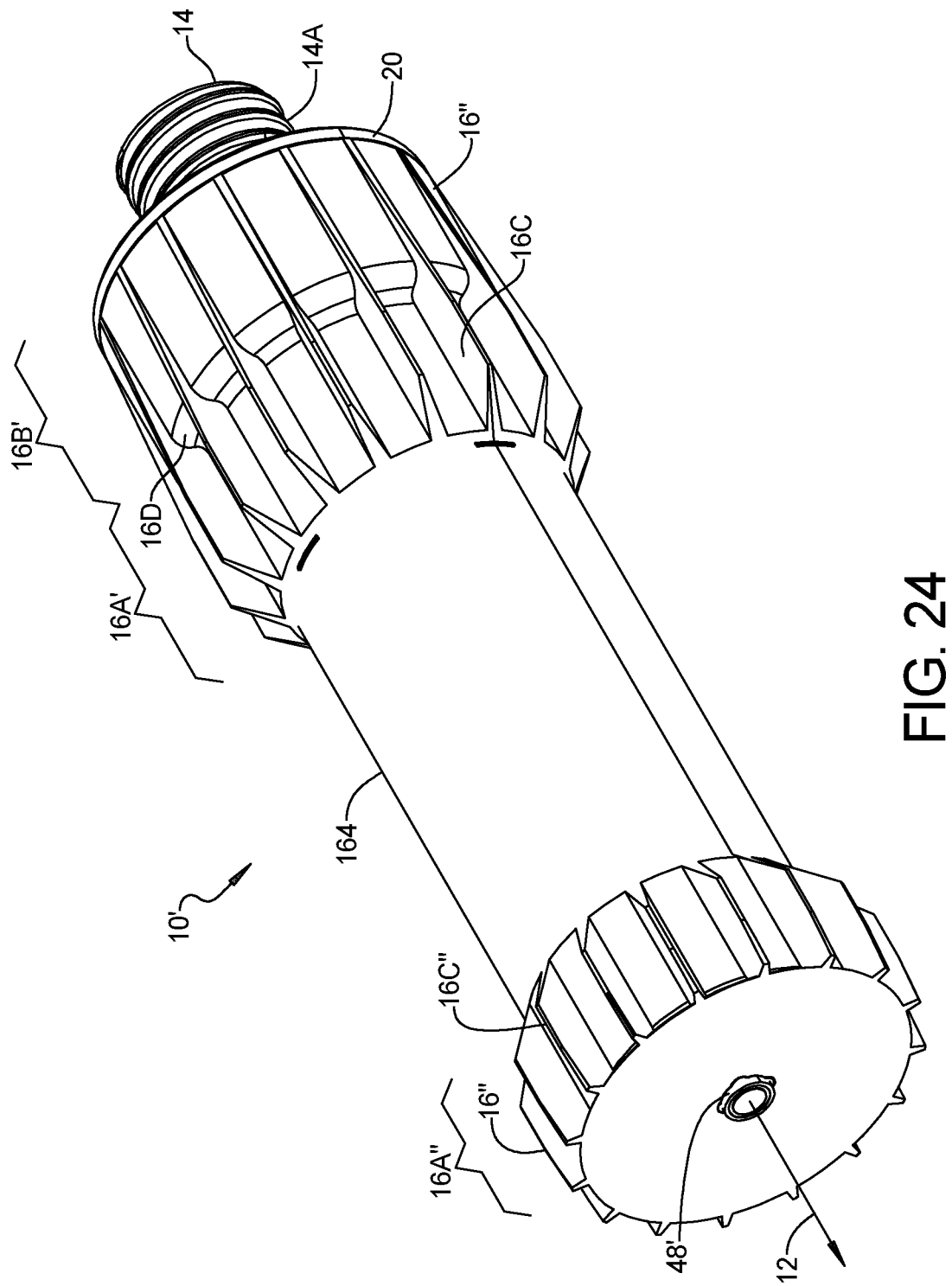
FIG. 24 is a perspective view of a two heat sink light assembly 10'.
Figure 25:
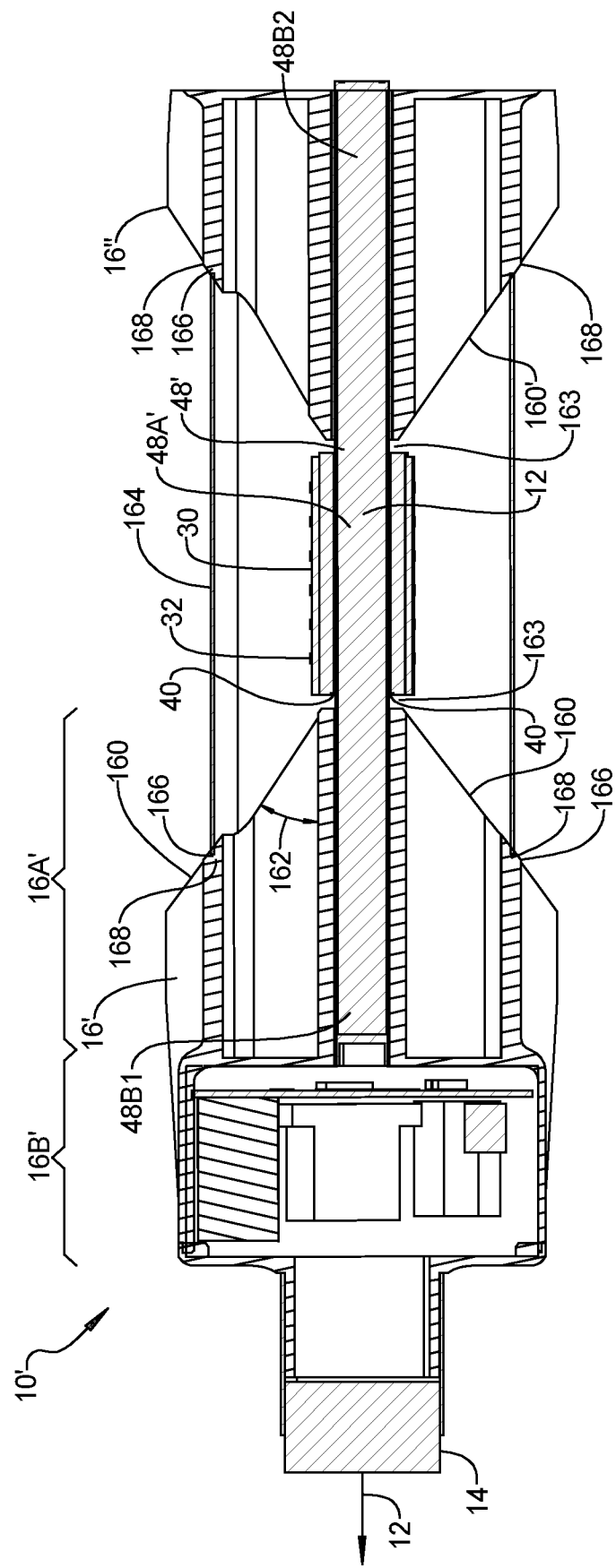
FIG. 25 is cross-sectional view of the light assembly of FIG. 24.

Referring now to FIGS. 24 and 25, an alternative embodiment of a light assembly 10", including a second heat sink 16", is set forth. In this example, the first heat sink housing 16' configured in similar manner to that set forth above, is provided. However, only the heat sink portion 16A" is provided. The housing portion is not required because the control circuitry is located in the housing portion 16B' at the opposite end. The heat sink portion 16A" has fins 16C'. The internal structure of the heat sink portion 16A" is the same as the housing portion 16A' and 16A illustrated above. The bar 40 and the circuit board 30 are also provided in similar manner. However, in this example, an upper surface 160 of the heat sink housing 16' is disposed at an angle relative to the longitudinal axis. Recall, the heat sink housing 16 had an upper surface 16E that was disposed at an angle normal to the longitudinal axis 12. The angle of the upper surface 160, relative to the longitudinal axis 12, may vary depending on the angular output of the light sources 32. The angle 162 may be provided to prevent the heat sink from blocking the light output of some or all of the light sources. When the angle 162 of the upper surface 160 is formed the upper surface 160 is conical in shape such that the middle of the upper surface 160 extends the greatest distance from the distal ends of the light assembly 10'. In this example, the heat pipe 48', illustrated in FIG. 23B, is provided. Further, a second heat sink 16" is also provided at the second condensation end 48B2. The second heat sink 16' may be formed in a similar manner to that of heat sink 16'. The heat sink 16" may also have the same angle of the surfaces facing the circuit board 30. As in the embodiment set forth above, gaps 163 may be provided between the circuit board 30, the heat sink 16' and 16" respectively. This allows thermal conduction through the heat pipe 48'. A cylindrical lens 164 may be mechanically coupled to the heat sinks 16' and 16". The cylindrical lens 164 may also include various types of optics and coatings for filtering or color changing. By providing the additional heat sink 16", further improvements in light or heat distribution may be provided. The cylindrical lens 164 may have an engagement portion 166 that engages with a groove 168 disposed within each heat sink 16', 16". The lens 164 may be snap fit so that the engagement portion 166 fits within the groove 168.

Figure 26:
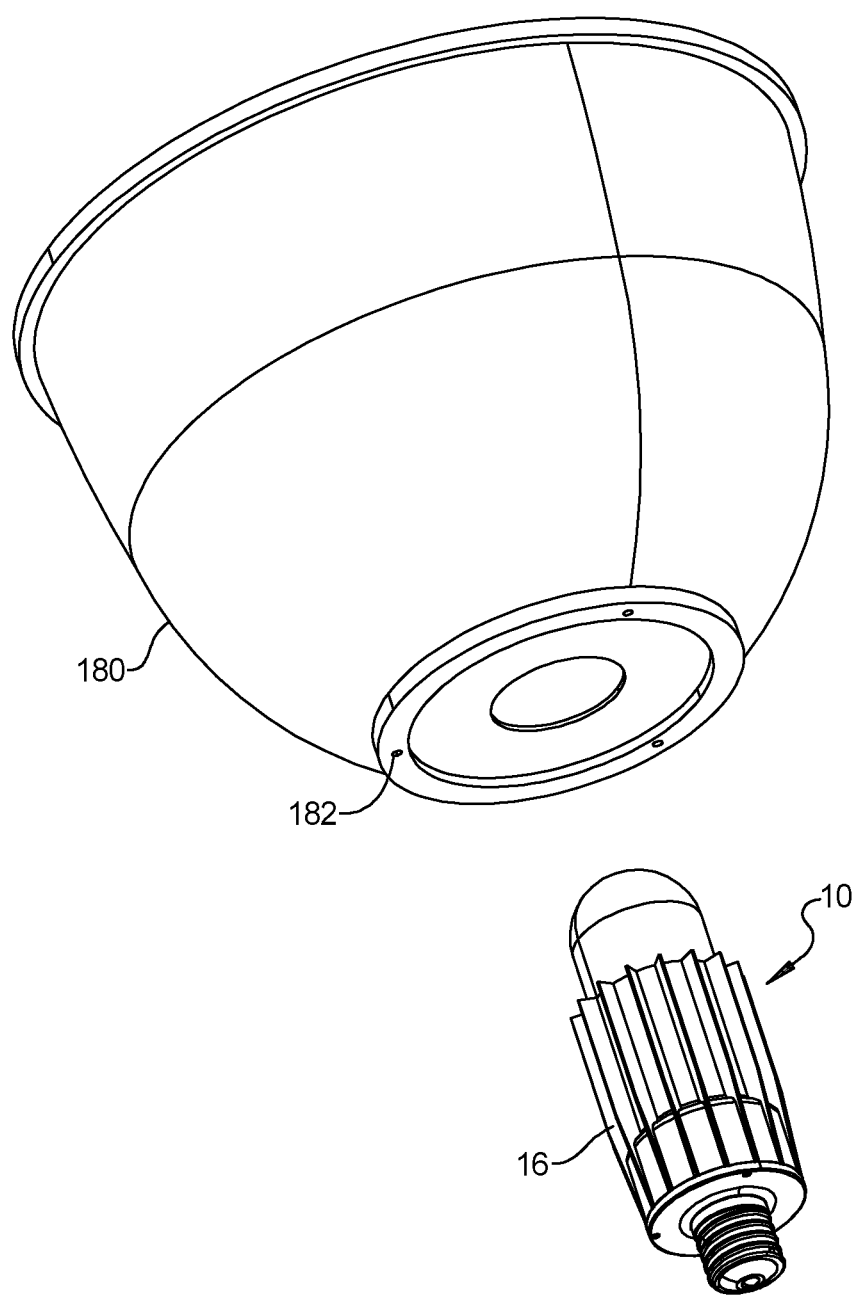
FIG. 26 is a partially exploded view of a light assembly with a reflector.
Figure 27:
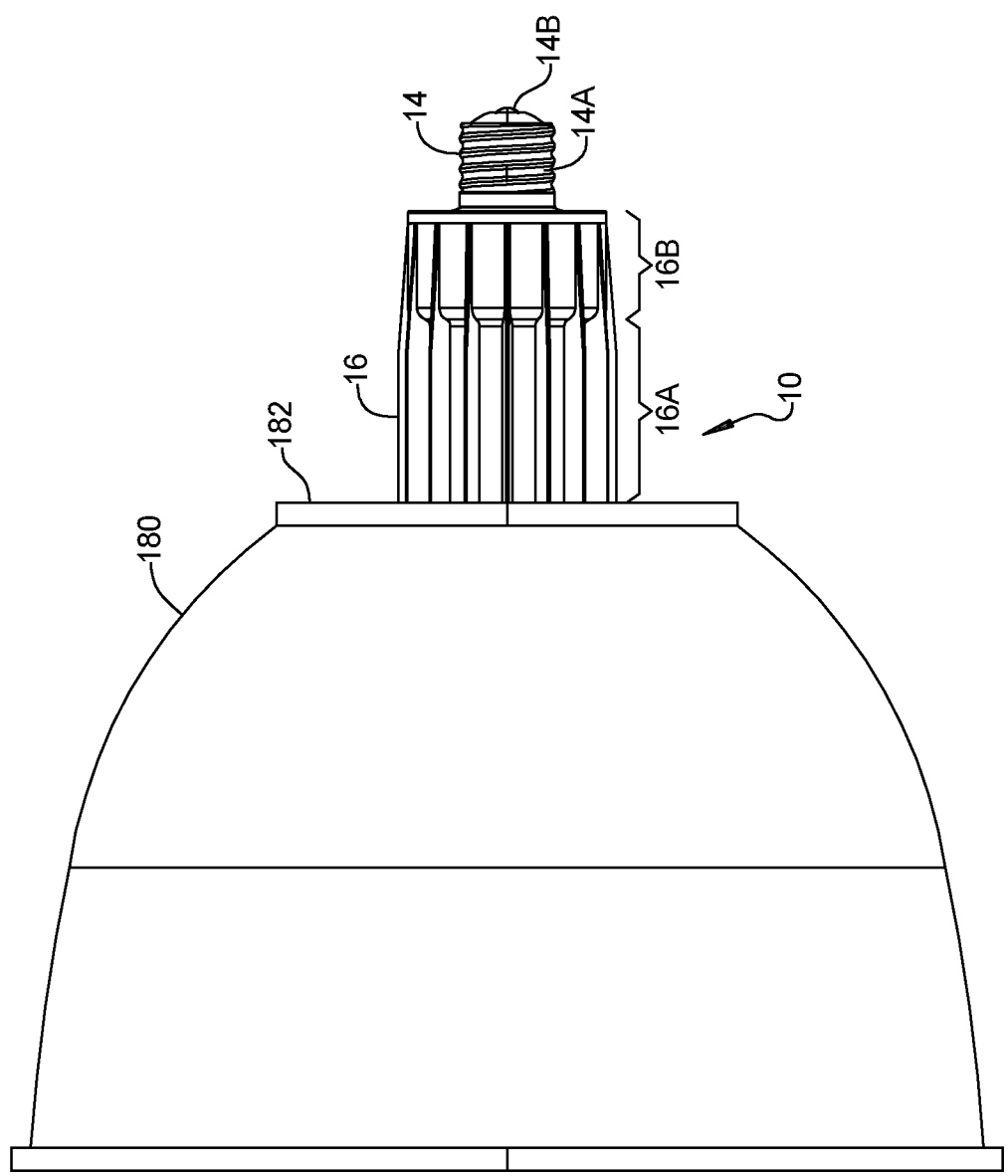
FIG. 27 is a side view of the light assembly of FIG. 26.
Figure 28:
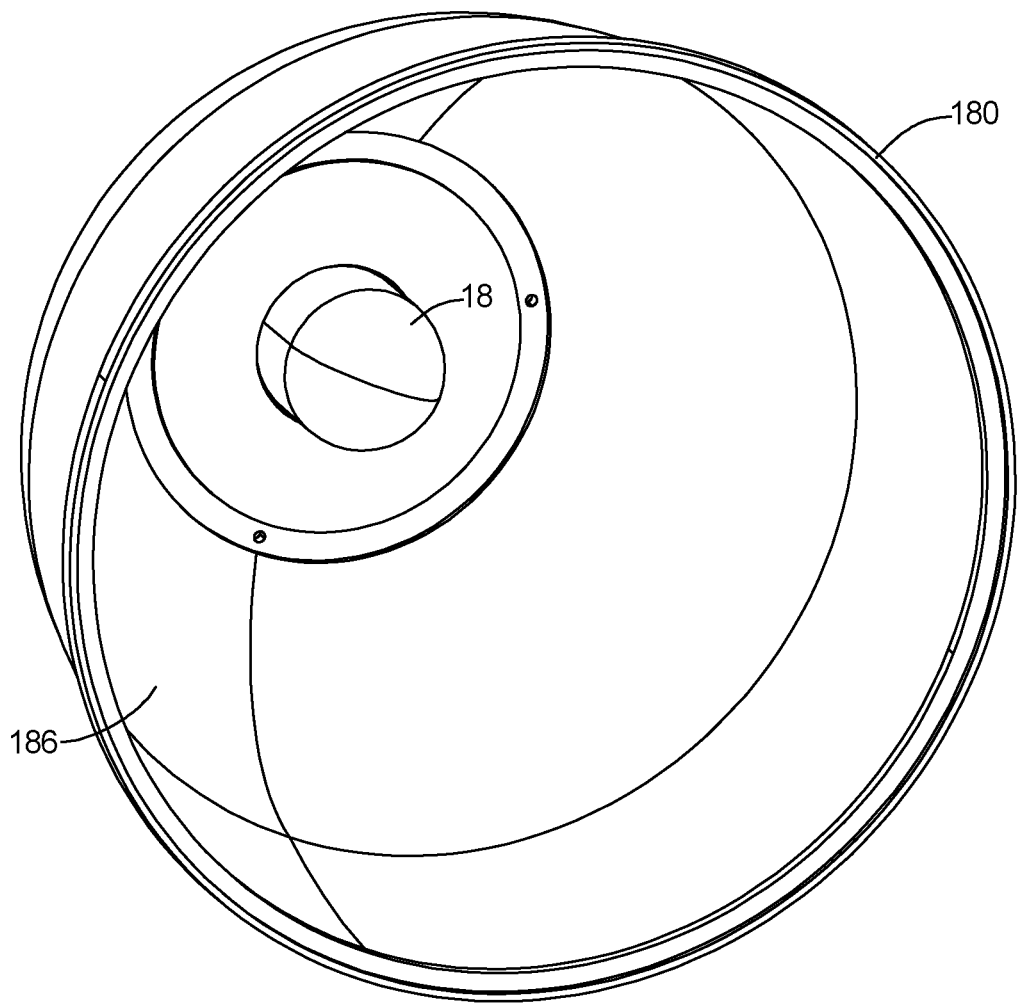
FIG. 28 is an interior view of the reflector 180 of the light assembly of FIG. 26.
Figure 29:
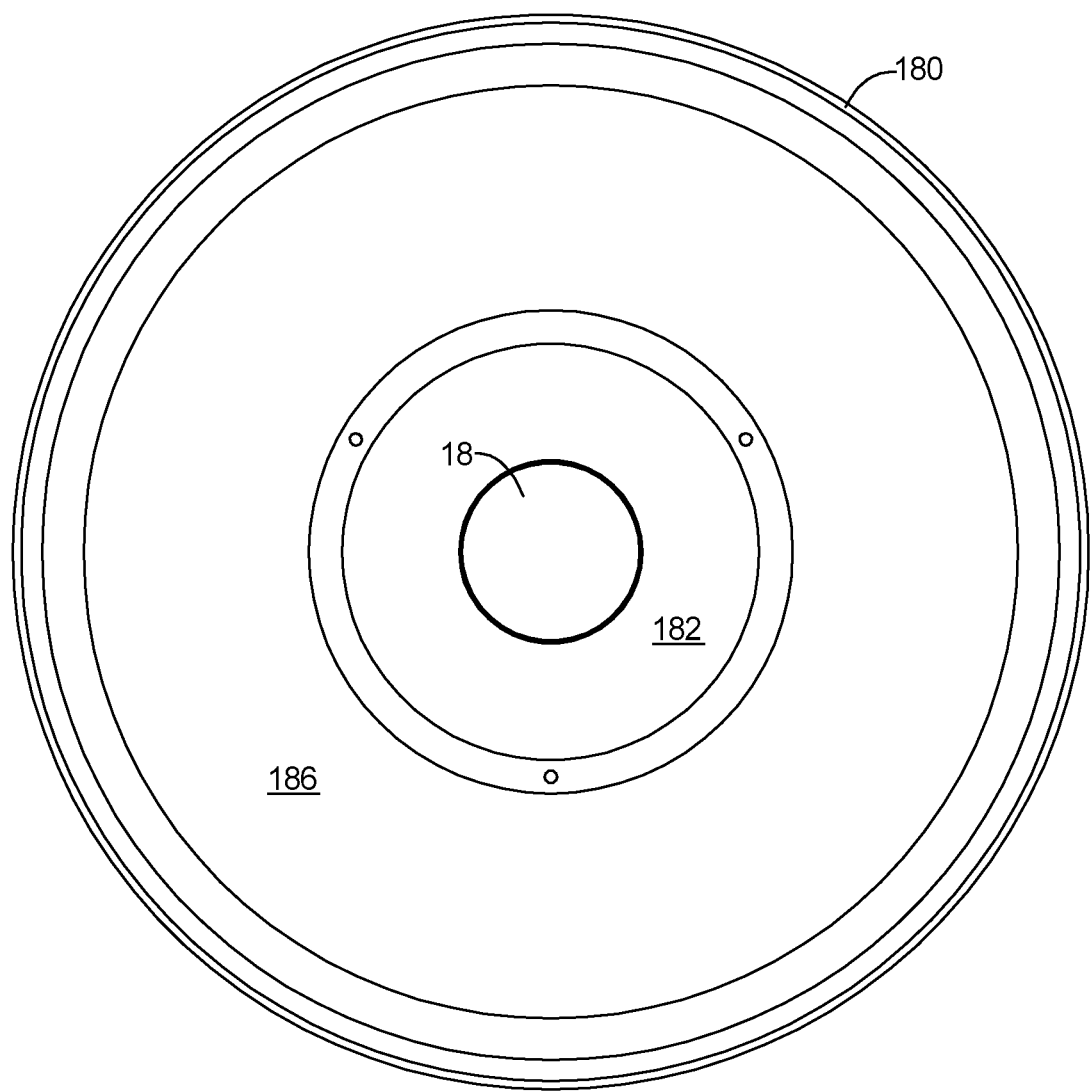
FIG. 29 is a second interior view of the light assembly of FIG. 26.

Referring now to FIG. 26, the light assembly illustrated in FIGS. 1-22 may be provided with a reflector 180. A securing means 182 may be used to secure the bottom 184 of the reflector 180 to the heat sink housing 16 of the light assembly 10. An inner surface 186 may be shaped to direct the light in a predetermined manner. For example, the inner surface 186 may be generally hyperbola in shape to allow to the light generated from the light sources to be collimated. However, other types of shapes such as ellipsoidal and hyperbola may also be used. Different portions of the inner surface 186 may be shaped in different ways. In FIG. 30, an example of a light beam 30 is illustrated reflecting from the inner surface 186 of the reflector 180.

In operation, a method for assembling the light assembly may also be provided. The light assembly 10 may also be formed by populating the circuit board 30 while the circuit board is disposed in the plane. The circuit board may be scored and bent to form the plurality of rectangular sides. The circuit board may be disposed over a bar. An evaporator portion of a heat pipe may be disposed within a bar. The condenser portion may be inserted into a heat sink. A gap 54 may be formed between the heat sink and the bar. A thermally conductive material may be placed on the outer surface of the bar and within channels in the inner surface of a bore of the bar. The plurality of sides of the circuit board are urged against the outer surface of the bar so that the thermally conductive material is disposed thereon. The circuit board may be fastened to the bar using a screw or other type of fastener. The cap 124 may be snap fit over the circuit board to protect the light sources. The cap 124 may provide various types of optics and coatings to change the optical characteristics of the light output.

Figure 31A:
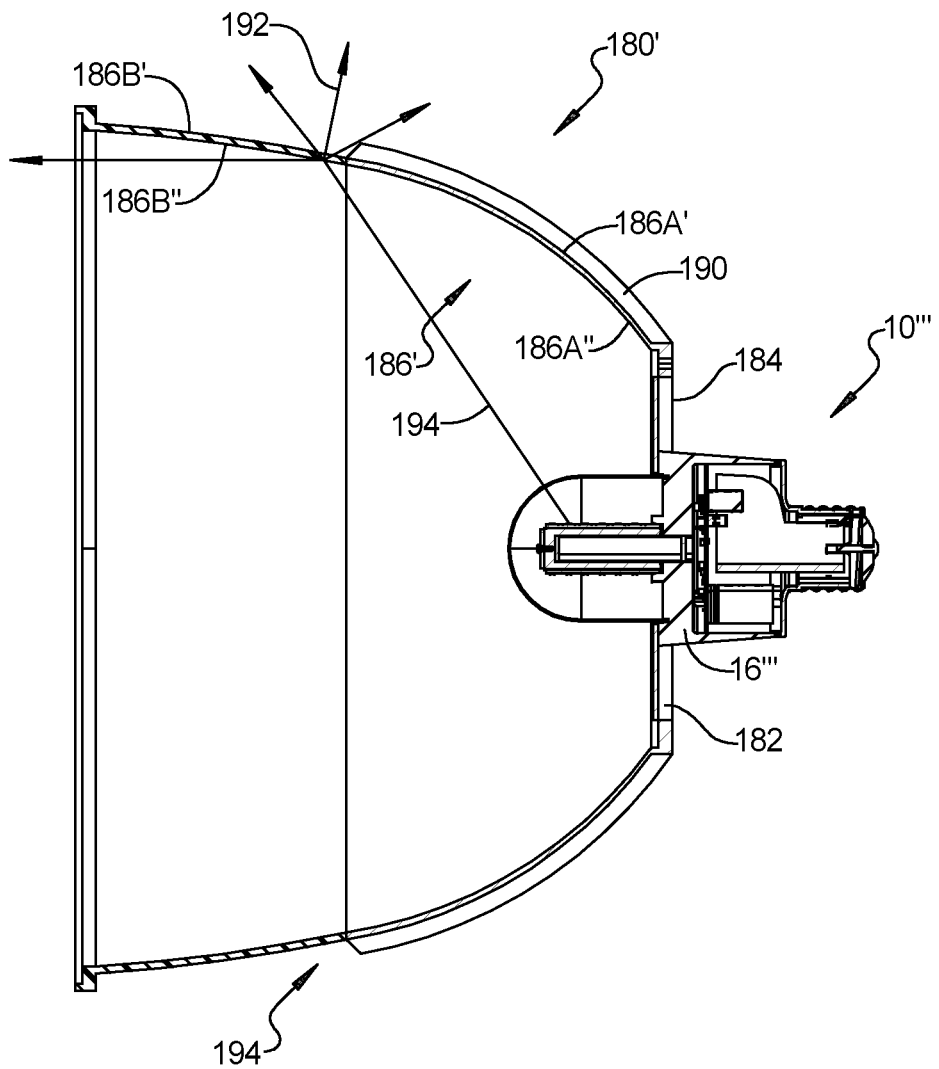
FIG. 31A is a cross-sectional view of an alternate light assembly with reflector.

Referring now to FIG. 31A, an alternative light assembly 10''' is set forth. In this example, a modified reflector 180' is set forth. The reflector 180' comprises a first portion 180A' and a second portion 180B'. The portion 180A' is formed from a thermally conductive or metal material. Likewise, the securing means 182' is also formed of a thermally conductive or metal material. The inner surface 186A' corresponds to the closest portion of the first portion of the reflector 180A'. That is, the inner surface 186A' is directly opposite the portion 180A' of the reflector 180'. The inner surface 186B' is opposite the second portion of the reflector 180B'. The inner surface 186A' may be polished or reflectively coated metal. The portion 180A' may also include heat sink fins 190. The heat sink fins 190 are thermally coupled to the securing means 182' and the first portion of the reflector 180A'. The light assembly 10''' may thus be shorter in length (axially shorter) compared to those illustrated above in FIGS. 1-23. The light from the light sources is quickly removed by the heat pipe and dissipated into the fins 190 and into the heat sink housing 16.

The second portion 180B' of the reflector 180' may be formed of a translucent material such as plastic or glass. In this example, light rays 192 are formed from light ray 194 that is incident upon the surface of the second portion 180B' of the reflector 180'. A joint 194 is provided between the first portion 180A' and second portion 180B' of the reflector 180'.

Figure 31B:
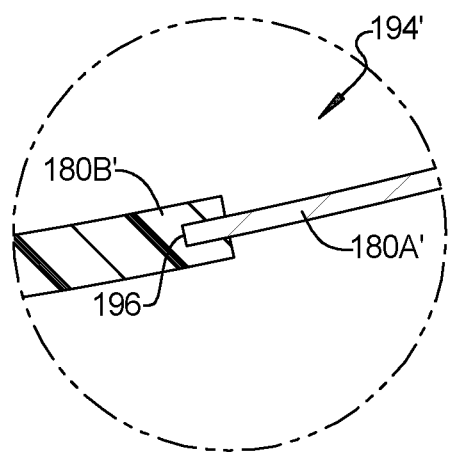
FIG. 31B is a cross-sectional view for coupling the first portion and second portion of the reflector.

Referring now to FIG. 31B, a first example of a joint 194 is provided by a channel 196 that receives the first portion 180A'. An adhesive or the like may be used to form the joint 194.

Figure 31C:
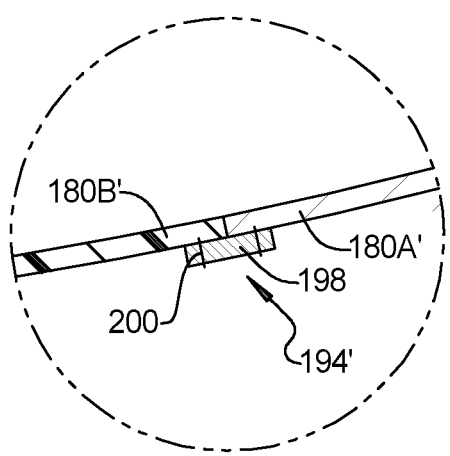
FIG. 31C is a first example of a way to join the first portion and the second portion of the reflector of FIG. 31A.

Referring now to FIG. 31C, a second joint 194' is illustrated in which the first portion 180A' and 180B' are directly adjacent and connected by a connector ring 198. The connector ring 198 may be extensive around the outer surface of the reflector 180'. Of course, a discontinuous ring may also be used in which separate portions are provided at various spacings around the reflector 180'.

Figure 31D:
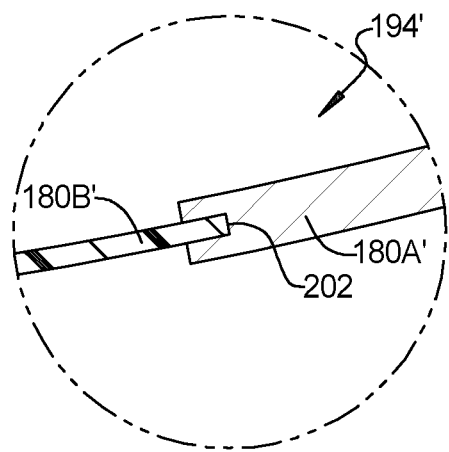
FIG. 31D is a second example of a way to join the first portion and the second portion of the reflector.

Referring now to FIG. 31D, the first portion 180A' has a channel 202 disposed therein. The channel 202 receives the second portion 180B' in a similar manner to that described above with respect to FIG. 31B, an adhesive or the like may be used for joining the two portions 180A', 180B'.

Figure 31E:
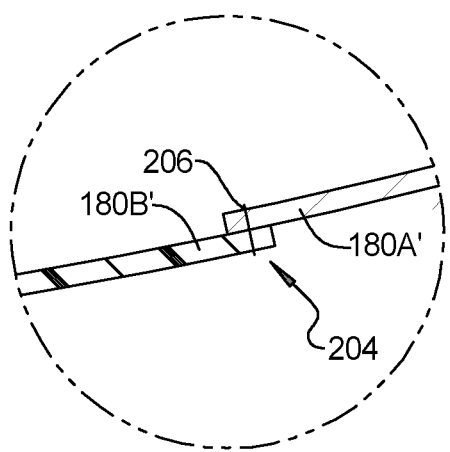
FIG. 31E is a third example of a way to join the first portion and the second portion of the reflector.

Referring now to FIG. 31E, an overlap 204 may be provided. The overlap 204 overlaps the first portion 180A' with the second portion 180B'. A fastener 206 may be used to join the first portion 180A' to the second portion 180B'. The fastener 206 may a screw, rivet, bolt or other type of fastener including adhesive.

Figure 32B:
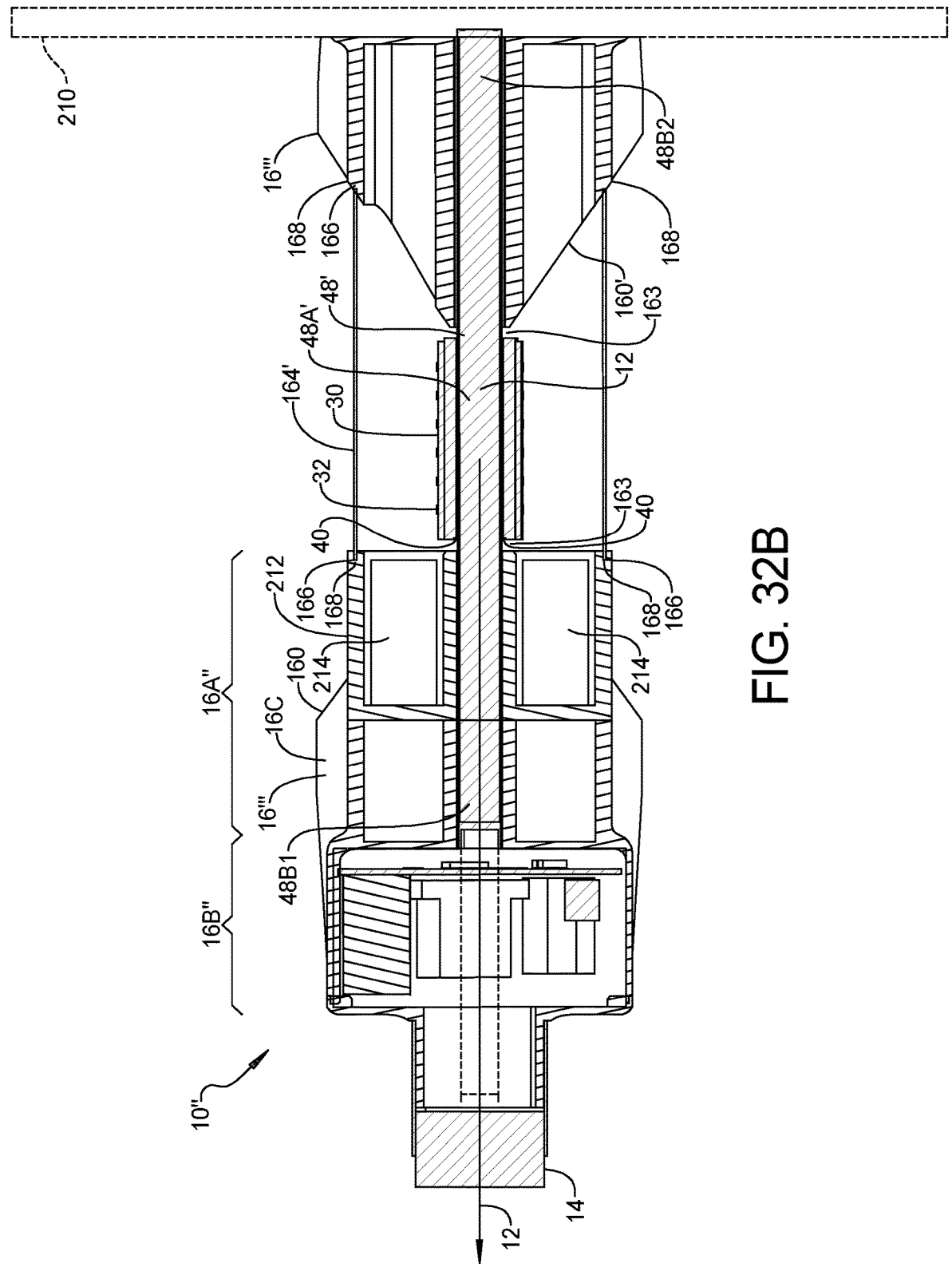
FIG. 32B is a cross-sectional view of a light assembly of FIG. 32A.

Referring now to FIG. 32A-32C, an alternative in assembly 10$^{IV}$ is provided. In this example, an integrated solar panel 210 is provided directly adjacent to the heat sink housing 16$^{IV}$. In this example, the evaporator end 48B2 of the heat pipe 48A' is provided directly adjacent to the solar panel 210 to remove heat from the solar panel.

In addition, the cylindrical lens 164' may be shortened so that a battery housing 212 is provided therein. The battery housing 212 may house a plurality of batteries 214. Thus, the heat sink housing 16''' may be modified to accommodate the battery housing 212. The fins 16C may extend adjacent to the heat sink portion 16A as illustrated or they may be extended alongside the battery housing 212.

In operation, the solar panel 210 may be charged in the sunlight and heat removed through the heat pipe 48'. The solar energy incident upon the solar panel 210 is communicated to the batteries 214 to store the energy therefrom. The batteries 214 are also used to operate the light sources 32. However, when the batteries 214 have an insufficient charge electrical power may be provided through the lamp base 14. The control circuit board 92 within the light assembly 10$^{IV}$ allows the light sources 32 to draw energy from the batteries 214 when the solar panel 210 is not charging the batteries 214. The battery pack may be about 80 watts and should last a nighttime of energy in most latitudes. Should the amount of charge within the batteries 214 be insufficient, AC power may be used through the lamp base 14.

In a similar manner to that illustrated above, with respect to FIG. 8B, the light pipe may be extended into the lamp base 14. That is, the condenser portion 48B' as illustrated by the dotted lines in FIG. 32B may be terminated within the lamp base 14. This further draws heat in a longer longitudinal direction from that illustrated above. Heat may still be radiated by the fins 16C and by the lamp base 14.

Referring now to FIGS. 33-44, another example of a light assembly 10" is set forth. In this example, several modifications are provided compared to that set forth in FIGS. 1-18. The same reference numerals from FIGS. 1-18 are labeled in the same manner and are thus not described in further detail. It should be noted that various components illustrated in the above examples may be used in other embodiments. In this example, the circuit board holder 20' has been modified with external threads 33 that couple with internal threads 3312 of the lamp base 14. When the threads 3310 correspond to the threads 3312, a greater amount of heat conductance is present. Further, the interlocking threads 3310, 3312 provide a mechanical advantage in securing the lamp base 14 to the PC board holder 20'. The PC board holder 20' may also include a coupler 3314 extending radially therefrom. The coupler 3314 may include an opening 3316 for receiving a fastener. Although only one coupler 3314 is illustrated, multiple couplers 3314 may be included in a constructed example.

Another difference between the example set forth in FIGS. 1-18 is the outer walls 66' includes a first portion 66A' and a second portion 66B'. The first portion 66A' has a greater diameter than the second portion 66B'. The outer wall 66' includes a third portion 66C' and a fourth portion 66D'. The third portion 66C' extends between the first portion 66A' and the second portion 66B'. Likewise, the fourth portion 66D' extends between the outer wall 66B' and the housing portion 16B. Likewise, the radially extending walls 64' have a first portion 64A' and a second portion 64B'. The first portion 64A' is directly adjacent to the first portion 66A' of the outer walls 66'. The second portion 64B' is directly adjacent to the second portion 66B' of the outer wall 66'. As is true with the embodiments illustrated above, the number of radially extending walls 64 does not necessarily correspond with the amount of fins 16C.

Figure 38:
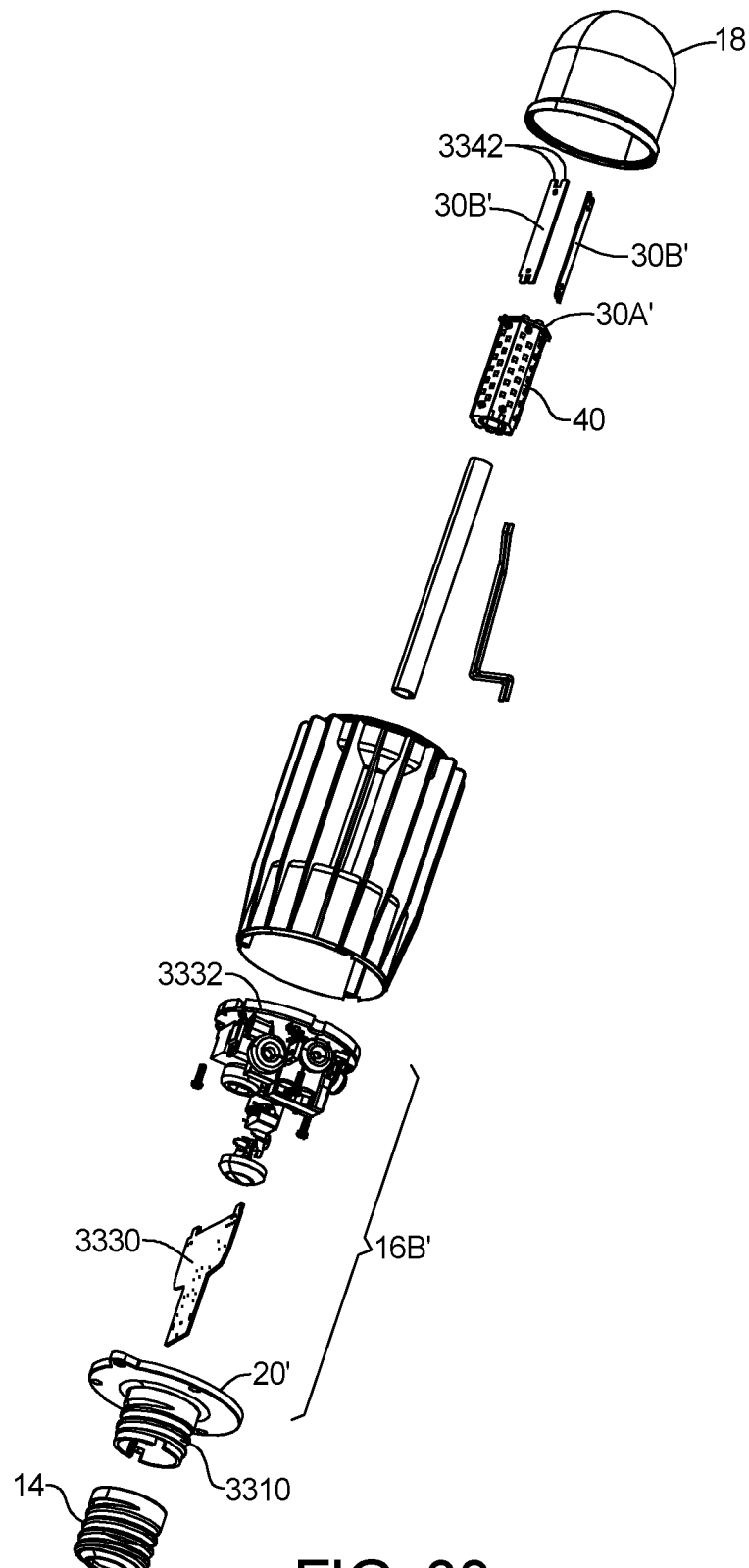
FIG. 38 is an exploded view of the light assembly of FIG. 33.
Figure 39:
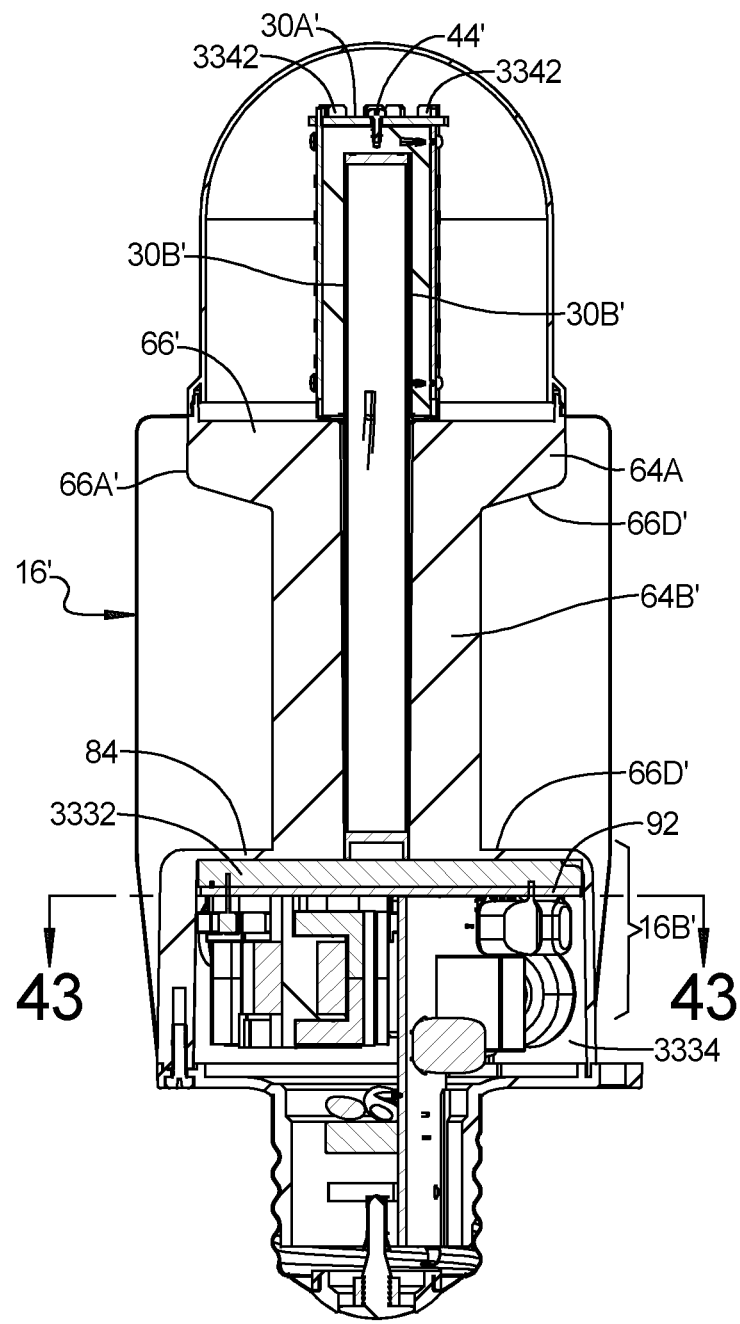
FIG. 39 is a longitudinal cross-sectional view of the light assembly of FIG. 33.
Figure 40:
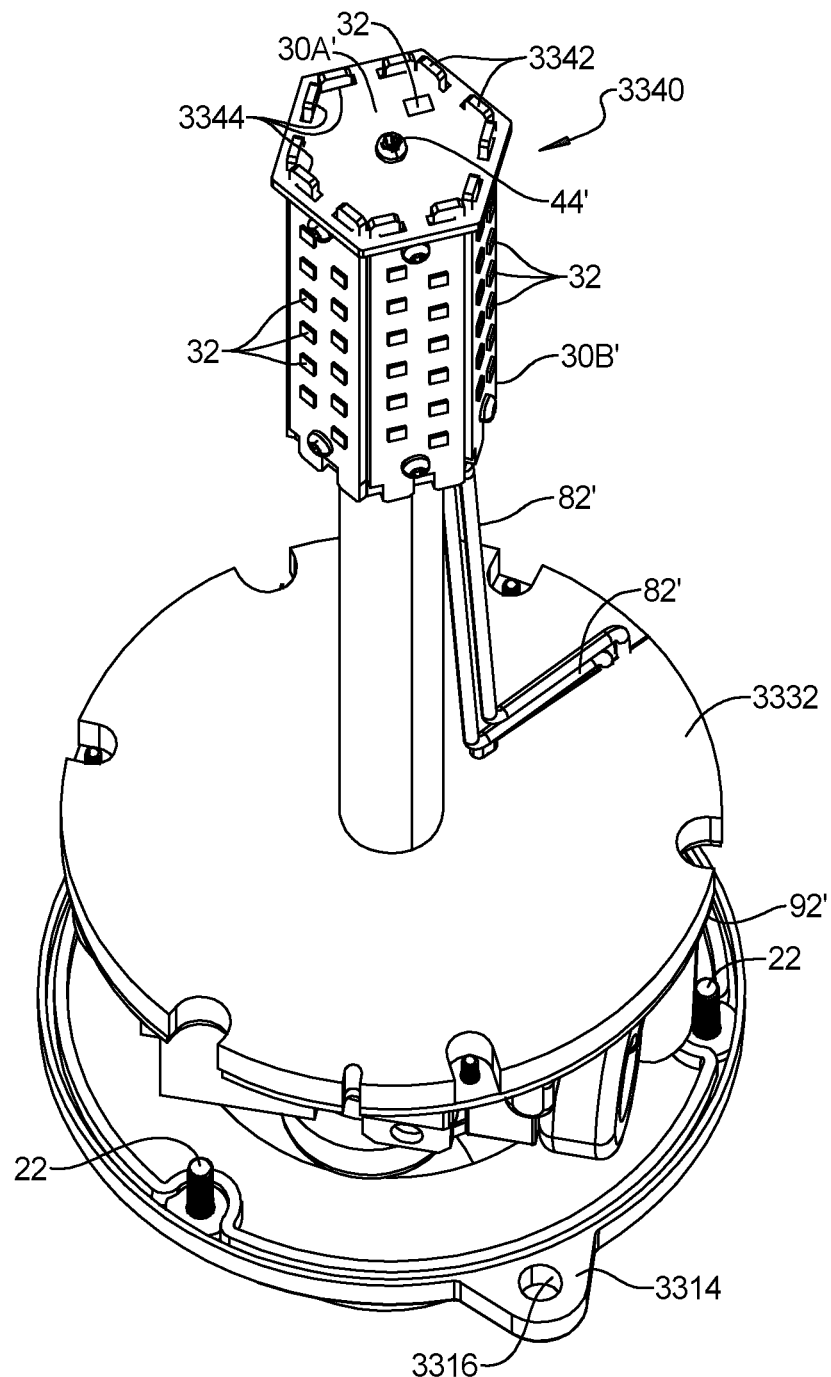
FIG. 40 is a perspective view of the light assembly disposed on the heat exchanger with the heat sink housing removed.

Referring now specifically to FIGS. 38 and 39, another feature of the light assembly 10" is the interior of the housing portion 16B' including a vertically disposed circuit board 3330 that has various components that correspond to the control of the light assembly. The circuit board 3330 together with the control circuit board 92 controls the operation of the light assembly. The circuit board 92 has a gel 3332 disposed thereon. The gel 3332 conforms to the components mounted to the surface of the control circuit board 92. The gel 3332 may completely fill or conform to the area between the circuit board 92 and the wall 84 between the housing portion 16B and the heat sink portion 16A. In this example, the insulator 90 illustrated above is not included because the gel 3322 may be formed of an electrically insulating material. The gel 3332 is also heat conductive to enhance the heat conduction between the components on the circuit board 92 and the heat sink housing 16. By way of example, a constructed embodiment included a 1.2 W/mK K-value. Between the circuit board 92 and the PC board holder 20', a potting material 3334 may encapsulate the components therebetween. The potting material 3334 may have a K-value that is less than the gel 3332. In one constructed embodiment, the K-value of the potting material 3334 was 1.68 W/mK. Of course, the above embodiments may also benefit from the use of the gel 3332 and a potting material 3334. In operation, the gel 3332 may be cut into a cylindrical shape and placed against the components of the circuit board 92. The gel 3332 may be pushed into place so that the components enter into the gel 3332 prior to assembly. After the circuit board 92 is inserted within the housing portion 16B', potting material may fill or nearly fill the volume within the housing portion 16B'. After the potting material 3334 is placed within the housing portion 16B', the PC board holder 20 may be secured to the heat sink 16'.

Yet another difference between the light assembly 10" and the light assembly 10 is the circuit assembly 3340. The circuit assembly 3340 is comprised of a central side 30A' and rectangular sides 30B'. However, the rectangular sides 30B' are all individually formed circuit boards that are electrically and mechanically coupled to the central side 30A'. Each of the rectangular sides 30B' include a plurality of light sources 32 such as light-emitting diodes as was described above. Each of the circuit boards has one or more tabs 3342. The one or more tabs 3342 extend in an axial direction when the rectangular sides 30B' are coupled to the central side 30A'. One or more light sources 32 may also be disposed on the central side 30A'. For simplicity only one is illustrated. When light sources 32 are disposed upon the central side 30A' the same or different wavelengths than those of the light sources 32 may be provided. As mentioned above, a combination of wavelengths may be used to obtain a desired light output. Different light outputs may be suitable for various purposes including art display, glow lights, retail applications and the like.

In operation, the rectangular circuit boards 30B' are populated with light sources by soldering or other means. The central side 30A' may also be populated with light sources if desired. The circuit boards 30B' may be metal core boards while the circuit boards 30A' may be a glass filled epoxy such as FR4. Circuit traces in the central side 30A' are electrically connected to the rectangular sides 30B'. Power may be provided to the rectangular sides 30B' through the connection wires 82'. One of the connection wires 82' is used for providing power while another is used. Each of the rectangular circuit boards is interconnected and electorally connected through the central portion 30A'. Circuit traces may be disposed within the central side 30A'. For simplicity, the circuit traces within the central side 30A' are not illustrated.

During assembly the assembly 3340 is formed by inserting the tabs 3342 through openings 3344 of the central side 30A'. Solder may be used to hold the rectangular sides 30B' to the central side 30A'.

Figure 41:
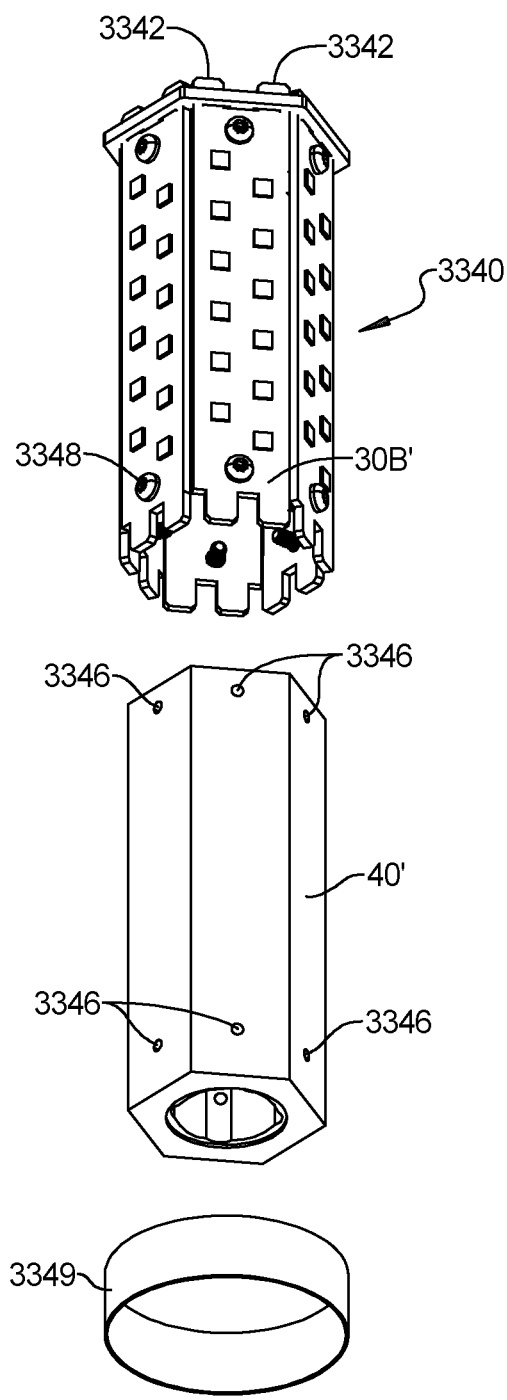
FIG. 41 is a perspective view of the circuit board.
Figure 42:
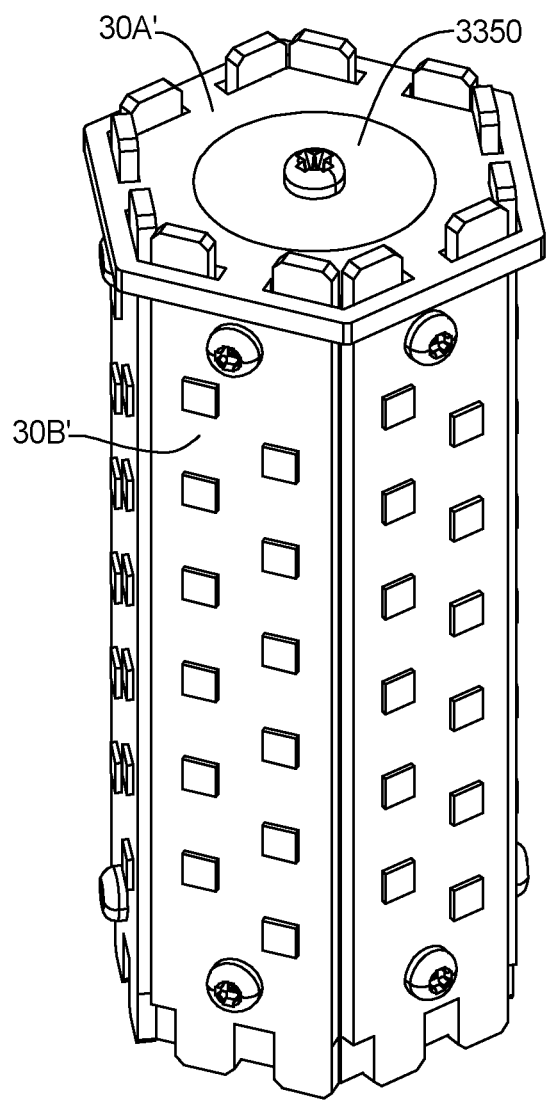
FIG. 42 is a perspective view of an alternative example of the circuit board having a sensor thereon.
Figure 43:
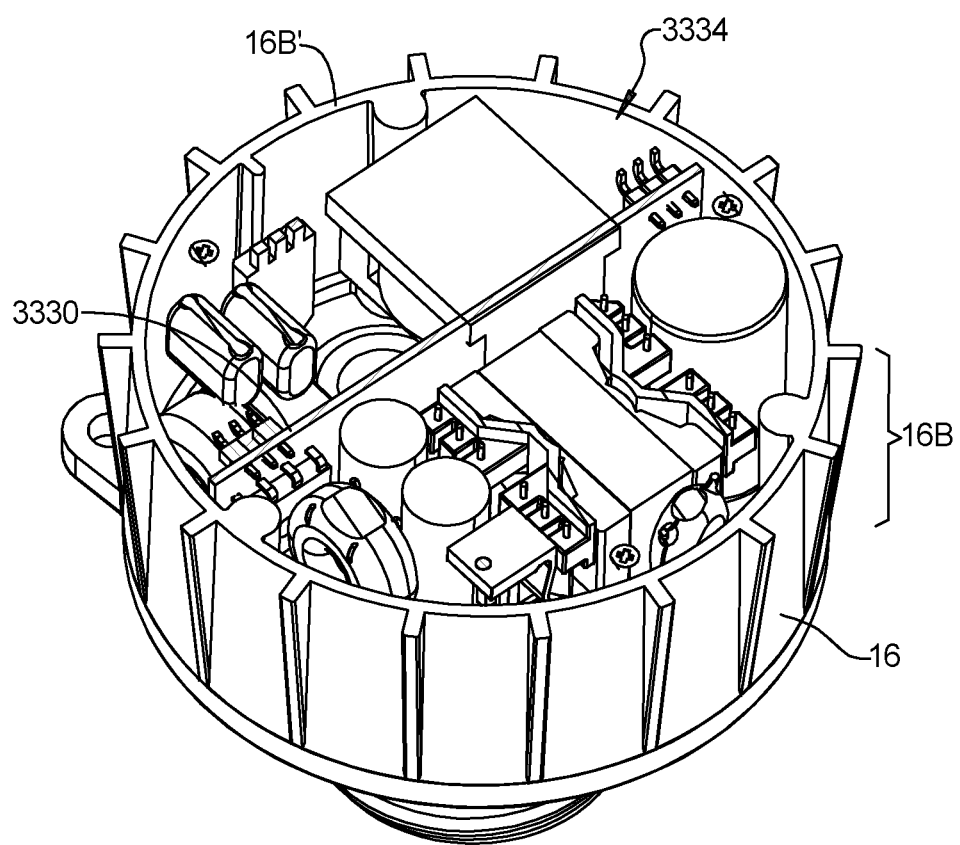
FIG. 43 is a cutaway view of the housing portion 16B of the example set forth in FIG. 33.

As is best illustrated in FIG. 41, the assembly 3340, once formed, is inserted over the bar 40'. The bar 40' may have recesses 3346 predrilled therein. The recesses 3346 may be used to receive the fasteners 3348. In this example, two fasteners 3348 are disposed on each of the rectangular sides 30B'. The fasteners 3348 fix the rectangular sides 30B' to the bar 40'. Of course, other types and numbers of fasteners may be used. However, one fastener may also be used. Another way in which the rectangular side is may be urged against the bar 40' is the use of a band or continuous loop 3349. The bar 40' may be inserted onto the heat exchange before or after the assembly 3340 is disposed thereon.

A sensor 3350 may also be disposed on the central side 30A'. The sensor 3350 may be one or more of a plurality types of sensors. For example, the sensor 3350 may be a motion or occupant sensor. The sensor 3350 may, for example, may be a passive infrared sensor, a microwave sensor, a motion sensor or an occupancy sensor. The material of the lens cap 18 may vary depending upon the type of sensor 3350 that is used for the particular application. For example, a clear lens cap may be used in one situation while a frosted lens may be used in others.

Figure 44:
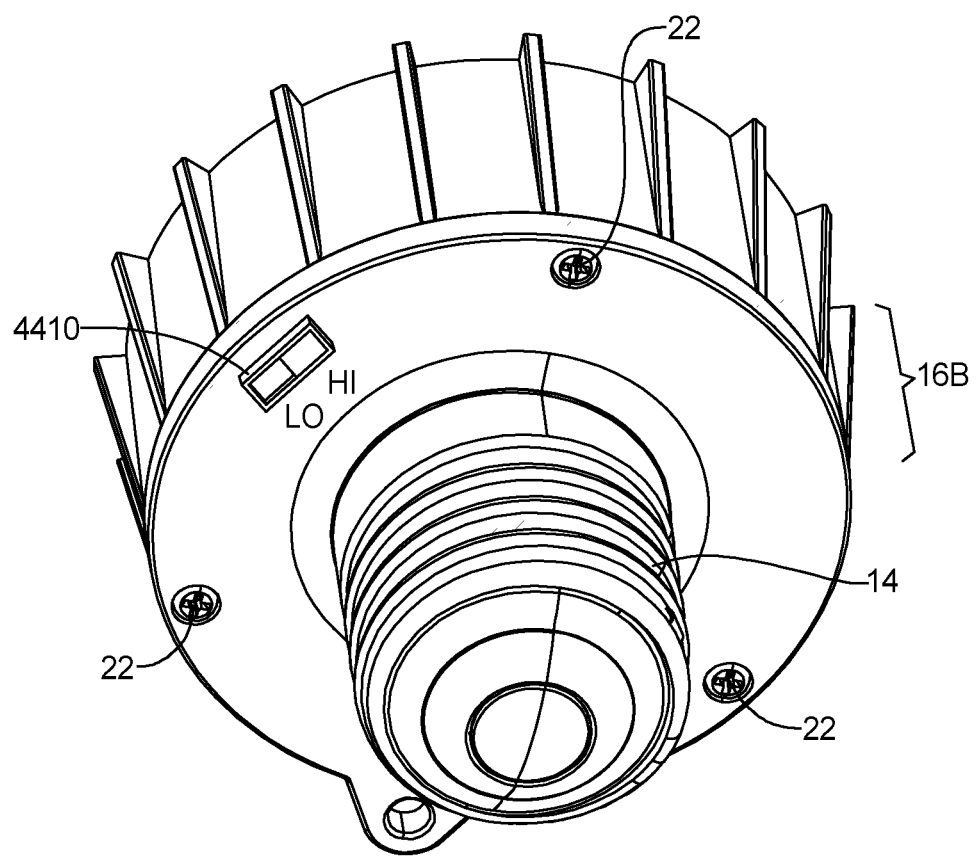
FIG. 44 is a partial bottom view of the light assembly having a control switch thereon.

Referring now to FIG. 44, a switch 4410 is set forth. The switch 4410 may be provided to control the light output of the light. That is, the switch 4410 may control a resistor or other component that is switched in and out of the drive control circuitry to control the amount of current and thus the amount of light output for the light sources. While the switch 4410 is illustrated as a slide switch, other types of switches such as a push button switch or the like may be provided.

Figure 45A:
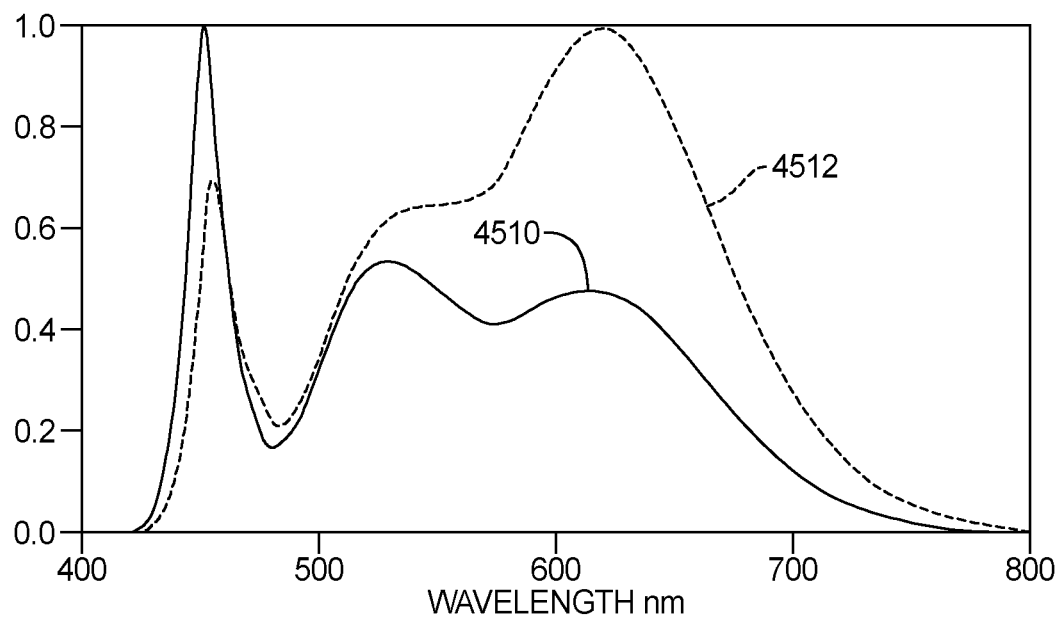
FIG. 45A are spectrum plots for different light sources within a first light assembly.

Referring now to FIG. 45A, a first spectrum 4510 is illustrated relative to a second spectrum 4512. The first spectrum 4510 is different than the second spectrum 4512. That is, the wavelengths and intensities of the light are different at different wavelengths. The first spectrum 4510 has higher intensity in the blue spectrum than the red spectrum. The first spectrum may be 5000 K. The spectrum 4512 has a lower intensity in the blue spectrum and higher intensity than the red spectrum as compared to spectrum 4510. The second spectrum 4512 may be 3000 K.

The first spectrum 4510 may be generated by a first plurality of light sources and the second spectrum 4512 may be generated by a second plurality of light sources. As was previously mentioned above, the first plurality of light sources may be located on one or more sides of a multi-sided circuit board. The second plurality of light sources may be located on other sides of the multi-sided circuit board. That is, each side may have light sources with either the first set of light sources or the second set of light sources exclusively. Also as mentioned above, the first plurality of light sources and the second plurality of light sources may be formed using the same type of technology. That is, the first set of light sources and the second set of light sources may all be formed from indium gallium nitride. The first plurality of light sources and the second plurality of light sources are disposed within a light assembly.

A third type of light source may use another type of technology such as aluminum indium gallium phosphorous. The third set of light sources may be located in a second light assembly in the same pictures a first light assembly that generates the spectrums described in FIG. 45A. The spectrum is an infrared spectrum. The infrared spectrum combined with the spectrums illustrated in FIG. 45A together form a photosynthetic active radiation of light suitable for horticultural lighting. The PAR light is used to support photosynthesis. By providing two different light sources with the different spectrums, the photosynthetic photon flux density (PPFD) that arrives at a plant is advantageously high.

Figure 45B:
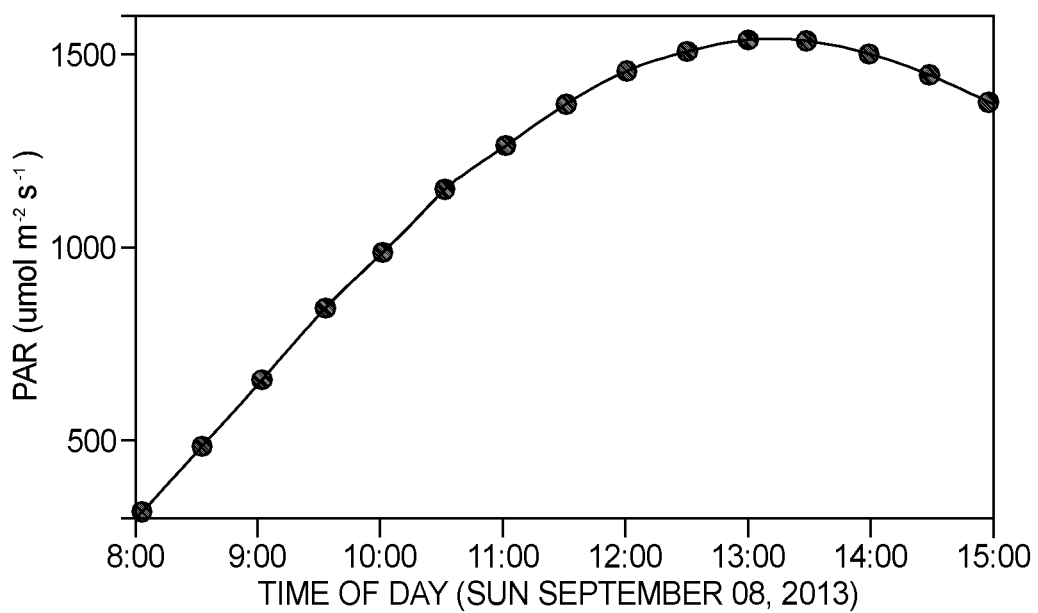
FIG. 45B is a spectrum plot for a light source within a second light assembly.

Referring now to FIG. 45B, a plot of light intensity versus the time of day is set for. The spectrum corresponds to a combination of 3000K and 5000K. The early time of day has lower intensities. The light intensities around noon are greatest. After 3:00 pm infrared may also be added to the spectrums used earlier in the day.

Figure 46:
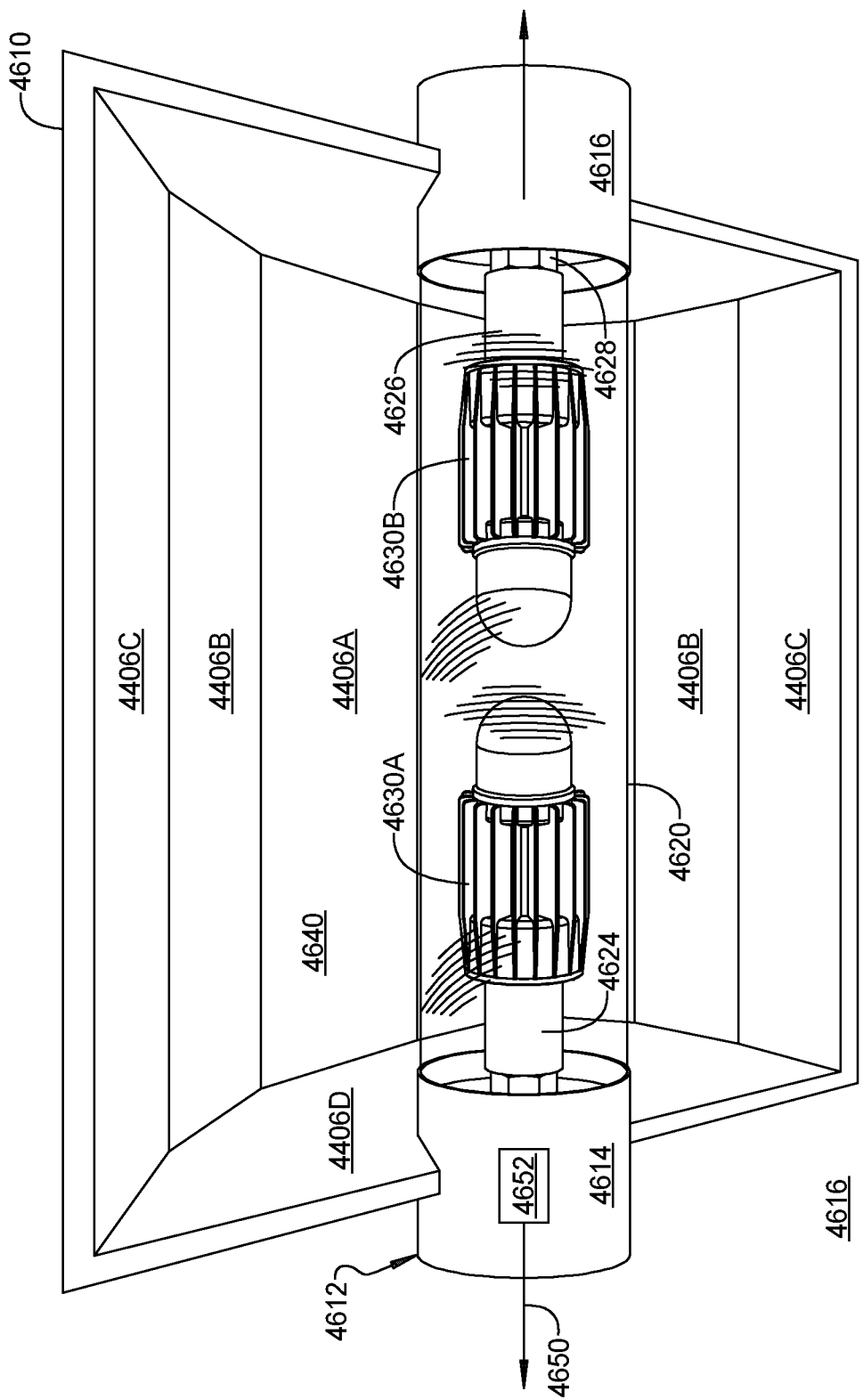
FIG. 46 is a perspective view of a light fixture.

Referring now to FIGS. 46 and 47, a fixture 4610 is set forth. The fixture 4610 comprises a housing 4612 that has a first end 4614 and a second end 4616. The housing 4612 in this example is an elongated shape.

The first end 4614 and the second end 4616 have a lens 4620 extending therebetween. The lens 4620, in this example, is clear. However, various types of materials that are not transparent may be used. Light shifting materials and light scattering materials may be disposed on the surface of the lens 4620.

A first socket 4624 and a second socket 4626 is disposed within the housing 4612. In this example, the sockets 4624, 4626 are mounted by brackets 4628 to each end 4614, 4616 of the housing 4612. Each socket 4624, 4626 receives a respective lamp base which is not illustrated because it is inside of the respective socket 4624, 4646. The sockets 4624, 4626 receive respective light sources 4630A and 4630B. The light sources 4630A and 4630B may generate different spectrums of light. As mentioned above, two different spectrums of light may be generated by the light assembly 4630A. The spectrums corresponding to those set forth in FIG. 45A may be provided. The spectrum generated by the light assembly 4630B may correspond to the spectrum.

A reflector 4640 is coupled to the housing 4612. The reflector 4640 is a spectrum mixing reflector. The reflector 4640 may be, for example, an off-axis parabolic reflector, a free form reflector, or an optically designed reflector suitable for directing light in the design direction. Although the reflector 4640 may be a continuously smooth surface, in this example, the reflector has a first panel 4640A, a second panel 4640B, and a third panel 4640C. Each panel may have a different curvature depending upon the desired light direction characteristics. End reflectors 4640D may also be used to reflect light that radiates in the axial direction. The housing 4612 has a longitudinal axis 4650 which aligns with the longitudinal axis of the first light source 4630A and the second light source 4630B. The light radiates from the light sources within the light assemblies 4630A, 4630B toward the reflector 4640 and its multiple panels. Light is then directed to the illumination surface. That is, the housing 4650, the light sources 4630A and 4630B are coaxial. A controller 4652 may be disposed within the housing 4612. The controller 4652 is microprocessor-based and may be programed to control the output of the light assemblies and the light sources therein. For example, the controller 4652 may control the intensity of the light to simulate sunlight at different times of the day. The controller 4652 may, for example, control the first light source 4630A differently than the second light source 4630B. The first light source 4630A may be a broad spectrum such as that illustrated in FIG. 45A. The second light source 4630B may be an infrared spectrum. The controller 4652 may control the amount of light from each of the light assemblies during different times of the day and at different times of the growing cycle, like that illustrated in FIG. 45B. For example, when a plant is budding, a different amount of infrared light may be provided to a plant. The controller 4652 may also be used to control other aspects of a growing process. For example, other light sources 4460, a $CO_2$ source 4462, a water source 4464, and a nutrient source 4466 may be controlled in the growing environment. The other light sources 4460 may be other light assemblies in other fixtures in a growing area. The CO2 source 4462 provides carbon dioxide to the growing area from a tank. The water source 4464 provides water to a growing area through a growing area by controlling a water distribution system such as a drip system or a sprinkling system. The nutrient source 4466 may provide nutrients in various ways including injecting nutrients into a water distribution system.

The foregoing description of the examples has been provided for purposes of illustration and description. It is not intended to be exhaustive or to limit the invention. Individual elements or features of a particular example are generally not limited to that particular example, but, where applicable, are interchangeable and can be used in a selected example, even if not specifically shown or described. The same may also be varied in many ways. Such variations are not to be regarded as a departure from the invention, and all such modifications are intended to be included within the scope of the invention.

What is claimed is:

1. A light assembly comprising:
   a cap;
   a heat pipe having a first condenser portion, an first evaporator portion, and a first middle portion between the first condenser portion and the first evaporator portion, said heat pipe comprising a longitudinally extending wall;
   a plurality of light sources disposed at least partially around and thermally coupled to longitudinally extending wall at the first evaporator portion of the heat pipe; and
   a first heat sink housing receiving the first condenser portion of the heat pipe, said first heat sink housing comprising an inner wall surrounding and thermally contacting the first condenser portion and the first middle portion of the heat pipe within a first bore defined by the inner wall, said first evaporator portion extending outward from the first bore, a plurality of spaced apart radially extending walls extending from the said inner wall, an outer wall concentric with the inner wall defining a plurality of air channels with the inner wall and the plurality of spaced apart radially extending walls, said plurality of air channels comprising a first end closed by a lateral wall of the first heat sink housing and a second end enclosed by the cap coupled to the first heat sink housing.

2. The light assembly of claim 1 wherein the cap encloses the plurality of light sources therein.

3. The light assembly as recited in claim 2 wherein the cap is snap fit to the first heat sink housing.

4. The light assembly as recited in claim 2 wherein the cap is adhesively coupled to the first heat sink housing.

5. The light assembly as recited in claim 1 further comprising a bar comprising a second bore receiving the first evaporator portion of the heat pipe therein.

6. The light assembly as recited in claim 5 wherein the bar is spaced apart longitudinally from the first heat sink housing.

7. The light assembly as recited in claim 5 wherein the second bore comprises at least one longitudinally extending channel extending from the second bore for receiving a thermally coupling material therein.

8. The light assembly as recited in claim 5 wherein bar comprises a circular cross section.

9. The light assembly as recited in claim 5 wherein bar comprises a plurality of sides.

10. The light assembly as recited in claim 9 wherein the plurality of sides are parallel to a longitudinal axis of the light assembly.

11. The light assembly as recited in claim 5 wherein the bar is hexagonal in cross section.

12. The light assembly as recited in claim 1 wherein the plurality of light sources are disposed on a circuit board.

13. The light assembly as recited in claim 12 wherein the circuit board comprises a plurality of side panels.

14. The light assembly as recited in claim 13 wherein the plurality of side panels is angularly and longitudinally disposed around the heat pipe.

15. The light assembly as recited in claim 14 wherein the plurality of side panels are each coupled to a central side.

16. The light assembly as recited in claim 15 further comprising a bar comprising a plurality of sides corresponding to respective ones of the plurality of side panels, said bar further comprising an axial end, said central side disposed adjacent to the axial end.

17. The light assembly as recited in claim 16 further comprising a fastener coupling the central side to the axial end.

18. The light assembly as recited in claim 16 further comprising a plurality of retainers coupled to the heat sink wherein the plurality of side panels are mechanically urged to thermally contact the bar by the plurality of retainers.

19. The light assembly as recited in claim 18 wherein the plurality of retainers respectively extend from a radially extending wall of the plurality of spaced apart radially extending walls of the first heat sink housing.

20. The light assembly as recited in claim 19 wherein the plurality of side panels are thermally coupled to the heat pipe with thermal grease.

21. The light assembly as recited in claim 15 further comprising a bar comprising a bore receiving the first evaporator portion of the heat pipe therein and further comprising a fastener thermally coupling the plurality of side panels against the bar.

22. The light assembly as recited in claim 21 wherein the fastener comprises a plurality of fasteners, each of the plurality of side panels comprising a respective one of the plurality of fasteners.

23. The light assembly as recited in claim 21 wherein the fastener comprises a plurality of fasteners, each of the plurality of side panels comprising two of the plurality of fasteners.

24. The light assembly as recited in claim 21 wherein the fastener comprises a circumferential band disposed about the plurality of side panels.

25. The light assembly as recited in claim 21 wherein the plurality of side panels are received within respective openings in the central side.

26. The light assembly as recited in claim 25 wherein each of the plurality of side panels comprises a respective tab, each respective tab received within the respective opening of the central side.

27. The light assembly as recited in claim 25 wherein the plurality of side panels are soldered to the central side.

28. The light assembly as recited in claim 21 wherein the plurality of side panels are composed of a first type of circuit board and the central side is composed of a second type of circuit board.

29. The light assembly as recited in claim 28 wherein the first type of circuit board is metal core and the second type of circuit board is glass reinforced epoxy.

30. The light assembly as recited in claim 21 further comprising an insulative layer between the central side and the bar.

31. The light assembly as recited in claim 21 wherein the central side comprises a sensor disposed thereon.

32. The light assembly as recited in claim 31 wherein the sensor comprises a motion sensor.

33. The light assembly as recited in claim 31 wherein the sensor comprises an occupant sensor.

34. The light assembly as recited in claim 13 wherein the light sources are disposed longitudinally in offset rows on at least some of the plurality of side panels.

35. The light assembly as recited in claim 12 wherein a first thermal contact area between the first evaporator portion and the circuit board is less than a second thermal contact area of the inner wall of the first heat sink housing and the first condenser portion of the heat pipe.

36. The light assembly as recited in claim 1 further comprising drive circuitry coupled to the first heat sink housing.

37. The light assembly as recited in claim 36 wherein the first heat sink housing comprises a housing portion comprising a drive circuitry volume, said drive circuitry disposed within the drive circuitry volume.

38. The light assembly as recited in claim 37 wherein the housing portion is integrally formed with the first heat sink housing.

39. The light assembly as recited in claim 37 wherein the drive circuitry is disposed on a control circuit board and is electrically coupled a light source circuit board comprising the plurality of light sources through a laterally extending wall and a port within the laterally extending wall, said laterally extending wall separates the drive circuitry volume and a heat sink portion of the first heat sink housing.

40. The light assembly as recited in claim 39 further comprising a thermal gel disposed between the laterally extending wall and the control circuit board.

41. The light assembly as recited in claim 40 further comprising potting material disposed between the control circuit board and a circuit board holder enclosing the drive circuit volume, said circuit board holder spaced apart from the control circuit board.

42. The light assembly as recited in claim 39 further comprising a first connector and a second connecter coupling the control circuit board to the light source circuit board.

43. The light assembly as recited in claim 39 wherein the first heat sink housing comprises fins disposed longitudinally on a concentric outer wall of the heat sink portion.

44. The light assembly as recited in claim 43 wherein the fins are disposed on the housing portion and the heat sink portion of the first heat sink housing.

45. The light assembly as recited in claim 37 wherein the drive circuitry is electrically coupled to a lamp base.

46. The light assembly as recited in claim 45 wherein the lamp base comprises internal threads and wherein the drive circuitry volume is enclosed by a circuit board holder comprising external threads engaging the internal threads.

47. The light assembly as recited in claim 36 wherein the drive circuitry is electrically coupled a plurality of circuit boards comprising the plurality of light sources through the first heat sink housing.

48. The light assembly as recited in claim 1 wherein the first heat sink housing comprises a first concentric wall a second concentric wall connected by the plurality of spaced apart radially extending walls acting as thermal bridges, spaced apart by the plurality of air channels.

49. The light assembly as recited in claim 48 wherein the plurality of spaced apart radially extending walls comprise eight spaced apart radially extending walls.

50. The light assembly as recited in claim 1 wherein the first heat sink housing comprises a reflector coupled thereto.

51. The light assembly as recited in claim 50 wherein the plurality of light sources are disposed within the reflector, the first heat sink housing is disposed outside the reflector, the first evaporator portion of the heat pipe is disposed within the reflector and the first condenser portion of the heat pipe is disposed outside the reflector.

52. The light assembly as recited in claim 51 further comprising a cover, the heat pipe disposed at least partially within the cover.

53. The light assembly as recited in claim 51 wherein the reflector comprises a thermally conductive first portion thermally coupled to the first heat sink housing.

54. The light assembly as recited in claim 53 wherein a securing means couples the thermally conductive first portion of the reflector to the first heat sink housing.

55. The light assembly as recited in claim 50 wherein the reflector comprises an opaque portion and a translucent portion.

56. The light assembly as recited in claim 55 wherein the translucent portion backscatters light.

57. The light assembly as recited in claim 55 wherein the opaque portion comprises heat sink fins thereon.

58. The light assembly as recited in claim 57 wherein the opaque portion is metallic.

59. The light assembly as recited in claim 1 further comprising a second heat sink housing spaced apart from the first heat sink housing, wherein the plurality of light sources are disposed between the first heat sink housing and the second heat sink housing, wherein the heat pipe comprises the first condenser portion disposed at a first end and a second condenser portion disposed at a second end, and wherein the first evaporator portion is disposed between first condenser portion and the second condenser portion.

60. The light assembly as recited in claim 59 further comprising a cover coupled to the first heat sink housing and the second heat sink housing.

61. The light assembly as recited in claim 59 wherein the first heat sink housing comprises a first surface that is angled relative to a longitudinal axis and is disposed adjacent to the plurality of light sources, wherein the second heat sink housing comprises a second surface that is angled relative to the longitudinal axis and is disposed adjacent to the plurality of light sources.

62. The light assembly as recited in claim 59 wherein the first heat sink housing comprises a first conical surface that is angled relative to a longitudinal axis and is disposed adjacent to the plurality of light sources, wherein the second heat sink housing comprises a second conical surface that is angled relative to the longitudinal axis and is disposed adjacent to the plurality of light sources.

63. The light assembly as recited in claim 62 further comprising a bar, said heat pipe extending through the bar, said bar disposed adjacent to the first evaporator portion.

64. The light assembly as recited in claim 63 wherein the plurality of light sources are disposed on a plurality of circuit board portions around the bar, said light sources are thermally coupled to the first evaporator portion through the plurality of circuit board portions and the bar.

65. The light assembly as recited in claim 59 further comprising a solar panel in thermal communication with the heat pipe.

66. The light assembly as recited in claim 65 wherein the solar panel is coupled to the second heat sink housing.

67. The light assembly as recited in claim 66 further comprising a battery housing receiving energy from the solar panel.

68. The light assembly as recited in claim 67 wherein the battery housing is directly adjacent the first heat sink housing.

69. A method of assembling a light assembly comprising:
populating a circuit board with light sources when the circuit board is disposed in a plane;
bending the circuit board into a plurality of side portions and a central side, wherein the plurality of side portions extend at an angle outward around the central side;
inserting the circuit board over a bar so that the plurality of side portions are around the bar;
inserting an first evaporator portion of a heat pipe into the bar;
disposing a first condenser portion and a middle portion of the heat pipe within into a first bore of a first heat sink housing while the first evaporator portion is disposed outside the first heat sink housing, said first heat sink housing comprising an inner wall surrounding and thermally contacting the first condenser portion and the middle portion of the heat pipe within the first bore defined by the inner wall, a plurality of spaced apart radially extending walls extend from the said inner wall, an outer wall concentric with the inner wall defining a plurality of air channels with the inner wall and the plurality of spaced apart radially extending walls, said plurality of air channels each comprising a first end closed by a lateral wall of the first heat sink housing;
forming a gap between the first heat sink housing and the bar;
placing thermally conductive material between the bar and the plurality of side portions of the circuit board;
urging the plurality of side portions against the circuit board against the bar using a plurality of retainers disposed on the first heat sink housing;
fastening the circuit board to the bar; and
coupling a cap to the first heat sink housing to enclosing a second end of the plurality of air channels, the circuit board and the bar therein.

70. The method of claim 69 wherein prior to bending the circuit board, scoring the circuit board.

71. The method of claim 69 further comprising disposing a driver circuit in a driver circuitry volume in a housing portion of the first heat sink housing.

72. The method of claim 71 further comprising coupling the driver circuit to circuit board connection wires disposed within an air channel of the plurality of air channels of a heat sink portion of the first heat sink housing.

73. A method of assembling a light assembly comprising:
populating a plurality of side circuit boards with light sources, each of the plurality of side circuit boards being planar and comprising a respective tab;
electrically and mechanically coupling the plurality of side circuit boards to a central side by inserting the tabs into respective slots on the central side, wherein the plurality of side circuit boards extend at an angle outward around the central side, the plurality of side circuit boards and the central side forming an assembly;

inserting the assembly over a bar so that the plurality of side circuit boards are around the bar;

inserting an first evaporator portion of a heat pipe into the bar;

inserting an a first condenser portion of the heat pipe into a first heat sink housing, said first heat sink housing comprising an inner wall surrounding and thermally contacting the condenser portion of the heat pipe within a first bore defined by the inner wall, a plurality of spaced apart radially extending walls extending from the said inner wall, an outer wall concentric with the inner wall defining a plurality of air channels with the inner wall and the plurality of spaced apart radially extending walls, said plurality of air channels each comprising a first end closed by a lateral wall of the first heat sink housing;

forming a gap between the first heat sink housing and the bar;

placing thermally conductive material between the bar and the plurality of side circuit boards;

urging the plurality of side circuit boards against the bar;

fixing the plurality of side circuit boards to the bar; and coupling a cap to the first heat sink housing to enclosing a second end of the plurality of channels, the plurality of side circuit boards and the bar therein.

74. The method of claim 73 wherein electrically coupling comprises soldering the plurality of side circuit boards to the central side.

75. The method of claim 73 wherein fixing comprises fastening the plurality of side circuit boards to the bar with fasteners extending between the plurality of side circuit boards and the bar.

76. The method of claim 73 further comprising placing an insulator between the central side and an end of the bar.

77. The method of claim 73 further comprising coupling a cap to the first heat sink housing to enclose the assembly therein.

78. The method of claim 73 further comprising disposing a driver circuit on a control circuit board in a driver circuitry volume in a housing portion of first heat sink housing.

79. The method of claim 78 further comprising coupling a thermally conductive gel to a first surface of the control circuit board, and inserting the thermally conductive gel and the control circuit board into the driver circuitry volume.

80. The method of claim 79 further comprising after inserting the thermally conductive gel and the control circuit board, filling the driver circuitry volume with thermally conductive potting material.

81. The method of claim 78 further comprising coupling the driver circuit to circuit board connection wires disposed within an air channel of a heat sink portion of the first heat sink housing.

* * * * *